(12) United States Patent
Furuhashi et al.

(10) Patent No.: US 11,574,157 B2
(45) Date of Patent: Feb. 7, 2023

(54) PRINTER PRINTING SETS OF PRINT DATA IN ORDER WHICH DEPENDS ON MOUNTED MEDIUM TYPE

(71) Applicant: BROTHER KOGYO KABUSHIKI KAISHA, Nagoya (JP)

(72) Inventors: Michihiko Furuhashi, Kiyosu (JP); Tomoyasu Fukui, Inuyama (JP); Ryuichi Kanda, Nagoya (JP); Koichi Kondo, Inuyama (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/388,815

(22) Filed: Jul. 29, 2021

(65) Prior Publication Data
US 2022/0036145 A1 Feb. 3, 2022

(30) Foreign Application Priority Data
Jul. 30, 2020 (JP) .............................. JP2020-129392

(51) Int. Cl.
| | |
|---|---|
| *G06F 3/12* | (2006.01) |
| *G06K 15/02* | (2006.01) |
| *B41J 3/46* | (2006.01) |
| *B41J 3/407* | (2006.01) |
| *B41J 29/393* | (2006.01) |

(52) U.S. Cl.
CPC ........ *G06K 15/1809* (2013.01); *B41J 3/4075* (2013.01); *B41J 3/46* (2013.01); *B41J 29/393* (2013.01); *G06F 3/1205* (2013.01); *G06F 3/1243* (2013.01); *G06F 3/1285* (2013.01); *G06K 15/024* (2013.01); *G06K 15/1805* (2013.01)

(58) Field of Classification Search
CPC ................ G06F 3/1243; G06K 15/024; G06K 15/1805; G06K 15/1809; B41J 3/4075; B41J 29/393; B41J 11/009; B41J 15/044
USPC ....................................... 358/1.9, 1.13, 1.15
See application file for complete search history.

(56) References Cited

U.S. PATENT DOCUMENTS

2019/0163414 A1* 5/2019 Ishii ..................... H04N 1/2353
2021/0300068 A1* 9/2021 Hirabayashi ........... B41J 11/009

FOREIGN PATENT DOCUMENTS

| JP | 2014-000814 A | 1/2014 |
|---|---|---|
| WO | 2012/169263 A1 | 12/2012 |

* cited by examiner

*Primary Examiner* — Kent Yip
(74) *Attorney, Agent, or Firm* — Kenealy Vaidya LLP

(57) ABSTRACT

In a printer, a controller determines a type of print medium currently mounted in a mount portion, and acquires a first set of print data correlated with a first medium type and a second set of print data correlated with a second medium type. In a case that a print medium of the first medium type is mounted in the mount portion, a print portion prints a first print image based on the first set of print data, and thereafter prints a second print image based on the second set of print data. In a case that a print medium of the second medium type is mounted in the mount portion, the print portion prints the second print image based on the second set of print data, and thereafter prints the first print image based on the first set of print data.

14 Claims, 25 Drawing Sheets

COMPARISON EXAMPLE

FIG. 5A
CASSETTE A IS MOUNTED
CASSETTE A  TAPE COLOR: TRANSPARENT
PRINTING COLOR: RED
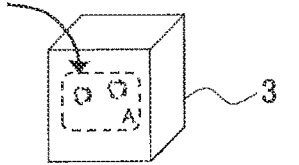

FIG. 5B
DATA FOR BOTTOM LABEL
(USING CASSETTE C)
NO SMOKING →
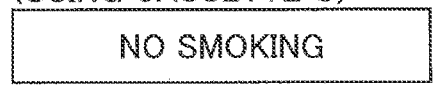
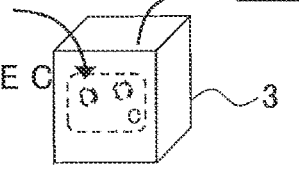

FIG. 5C
CASSETTE A IS REPLACED WITH CASSETTE C
CASSETTE C  TAPE COLOR: WHITE
PRINTING COLOR: BLACK
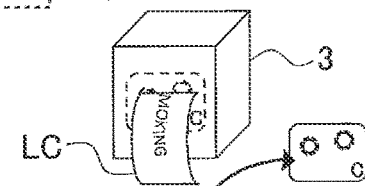

FIG. 5D
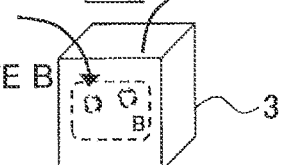
LC

FIG. 5E
CASSETTE C IS REPLACED WITH CASSETTE B
CASSETTE B  TAPE COLOR: TRANSPARENT
PRINTING COLOR: BLUE
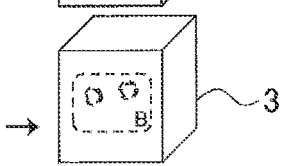

FIG. 5F
DATA FOR MIDDLE LABEL
(USING CASSETTE B)
 →
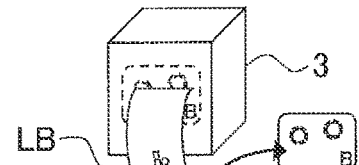

FIG. 5G
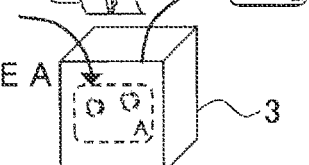
LB

FIG. 5H
CASSETTE B IS REPLACED WITH CASSETTE A
CASSETTE A  TAPE COLOR: TRANSPARENT
PRINTING COLOR: RED
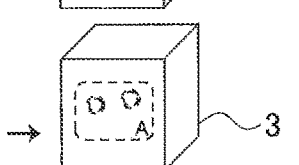

FIG. 5I
DATA FOR TOP LABEL
(USING CASSETTE A)
 →
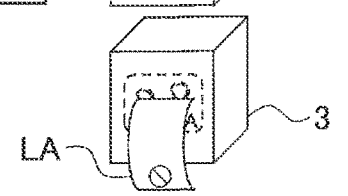

DATA FOR TOP LABEL
(USING CASSETTE A)

DATA FOR MIDDLE LABEL
(USING CASSETTE B)

DATA FOR BOTTOM LABEL
(USING CASSETTE C)

NO SMOKING

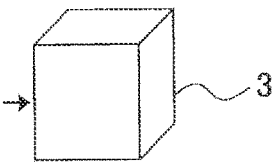

FIG. 6B

CASSETTE A IS MOUNTED

CASSETTE A  TAPE COLOR: TRANSPARENT
             PRINTING COLOR: RED

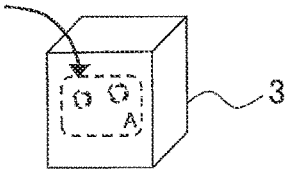

FIG. 6C

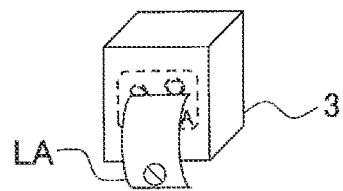

FIG. 6D

CASSETTE A IS REPLACED WITH CASSETTE B

CASSETTE B  TAPE COLOR: TRANSPARENT
             PRINTING COLOR: BLUE

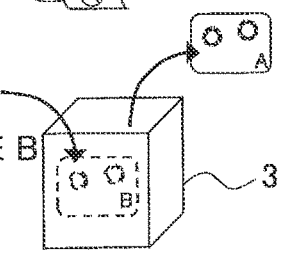

FIG. 6E

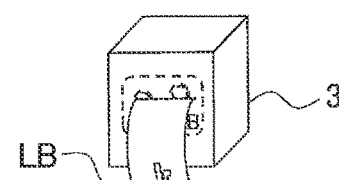

FIG. 6F

CASSETTE B IS REPLACED WITH CASSETTE C

CASSETTE C  TAPE COLOR: WHITE
             PRINTING COLOR: BLACK

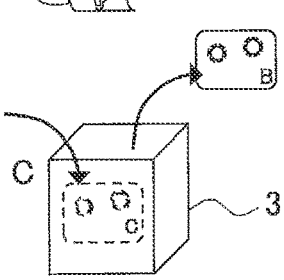

FIG. 6G

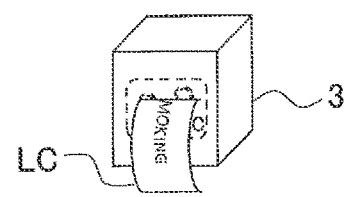

FIG. 7A

DATA FOR TOP LABEL
(USING CASSETTE A)

DATA FOR MIDDLE LABEL
(USING CASSETTE B)

DATA FOR BOTTOM LABEL
(USING CASSETTE C)

NO SMOKING

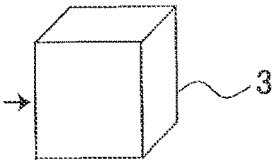

FIG. 7B

CASSETTE B IS MOUNTED

CASSETTE B  TAPE COLOR: TRANSPARENT
PRINTING COLOR: BLUE

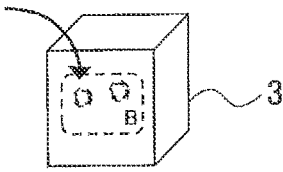

FIG. 7C

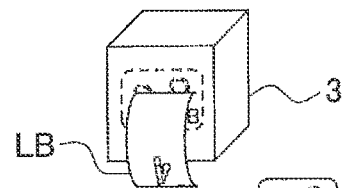
LB

FIG. 7D

CASSETTE B IS REPLACED WITH CASSETTE C

CASSETTE C  TAPE COLOR: WHITE
PRINTING COLOR: BLACK

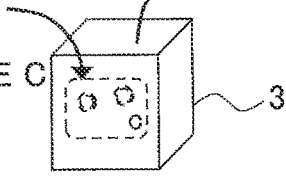

FIG. 7E

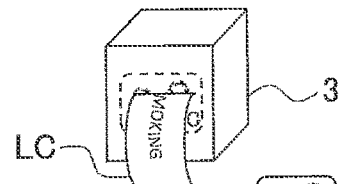
LC

FIG. 7F

CASSETTE C IS REPLACED WITH CASSETTE A

CASSETTE A  TAPE COLOR: TRANSPARENT
PRINTING COLOR: RED

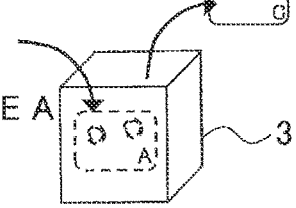

FIG. 7G

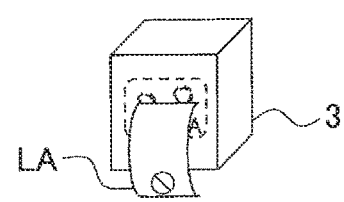
LA

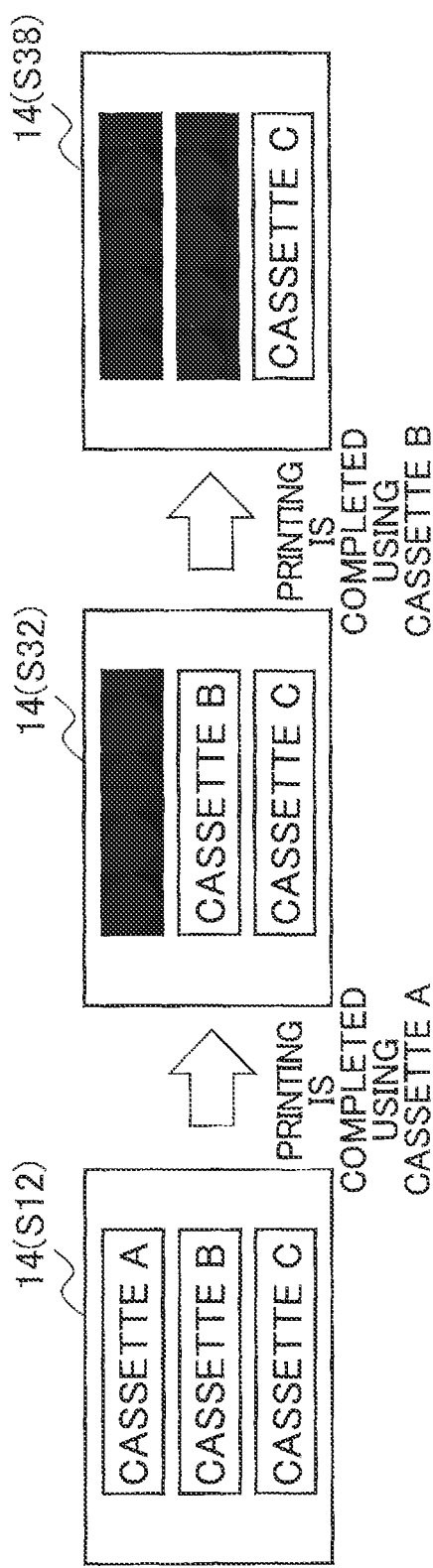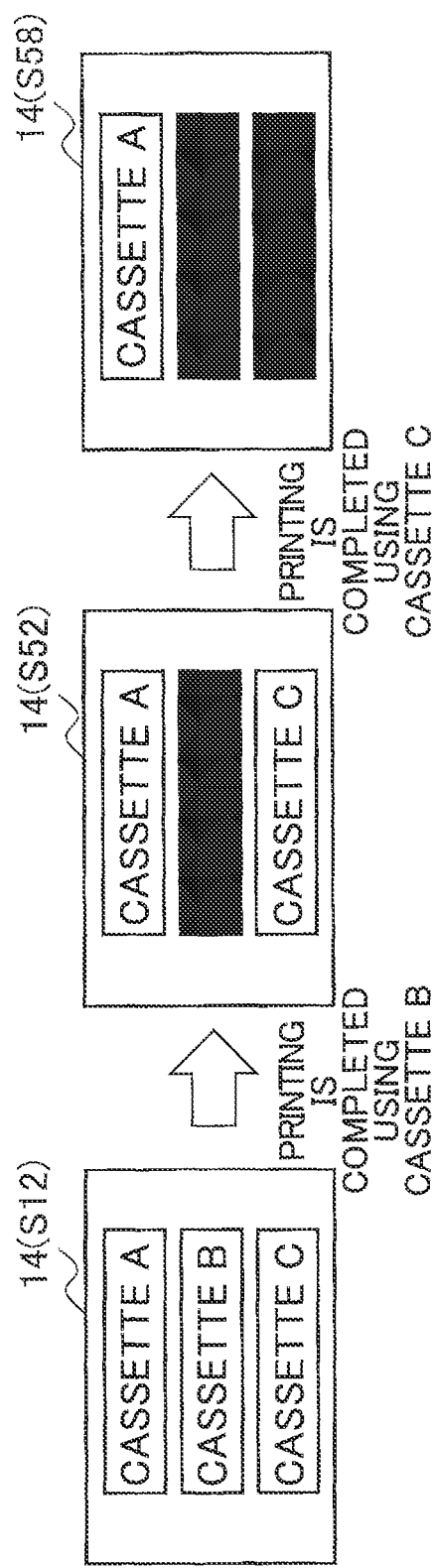

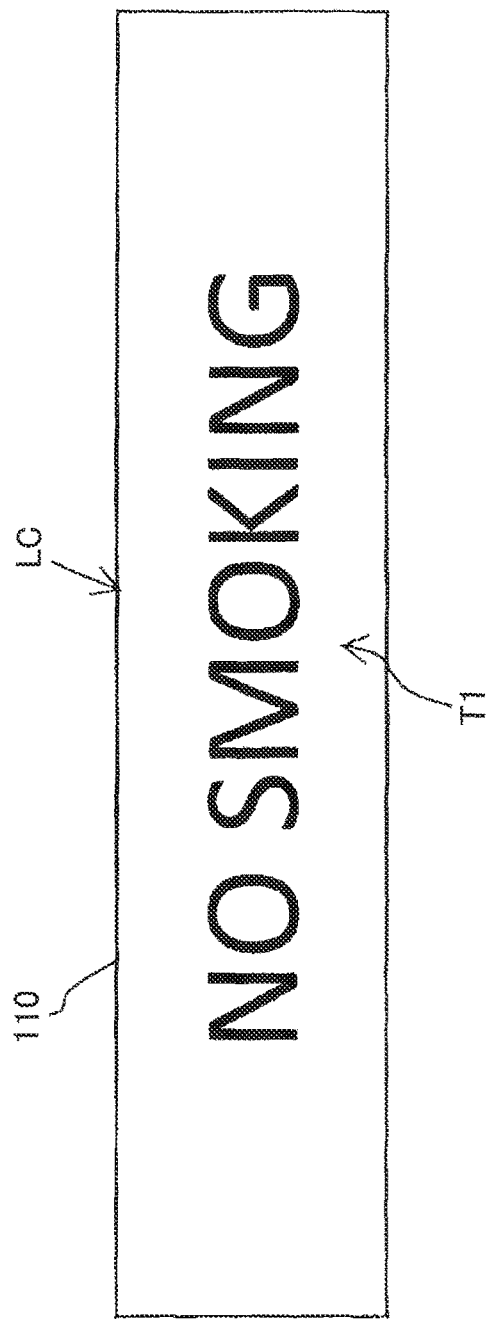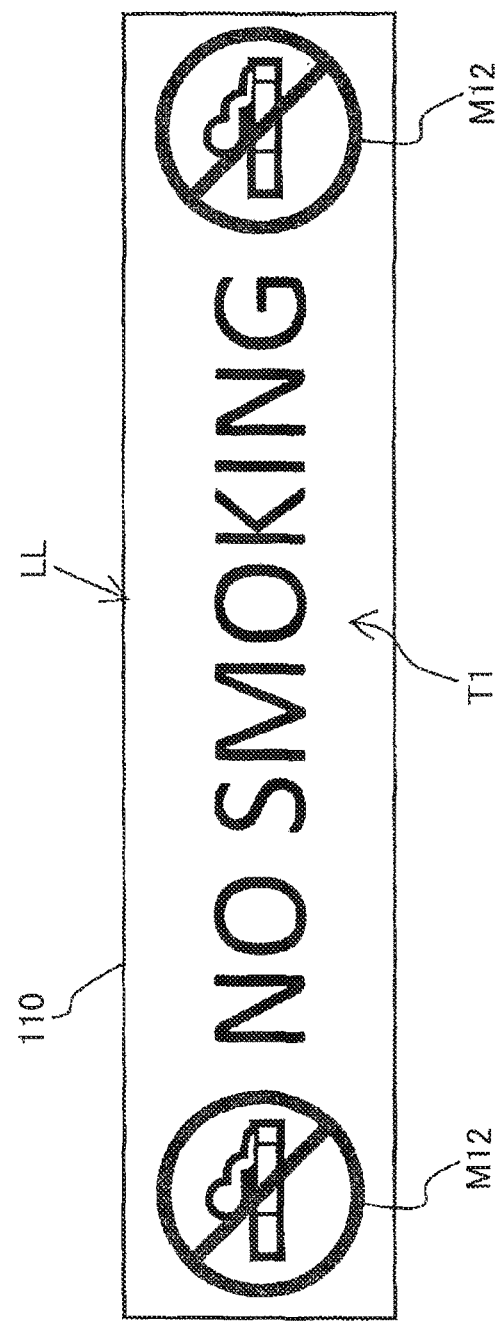

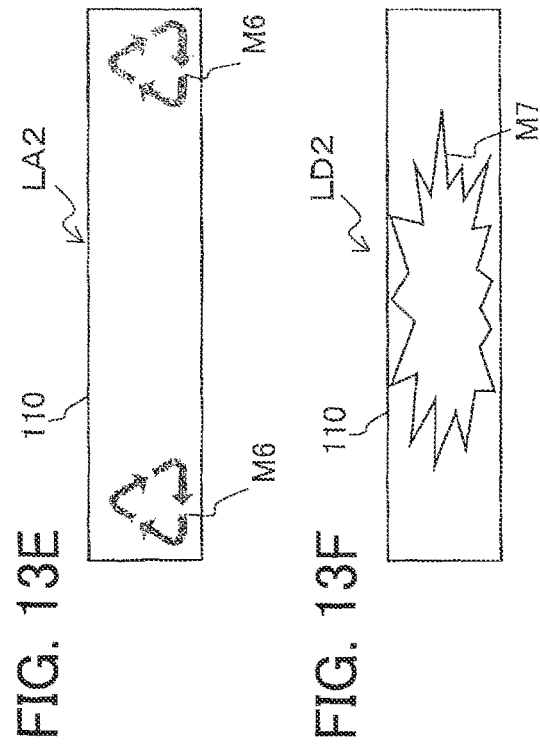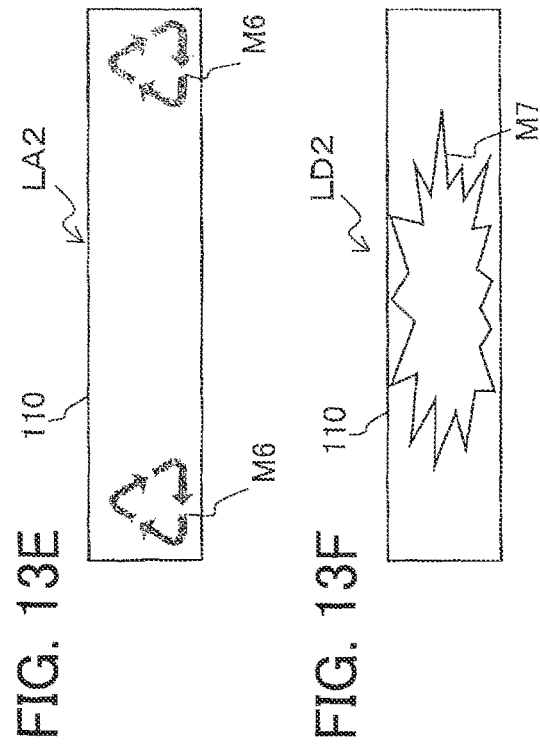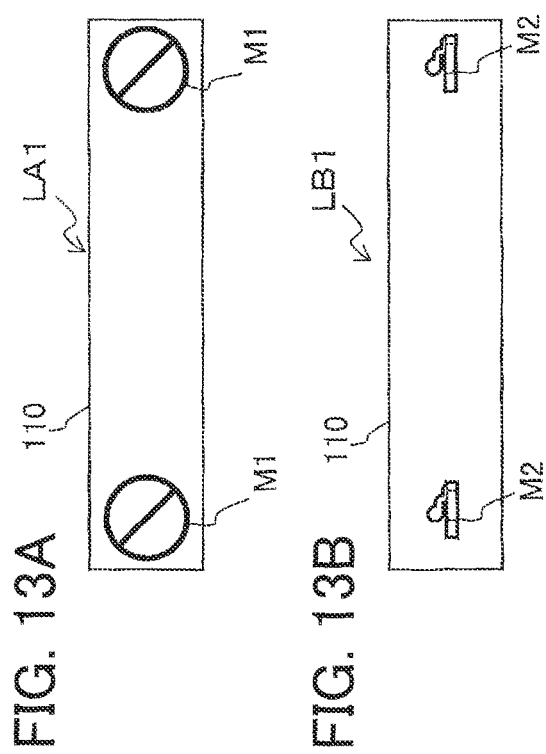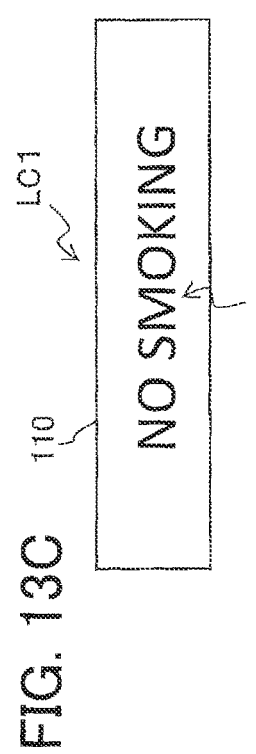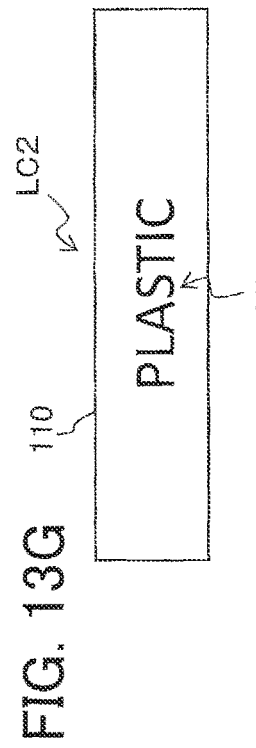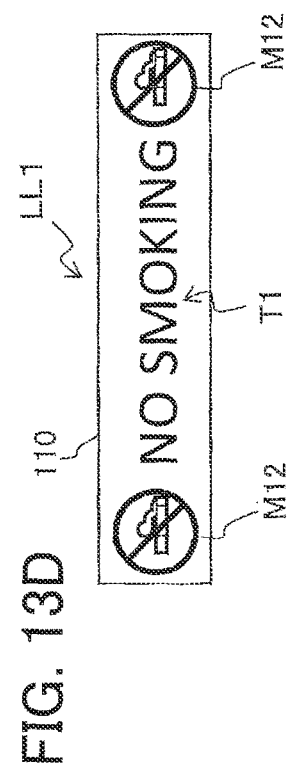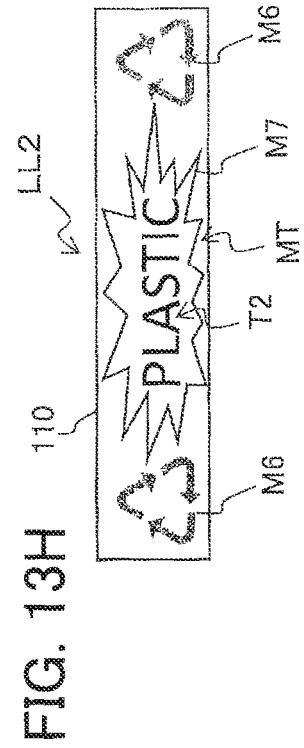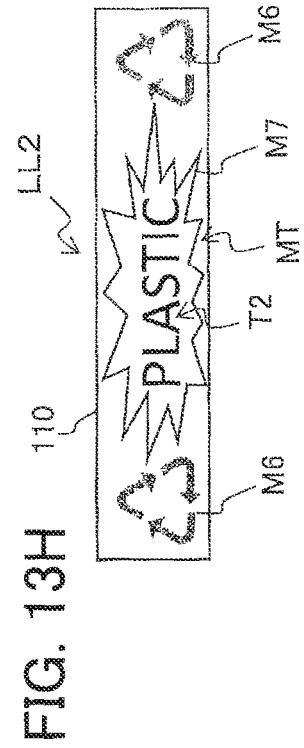

FIG. 14A
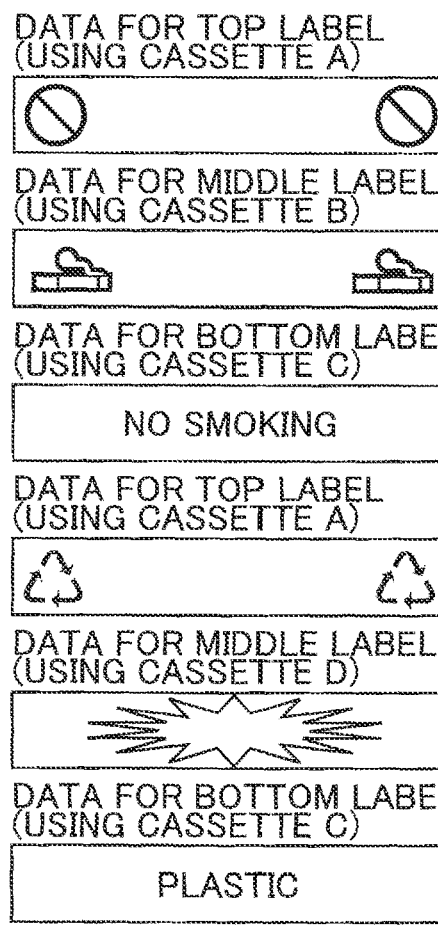
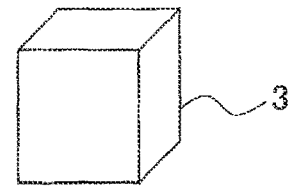
FIG. 14B
CASSETTE A IS MOUNTED
CASSETTE A   TAPE COLOR: TRANSPARENT
             PRINTING COLOR: RED
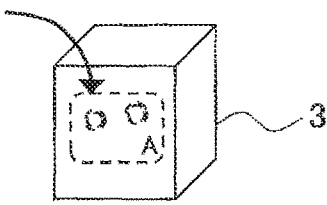
FIG. 14C
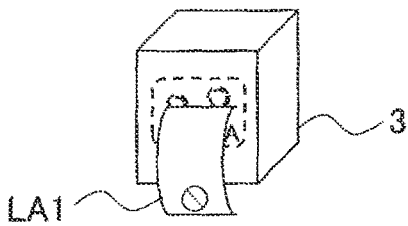
FIG. 14D
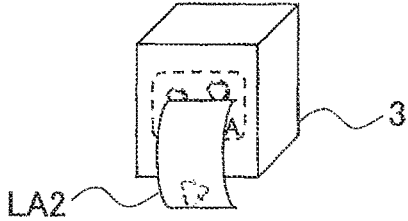

CASSETTE A IS REPLACED WITH CASSETTE B

CASSETTE B     TAPE COLOR: TRANSPARENT
PRINTING COLOR: BLUE

LB1

CASSETTE B IS REPLACED WITH CASSETTE C

CASSETTE C     TAPE COLOR: WHITE
PRINTING COLOR: BLACK

LC1

LC2

CASSETTE C IS REPLACED WITH CASSETTE D

CASSETTE D     TAPE COLOR: TRANSPARENT
PRINTING COLOR: GREEN

LD2

PRINTER PRINTING SETS OF PRINT DATA IN ORDER WHICH DEPENDS ON MOUNTED MEDIUM TYPE

CROSS REFERENCE TO RELATED APPLICATION

This application claims priority from Japanese Patent Application No. 2020-129392 dated Jul. 30, 2020. The entire content of the priority application is incorporated herein by reference.

TECHNICAL FIELD

The present disclosure relates to a printer and a print control program for printing a plurality of printing images using a plurality of types of printing media.

BACKGROUND

Tape printers for creating composite labels are known in the art. For example, the tape printer described in Japanese Patent Application Publication No. 2014-814 prints a plurality of labels that is to be overlaid to form a single composite label. In this conventional technology, first a plurality of sets of print data corresponding to the plurality of labels to be overlaid is generated, and subsequently each of the plurality of labels is printed in sequence based on these sets of print data. The order is set such that a first label constituting a base label based on first data is printed and thereafter a second label constituting an overlay label is printed based on second data.

SUMMARY

In a case that the cassette for printing the second label is already mounted in the conventional tape printer described above, the user must replace this cassette with the cassette for printing the first label. Subsequently, after printing the first label, the user must remount the cassette for the second label and print the second label. In other words, the conventional method places a burden on the user to perform a complicated sequence of operations: remove cassette for second label→mount cassette for first label→remove cassette for first label→mount cassette for second label.

In view of the foregoing, it is an object of the present disclosure to provide a printer and a print control program capable of reducing operational load on the user when printing a plurality of images for a plurality of corresponding layers using a plurality of types of printing media.

In order to attain the above and other objects, the disclosure provides a printer. The printer includes a mount portion, a print portion, and a controller. A print medium is mountable in the mount portion. The print portion is configured to print an image. The controller is configured to perform: a determination process to determine a type of print medium currently mounted in the mount portion; a data acquisition process to acquire a plurality of sets of print data representing respective ones of a plurality of print images and being correlated with respective ones of a plurality of medium types which is different from one another, each of the plurality of print images being to be printed by using correlated one of the plurality of medium types, the plurality of sets of print data including a first set of print data and a second set of print data, the first set of print data representing a first print image and being correlated with a first medium type, the second set of print data representing a second print image and being correlated with a second medium type; a print control process to control the print portion according to the plurality of acquired sets of print data and determination result in the determination process so that: in a case that the print medium of the first medium type is mounted in the mount portion, the print portion prints the first print image based on the first set of print data, and thereafter prints the second print image based on the second set of print data; and in a case that the print medium of the second medium type is mounted in the mount portion, the print portion prints the second print image based on the second set of print data, and thereafter prints the first print image based on the first set of print data.

According to another aspect, the disclosure provides a non-transitory computer readable storage medium storing a set of program instructions installed on and executed by a computer provided in a terminal device configured to be connected to a printer. The set of program instructions includes: performing a specification process to specify a type of a print medium currently mounted in the printer; and transmitting to the printer a plurality of sets of print data representing respective ones of a plurality of print images and being correlated with respective ones of a plurality of medium types which is different from one another, each of the plurality of print images being to be printed by using correlated one of the plurality of medium types, the plurality of sets of print data including a first set of print data and a second set of print data, the first set of print data representing a first print image and being correlated with a first medium type, the second set of print data representing a second print image and being correlated with a second medium type. In a case that the specified type is the first medium type, the transmitting transmits the first set of print data, and thereafter transmits the second set of print data. In a case that the specified type is the second medium type, the transmitting transmits the second set of print data, and thereafter transmits the first set of print data.

According to still another aspect, the disclosure provides a non-transitory computer readable storage medium storing a set of program instructions installed on and executed by a computer provided in a terminal device configured to be connected to a printer. The set of program instructions includes: determining whether the printer is capable of detecting a type of print medium currently mounted therein; transmitting to the printer a plurality of sets of print data representing respective ones of a plurality of print images and being correlated with respective ones of a plurality of medium types which is different from one another, each of the plurality of print images being to be printed by using correlated one of the plurality of medium types; and in a case that the determining determines that the printer is incapable of detecting the type of print medium: performing a type display process to display a plurality of medium types in a selectable manner; performing a type reception process to receive one type from among the plurality of medium types displayed in the type display process via an operation interface; and performing a print commanding process to transmit to the printer a command to print a set of print data correlated with the one type received in the type reception process from among the plurality of sets of print data transmitted.

BRIEF DESCRIPTION OF THE DRAWINGS

The particular features and advantages of the disclosure as well as other objects will become apparent from the following description taken in connection with the accompanying drawings, in which:

FIGS. 5A-5J are explanation diagrams illustrating a method for creating the top label, the middle label, and the bottom label while replacing cassettes according to a comparative example of the first embodiment;

FIGS. 6A-6G are explanation diagrams illustrating a method for creating the top label, the middle label, and the bottom label while replacing cassettes according to an example of the first embodiment;

FIGS. 7A-7G are explanation diagrams illustrating the method for creating the top label, the middle label, and the bottom label while replacing cassettes according to another example of the first embodiment;

FIGS. 10A and 10B are explanation diagrams illustrating examples of displays prompting a user to mount cassettes;

FIGS. 12A-12D are plan views respectively illustrating a top label, a middle label, a bottom label, and a composite label created by bonding these three labels according to the variation (1-1) of the first embodiment;

FIGS. 13A-13H are plan views illustrating two sets of a top label, a middle label, a bottom label, and a composite label according to the variation (1-2) of the first embodiment;

FIGS. 14A-14D are explanation diagrams illustrating a part of a method for creating the top label, the middle label, and the bottom label while replacing cassettes according to an example of the variation (1-2) of the first embodiment;

DETAILED DESCRIPTION

Embodiments of the present disclosure will be described while referring to the attached drawings.

First Embodiment

First embodiment of the present disclosure will be described.

Overall Structure of a Printing System

Figure 1A:
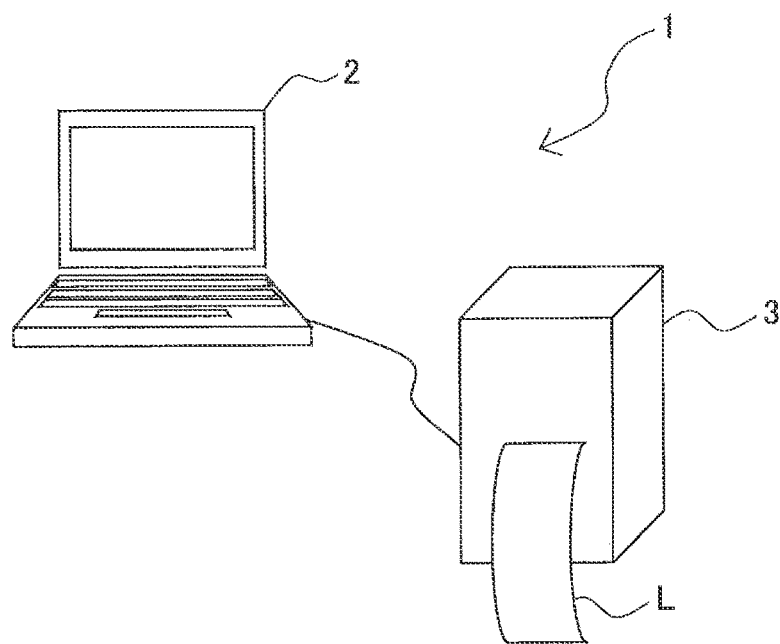
FIGS. 1A and 1B are schematic diagrams illustrating a printing system according to a first embodiment and a variation (1-2) thereof.

FIG. 1A shows the overall structure of a printing system according to an embodiment. In FIG. 1A, a printing system 1 has an operation terminal 2 configured of a common personal computer, for example, and a label printer 3 connected to the operation terminal 2. The operation terminal 2 is connected to the label printer 3 so as to be capable of exchanging information with the label printer 3 over a suitable network, for example. The operation terminal 2 may also be configured of a smartphone, a mobile information terminal, or the like. The operation terminal 2 and the label printer 3 need not be connected over a network but may be connected via a suitable method, such as a USB cable or other wired connection. The label printer 3 creates print labels L based on user operations performed on the operation terminal 2. Note that FIG. 1B will be described later. The labels L are examples of a printed matter, and the operation terminal 2 is an example of a terminal device.

Operation Terminal

Figure 2:
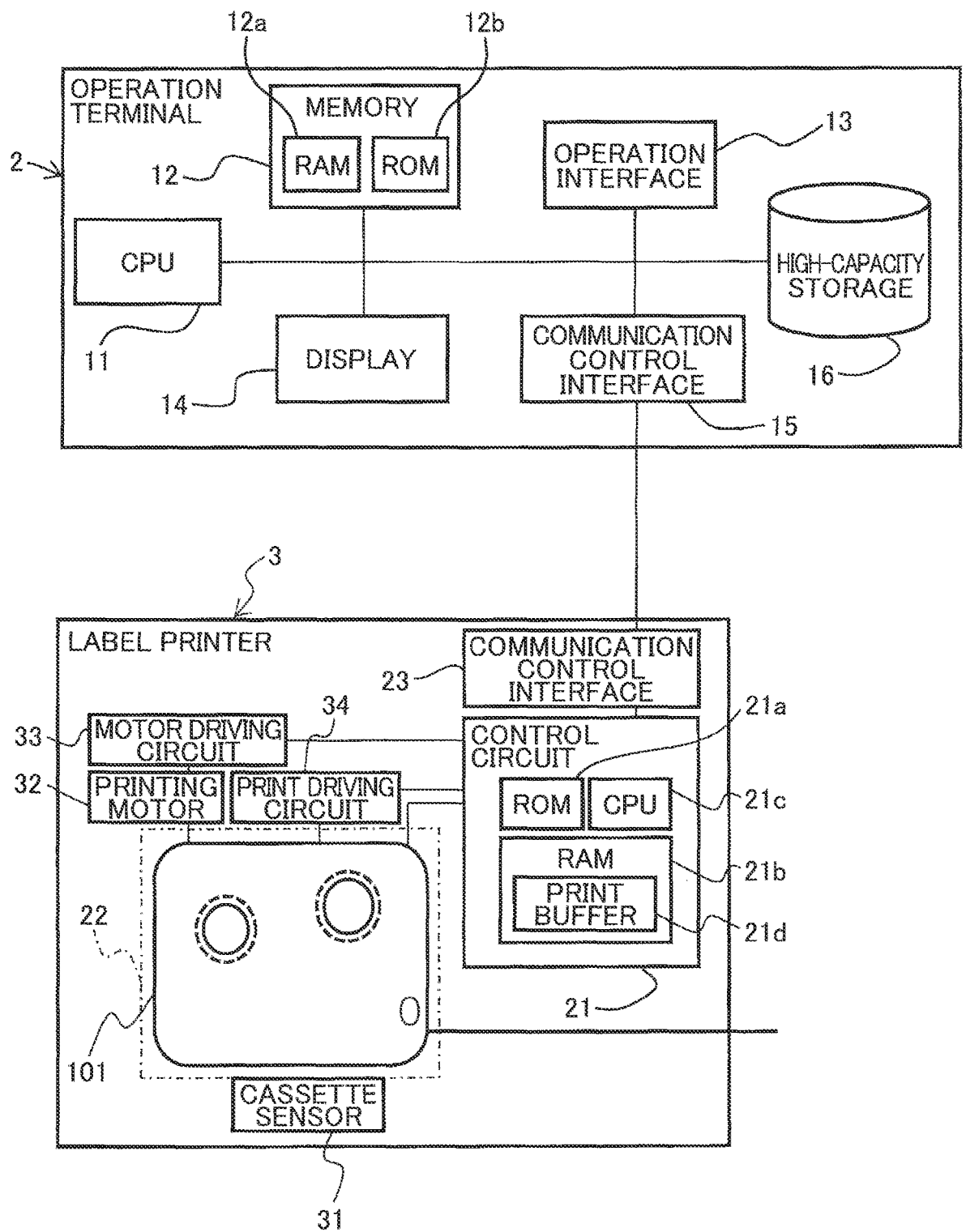
FIG. 2 is a block diagram illustrating functional configurations of an operation terminal and a label printer.

As shown in FIG. 2, the operation terminal 2 is provided with a CPU 11, a memory 12, an operation interface 13, a display 14, a communication control interface 15, and a high-capacity storage 16. The memory 12 is configured of a RAM 12a, a ROM 12b, and the like, for example. The CPU 11 is an example of a controller.

The user inputs instructions and information on the operation interface 13. The display 14 displays various information and messages. Note that the operation interface 13 and the display 14 may be configured as a touchscreen that possesses functions of both the operation interface 13 and the display 14. The communication control interface 15 controls the exchange of signals with the label printer 3.

The high-capacity storage 16 stores various programs and information. The ROM 12b of the memory 12 stores a print control program for controlling the CPU 11 to execute the various steps in the flowcharts and sequence diagrams of FIGS. 8 and 17-23 described later. As an alternative, the print control program may be stored in the high-capacity storage 16. Note that the high-capacity storage 16 is not limited to a built-in memory, but may be a suitable external memory such as an SD Card.

The CPU 11 uses the temporary storage function of the RAM 12a to exchange various signals with the various processes and the label printer 3 according to programs pre-stored in the ROM 12b and the high-capacity storage 16.

Label Printer

As shown in FIG. 2, the label printer 3 has a control circuit 21, a cassette holder 22, a cassette sensor 31, a communication control interface 23, a printing motor 32, a motor driving circuit 33, and a print driving circuit 34. The cassette holder 22 is an example of a mount portion. The communication control interface 23 is an example of a communication interface. The CPU 21 is an example of a controller.

A cassette 101 is detachably mounted in the cassette holder 22. The cassette sensor 31 is disposed in the cassette holder 22 for detecting the type of the cassette 101 according to a suitable method known in the art. The method of detection may be mechanical detection or optical or magnetic detection. The type of cassette 101 is correlated to the type of a cover film 104, an ink ribbon 106, a base tape 102, and the like in advance. Hence, detecting the type of the cassette 101 with the cassette sensor 31 is equivalent to detecting the attributes of the cover film 104, the ink ribbon 106, the base tape 102, and the like, that is, the tape width and color of a print label tape 110, the printing color of the ink ribbon 106, and the like.

The control circuit 21 is provided with a ROM 21a, a RAM 21b, and a CPU 21c. The RAM 21b is provided with a print buffer 21d. The label printer 3 can exchange information with the operation terminal 2 by connecting the control circuit 21 to the communication control interface 15 of the operation terminal 2 via the communication control interface 23. The ROM 21a stores a printing program for controlling the CPU 21c to execute each step in the flowcharts and sequence diagrams shown in FIGS. 9, 11, and 17-23 described later.

Cassette and Cassette Holder

Figure 3:
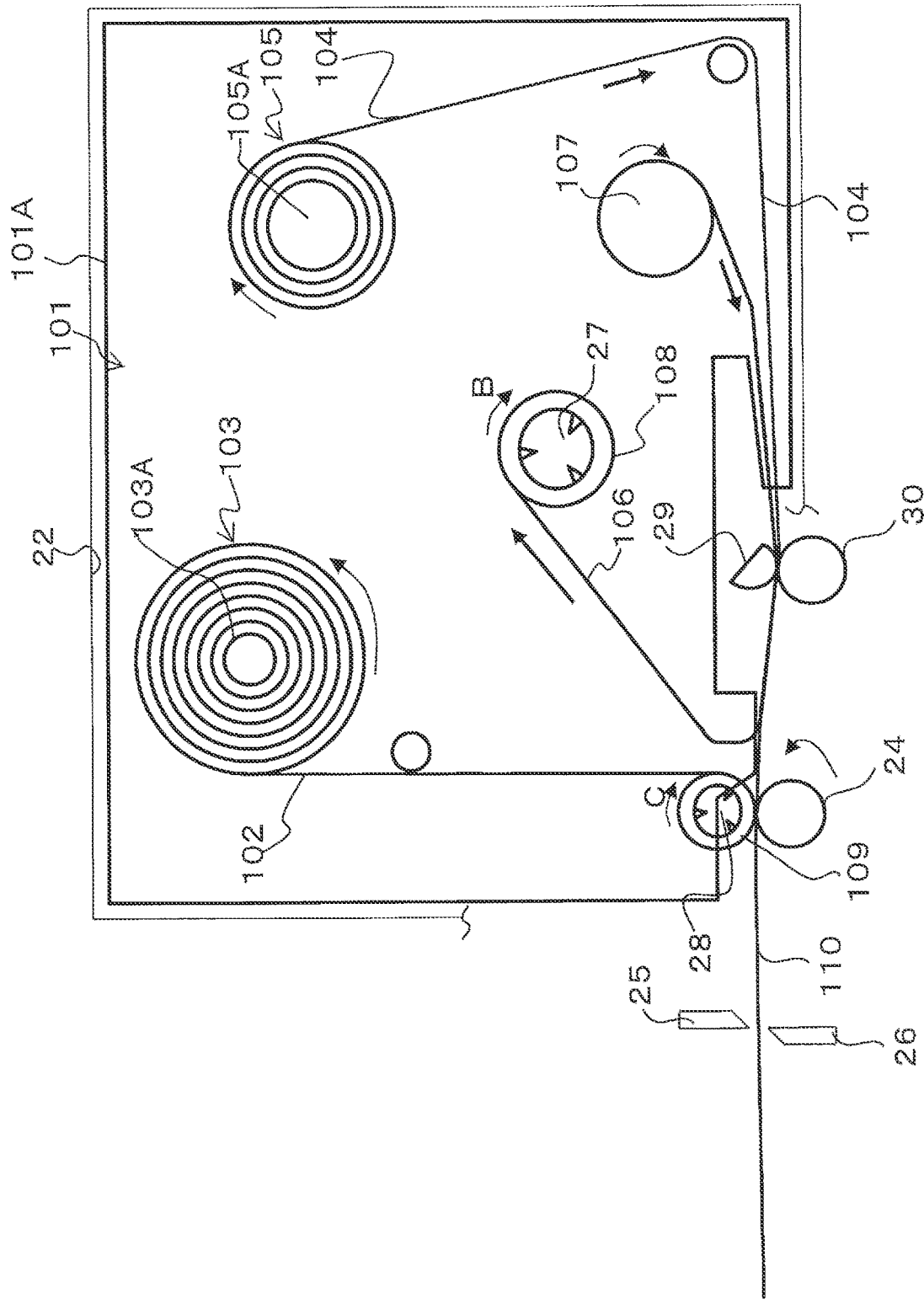
FIG. 3 is a schematic diagram illustrating configurations of a cassette and a cassette holder.

FIG. 3 shows a detailed structure of the cassette 101 and the related structure of the cassette holder 22. In FIG. 3, the cassette 101 has a housing 101A, a first roll 103, a second roll 105, a ribbon supply roll 107, a ribbon take-up roller 108, and a tape feed roller 109.

The first roll 103 includes a spool 103A rotatably supported in the housing 101A, and the base tape 102 wound around the spool 103A. The base tape 102 is configured of a bonding adhesive layer, a base layer, a mounting adhesive layer, and a release layer, for example. These layers are laminated sequentially in the stated order from the inward-facing side of the wound base tape 102 forming the first roll 103 toward the opposite side.

The second roll 105 includes a spool 105A rotatably supported in the housing 101A. The transparent cover film 104 having the same width as the base tape 102 is wound about the spool 105A. Note that, while depicted as concentric circles in the drawings for simplification, the first roll 103 and the second roll 105 are actually wound in a spiral shape.

The cover film 104, the base tape 102, and the like are indirectly mounted in the cassette holder 22 by mounting the cassette 101 in the cassette holder 22, as described above.

The ribbon supply roll 107 pays out the ink ribbon 106. The ribbon take-up roller 108 takes up the ink ribbon 106 that has been used for printing. Note that the ink ribbon 106 is unnecessary when the cover film 104 is a thermal tape that can produce a prescribed color when heated. The ink ribbon 106 and the cover film 104 are examples of a print medium.

The tape feed roller 109 is rotatably supported near a tape discharge portion of the cassette 101. The tape feed roller 109 bonds the base tape 102 to the cover film 104 with pressure to form the print label tape 110 while conveying the same. The cover film 104 is pressed by the tape feed roller 109 and a pressure roller 24 opposing the tape feed roller 109.

A ribbon take-up roller drive shaft 27 and a tape feed roller drive shaft 28 are provided in the cassette holder 22. The ribbon take-up roller drive shaft 27 is provided for taking up the portion of the ink ribbon 106 already used for printing. The tape feed roller drive shaft 28 is provided for conveying the print label tape 110 described above. The drive force of the printing motor 32 is transmitted to the ribbon take-up roller drive shaft 27 and the tape feed roller drive shaft 28, and the ribbon take-up roller 108 and the tape feed roller 109 are driven to rotate in association with the corresponding ribbon take-up roller drive shaft 27 and the tape feed roller drive shaft 28. The CPU 21c controls the drive of the printing motor 32 via the motor driving circuit 33.

The cassette holder 22 is also provided with a print head 29 that prints prescribed content on the cover film 104 as the cover film 104 is conveyed. The print head 29 is an example of a print portion.

A fixed blade 25 and a movable blade 26 are provided along the conveying path of the print label tape 110 on the downstream side of the tape feed roller 109 and the pressure roller 24. In cooperation with the fixed blade 25, the movable blade 26 cuts through the print label tape 110 in the thickness direction.

Outline of Label Printer Operations

With the label printer 3 having the above construction, the cover film 104 and the ink ribbon 106 become interposed between the print head 29 and a platen roller 30 opposing the print head 29 when the cassette 101 is mounted in the cassette holder 22. At the same time, the base tape 102 and the cover film 104 are interposed between the tape feed roller 109 and the pressure roller 24 opposing the tape feed roller 109. When the ribbon take-up roller 108 and the tape feed roller 109 are driven to rotate in synchronization in the directions indicated by the respective arrows B and C in FIG. 3, the pressure roller 24 and the platen roller 30 rotate. The base tape 102 is paid out from the first roll 103 and supplied to the tape feed roller 109. The cover film 104 is paid out from the second roll 105 while the print driving circuit 34 energizes a plurality of heating elements in the print head 29 to print on the cover film 104. The ribbon take-up roller drive shaft 27 drives the ribbon take-up roller 108 to take up ink ribbon 106 that was used for printing on the cover film 104.

The base tape 102 and the printed portion of the cover film 104 are integrally bonded between the tape feed roller 109 and the pressure roller 24 to form the print label tape 110, and the print label tape 110 is conveyed out of the cassette 101. The portion of the print label tape 110 conveyed out of the cassette 101 is cut off through the cooperative operations of the fixed blade 25 and the movable blade 26, producing a print label L.

Composite Labels

In the embodiment, a plurality of uniquely different print labels L created by the label printer 3 are overlaid in the thickness direction and bonded to each other. The bonded labels are then fixed in that state to a desired object. That is, different types of cassettes 101 are sequentially mounted in the cassette holder 22 of the label printer 3 to create uniquely different print labels L that are subsequently overlaid on each other. At this time, it is possible to create print labels L of different tape colors by selectively using different types of cassettes 101 provided with different types of base tapes 102 and cover films 104, for example. Similarly, it is possible to create print labels L while varying the color in which the print head 29 prints by selectively using different types of cassettes 101 having different types of ink ribbons 106. Note that at least one of the cover film 104 and the base tape 102 used for making the labels may be common if the ink ribbon 106 is varied. Alternatively, at least one of the cover film 104 and the ink ribbon 106 used for creating the labels may be common if the base tape 102 is varied. These cases are included in a concept to the use of different types of print media. As an example of this, a case of bonding together three different types of print labels L will be described with reference to FIGS. 4A-4D.

Figure 4A:
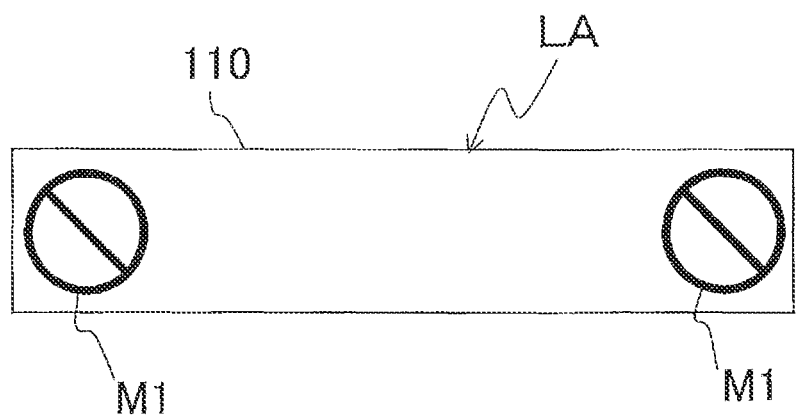
FIGS. 4A-4D are plan views respectively illustrating a top label, a middle label, a bottom label, and a composite label created by bonding these three labels.

FIG. 4A shows one print label LA that will form the topmost layer when the three print labels are overlaid. In this example, a prohibition mark M1 is formed on each longitudinal end of the print label LA cut from a transparent print label tape 110 to a prescribed length. Each prohibition mark M1 is red in color and has a circle with a diagonal line through the inner area therein.

Figure 4B:
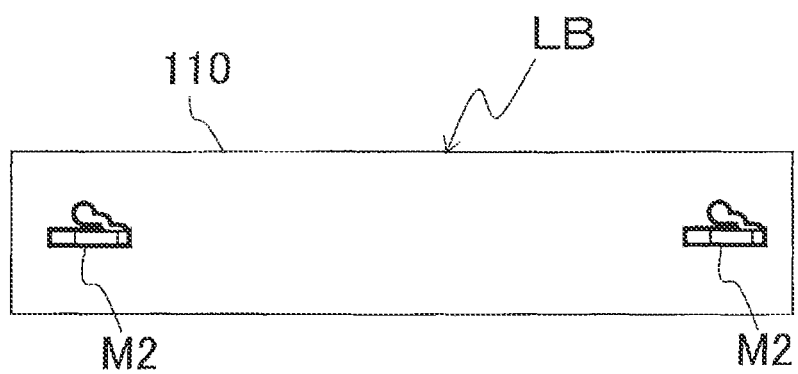

FIG. 4B shows another print label LB that will form the middle layer when the three print labels are overlaid. In this example, a cigarette icon M2 is formed on each longitudinal end of the print label LB that has been cut from a transparent print label tape 110 to the prescribed length. Each cigarette icon M2 is blue in color and depicts a smoking cigarette.

Figure 4C:
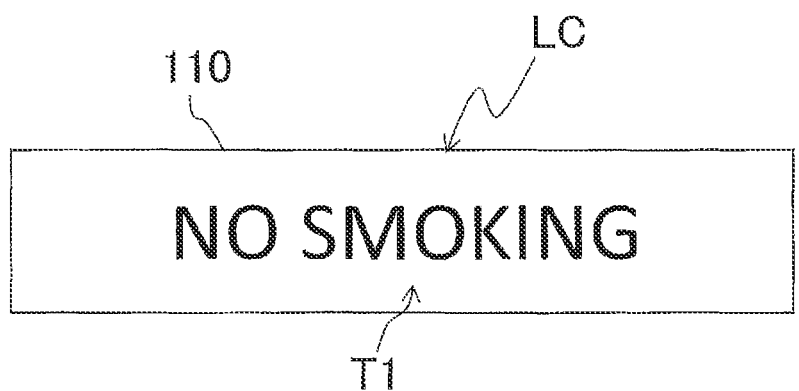
Figure 4D:
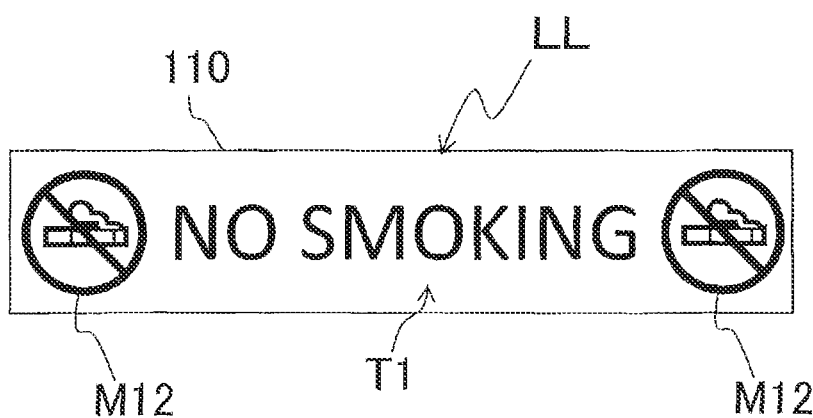

FIG. 4C shows another print label LC that will constitute the bottommost layer when the three print labels are overlaid. In this case, text T1 is formed in the longitudinal center region of the print label LC that has been cut from a white print label tape 110 to the prescribed length. The text T1 is "NO SMOKING" formed in black.

As described above, the print label tape 110 in this example is transparent for both the print label LA and the print label LB. Accordingly, by overlaying (bonding together) the print label LA, the print label LB, and the print label LC in the order described above, the print label LL shown in FIG. 4D is produced. Note that the print label LA, the print label LB, and the print label LC in this example all have the same width and same length. Hereinafter, the print label LL in the embodiment will be referred to as the "composite label LL." Further, the print label LA will be called the "top label LA," the print label LB will be called the "middle label LB," and the print label LC will be called the "bottom label LC."

As a result of overlaying the three print labels, the red prohibition marks M1 and the blue cigarette icons M2 on both longitudinal ends of the tape portions are overlapped to configure composite "no smoking" symbols M12 on the composite label LL. Further, the black text T1 is arranged between the two "no smoking" symbols M12.

In other words, a set of print data for creating the composite label LL is set for each of a plurality of layers to form a plurality of labels. In this example, a set of print data is set for each of three layers needed to form the top label LA, the middle label LB, and the bottom label LC, and three corresponding print images are formed in the respective layers.

Specifically, a set of print data for printing the top label LA having the prohibition mark M1 on both ends is provided for the topmost layer or first of the three layers; a set of print data for printing the middle label LB having the cigarette icon M2 on both ends is provided for the middle layer or second of the three layers; and a set of print data for printing the bottom label LC having the "NO SMOKING" text T1 constitutes the bottommost layer or third of the three layers. The prohibition marks M1 are formed on the top label LA as the print image for the first layer according to the set of print data for the first layer. The cigarette icons M2 are formed on the middle label LB as the print image for the second layer according to the set of print data for the second layer. The text T1 is formed on the bottom label LC as the print image for the third layer according to the set of print data for the third layer.

Feature of the Embodiment

One feature of the embodiment having the above configuration is the method of determining the order for creating print labels L when print images are formed with the label printer 3 based on a plurality of sets of print data to create a plurality of print labels L, as described above. Below, a case in which the top label LA, the middle label LB, and the bottom label LC described above are created on the label printer 3 as the plurality of uniquely different print labels L is described in detail. For convenience, the top label LA, the middle label LB, and the bottom label LC will be collectively referred to as the "labels LA-LC" in the following description.

Comparative Example

First, steps in a comparative example will be described with reference to FIGS. 5A-5J. In this example, a print label L is created according to the method described in Japanese Patent Application Publication No. 2014-814. To create the labels LA-LC, the operation terminal 2 must ultimately transmit to the label printer 3 all of the set of print data for the top label LA that includes the prohibition marks M1, the set of print data for the middle label LB that includes the cigarette icons M2, and the set of print data for the bottom label LC that includes the text T1.

In this example, it will be assumed that the cassette 101 for creating the top label LA is currently mounted in the label printer 3. The cassette 101 for creating the top label LA is provided with a transparent print label tape 110 and a red ink ribbon 106, as illustrated in FIG. 5A. For convenience, the cassette 101 used to create the top label LA will be called the "cassette A" in the following description. This notation will be used in all drawings.

In the technique described in Japanese Patent Application Publication No. 2014-814, labels are created in order of the bottom label LC constituting the bottommost layer, the middle label LB constituting the middle layer, and the top label LA constituting the topmost layer. Accordingly, the first set of data transmitted to the label printer 3 is a set of print data for the bottom label LC, as shown in FIG. 5B. Since the cassette A for printing the top label LA is currently mounted in the label printer 3, the user must replace cassettes, as shown in FIG. 5C. That is, the user removes the cassette A and mounts a cassette 101 for creating the bottom label LC, i.e., a cassette 101 provided with a white print label tape 110 and a black ink ribbon 106. Hereinafter, the cassette 101 for printing the bottom label LC will be called the "cassette C" for convenience. This notation will be used in all drawings.

After the cassette C is mounted in the label printer 3, the corresponding bottom label LC is created based on the set of print data for the bottom label LC transmitted from the operation terminal 2 to the label printer 3, as shown in FIG. 5D.

Since the middle label LB for the middle layer is the next label to be created, the user mounts a cassette 101 for creating the middle label LB in the label printer 3, i.e., a cassette 101 provided with a transparent print label tape 110 and a blue ink ribbon 106, as shown in FIG. 5E. Hereinafter, the cassette 101 for printing the middle label LB will be called the "cassette B" for convenience. This notation will be used in all drawings.

Thereafter, the set of print data for the middle label LB is transmitted from the operation terminal 2 to the label printer 3, as shown in FIG. 5F. Accordingly, the corresponding middle label LB is created, as shown in FIG. 5G.

Since the top label LA constituting the topmost layer is the final label to be created, the user mounts the cassette A in the label printer 3, as shown in FIG. 5H. Subsequently, the set of print data for the top label LA is transmitted from the operation terminal 2 to the label printer 3, as shown in FIG. 5I, whereby the corresponding top label LA is created, as shown in FIG. 5J.

Problems with the Comparative Example

In the comparative example, when the cassette A is mounted in the label printer 3, as described above, the user must remove the cassette A and mount the cassette C in its place in order to print the bottom label LC. Thereafter, the user must also remove the cassette C, mount the cassette B, print the middle label LB, remove the cassette B, mount the cassette A, and print the top label LA. Thus, the user is responsible for performing complex operations.

Overview of the Method According to the First Embodiment

To address the problem in the comparative example described above, the method in the embodiment first creates the one of the labels LA-LC that corresponds to the cassette currently mounted in the label printer 3 among the cassettes A-C, and thereafter successively creates the remaining labels LA-LC as the cassettes are exchanged. An example of this method will be described with reference to FIGS. 6A-6G.

One Example of the Method According to the First Embodiment

In the embodiment, the operation terminal 2 transmits, to the label printer 3, the set of print data for the top label LA that includes the prohibition marks M1, the set of print data for the middle label LB that includes the cigarette icons M2, and the set of print data for the bottom label LC that includes the text T1 all at once, as shown in FIG. 6A. Thus, the label printer 3 receives/acquires the sets of print data altogether.

Here, each set of print data is correlated with the type of ink ribbon 106 to be used when printing this set of print data, i.e., type information of the cassette 101 provided with the appropriate ink ribbon 106. To achieve this correlation, type information of the cassette 101 may be included in the set of print data, or the set of print data or a print image corresponding to the set of print data may be linked through a suitable method to type information of the cassette 101 stored in an appropriate separate location.

After acquiring all the sets of print data described above, the label printer 3 identifies type information of the cassette 101 correlated with each set of data. In other words, the label printer 3 identifies the cassette A as the cassette type correlated with the set of print data for the top label LA and determines that the cassette A should be used when printing based on that set of print data. Similarly, the label printer 3 identifies that the cassette B should be used when printing based on the set of print data for the middle label LB, and identifies that cassette C should be used when printing based on the set of print data for the bottom label LC.

In this example, the user mounts the cassette A in the label printer 3, as indicated in FIG. 6B. At this time, the label printer 3 determines that the cassette A was mounted based on detection results from the cassette sensor 31. Next, the label printer 3 specifies that the cassette A corresponding to (matching) the detection results is to be used from among the cassettes A, B, and C respectively correlated with the sets of print data for the top label LA, the middle label LB, and the bottom label LC acquired at a time. The method shown in FIGS. 6A-6G may be applicable to a case that the cassette A has been mounted before the time shown in FIG. 6A. In such case, the label printer 3 determines that the cassette A was mounted without waiting for the user's mount operation.

Based on the above specification, the label printer 3 creates the top label LA using the set of print data for the top label LA, as indicated in FIG. 6C. Hence, the top label LA that is correlated with the mounted cassette A is printed prior to printing the middle label LB and the bottom label LC correlated with the other cassettes B and C, respectively.

In this case, the cassette A, which is the first cassette to be used, is an example of the first medium type; the set of print data for the top label LA is an example of the first print data; and the prohibition marks M1 pertaining to the top label LA are an example of the first print image. Further, the cassette B, which is the next cassette to be used, is an example of the second medium type; the set of print data for the middle label LB is an example of the second print data; and the cigarette icons M2 pertaining to the middle label LB are an example of the second print image. Further, the cassette C, which is the next cassette to be used, is another example of the second medium type; the set of print data for the bottom label LC is another example of the second print data; and the text T1 pertaining to the bottom label LC is another example of the second print image.

In this example, the user removes the cassette A next and mounts cassette B, as indicated in FIG. 6D. As described above for cassette A, the label printer 3 again determines that the cassette B was mounted at this time and specifies the set of print data for the middle label LB as the set of print data to be used for printing with the cassette B. Based on this specification, the label printer 3 creates the middle label LB using the set of print data for the middle label LB, as shown in FIG. 6E.

Next, as indicated in FIG. 6F, the user removes the cassette B and mounts the cassette C. As in the above examples, the label printer 3 determines that the cassette C was mounted at this time and specifies the set of print data for the bottom label LC as the set of print data to be used for printing with cassette C. Based on this specification, the label printer 3 creates the bottom label LC using the set of print data for the bottom label LC, as indicated in FIG. 6G.

Another Example of the Method According to the First Embodiment

FIGS. 7A-7G show a different case from that described above. As indicated in FIG. 7A the operation terminal 2 first transmits the sets of print data for the top label LA, middle label LB, and bottom label LC to the label printer 3 all at once.

In this example, as indicated in FIG. 7B, the user subsequently mounts the cassette B in the label printer 3. As described in the previous example, the label printer 3 determines that cassette B was mounted at this time and specifies the set of print data for the middle label LB as the set of print data to be used for printing. Based on this specification, as indicated in FIG. 7C, the label printer 3 creates the middle label LB using the set of print data for the middle label LB. Hence, in this case the middle label LB correlated with the mounted cassette B is printed prior to printing the bottom label LC and the top label LA correlated with the other cassettes C and A, respectively.

In this case, the cassette B, which is the first cassette to be used, is an example of the first medium type; the set of print data for the middle label LB is an example of the first print data; and the cigarette icons M2 pertaining to the middle label LB are an example of the first print image. Further, the cassette C, which is the next cassette to be used, is an example of the second medium type; the set of print data for the bottom label LC is an example of the second print data; and the text T1 pertaining to the bottom label LC is an example of the second print image. Further, the cassette A, which is the next cassette to be used, is another example of the second medium type; the set of print data for the top label LA is another example of the second print data; and the prohibition marks M1 pertaining to the top label LA are another example of the second print image.

Subsequently, as indicated in FIG. 7D, the user removes the cassette B and mounts the cassette C. The label printer 3 determines that the cassette C was mounted and specifies the set of print data for the bottom label LC as the set of print data to be used for printing. Based on this specification, as indicated in FIG. 7E, the label printer 3 creates the bottom label LC using the set of print data for the bottom label LC.

Next, as indicated in FIG. 7F, the user removes the cassette C and mounts the cassette A. As described above, the label printer 3 determines that the cassette A was mounted and specifies the set of print data for the top label LA as the set of print data to be used for printing. Based on this specification, as shown in FIG. 7G, the label printer 3 creates the top label LA using the set of print data for the top label LA.

Hence, in the embodiment the label printer 3 prints the print label L correlated with the cassette 101 currently mounted in the label printer 3 prior to printing the print labels L correlated with the other cassettes 101.

Control Procedure

A sample control procedure executed by the CPU 11 of the operation terminal 2 and the CPU 21c of the label printer 3 to implement the method of the embodiment described above is shown in the flowcharts of FIGS. 8A, 8B, and 9. The CPU 11 of the operation terminal 2 executes the control procedure of FIGS. 8A and 8B based on the print control program according to the embodiment. The print control program is included in the programs stored in the ROM 12b. By executing this procedure, the CPU 11 implements the print control method described below. The CPU 21c of the label printer 3 executes the control procedure of FIG. 9 based on the printing program. The printing program is included in the programs stored in the ROM 21a. By executing this procedure, the CPU 21c implements the printing method described below.

Figure 8A:
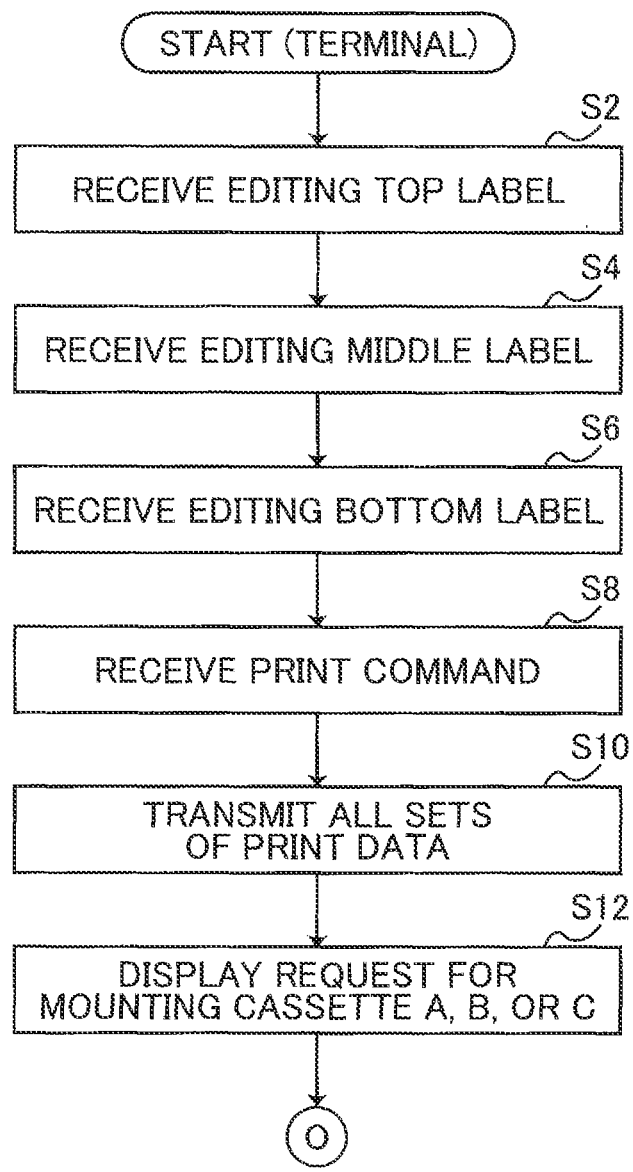
FIGS. 8A and 8B are flowcharts illustrating a control procedure executed by the operation terminal.

As shown in FIG. 8A, in S2 the CPU 11 receives editing operations via the operation interface 13 as the user edits the top label LA to the print content described above. Based on these editing operations, the CPU 11 generates the set of print data for the top label LA having red prohibition marks M1 on both ends, as in the example described above. Similarly, in S4 the CPU 11 receives editing operations via the operation interface 13 for the middle label LB according to the print content described above and, based on these editing operations, generates the set of print data for the middle label LB having blue cigarette icons M2 on both ends, as in the above example. Similarly, in S6 the CPU 11 receives editing operations via the operation interface 13 for the bottom label LC according to the print content described above and, based on these editing operations, generates the set of print data for the bottom label LC that includes the black "NO SMOKING" text T1, as described in the above example.

In S8 the CPU 11 receives a print command for printing the top label LA, middle label LB, and bottom label LC in response to the user performing appropriate operations on the operation interface 13. Upon receiving this print command, in S10 the CPU 11 transmits the sets of print data for the top label LA, middle label LB, and bottom label LC generated in S2, S4, and S6, respectively, to the label printer 3 all at once.

Upon transmitting the sets of print data to the label printer 3 in S10, in S12 the CPU 11 displays a request on the display 14 prompting the user to mount one of the cassettes A, B, and C in the label printer 3.

Figure 9:
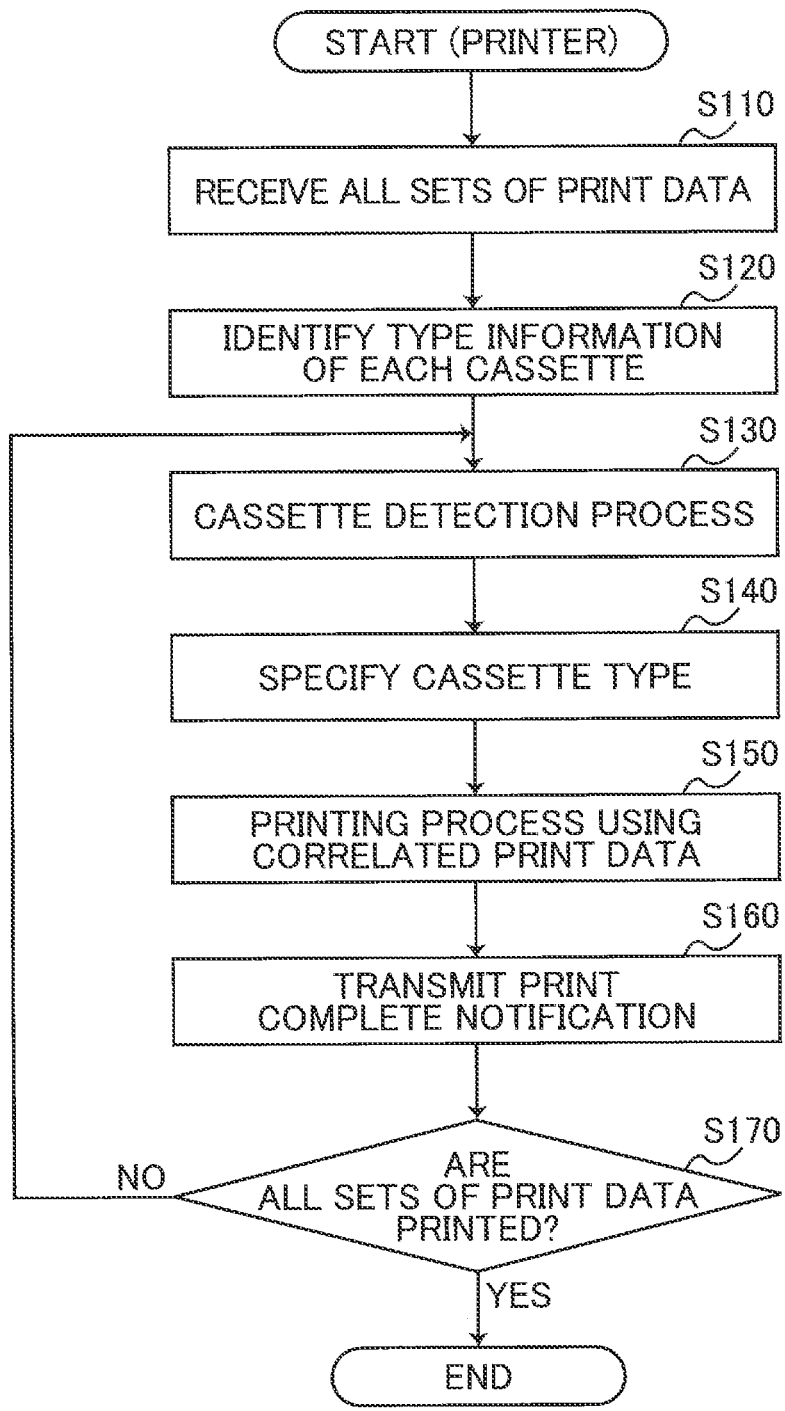
FIG. 9 is a flowchart illustrating a control procedure executed by the label printer.

In the meantime, in S110 of FIG. 9 the CPU 21c of the label printer 3 receives all of the sets of print data transmitted in S8, and specifically the set of print data for the top label LA, the set of print data for the middle label LB, and the set of print data for the bottom label LC. The process of S10 is an example of a data acquisition process.

In S120 the CPU 21c identifies the type information of the cassette 101 correlated with each set of print data received in S110. Thus, the CPU 21c identifies the cassette A correlated with the set of print data for the top label LA, identifies the cassette B correlated with the set of print data for the middle label LB, and identifies the cassette C correlated with the set of print data for the bottom label LC. As described above, correlations between the sets of print data (or print images represented by the sets of print data) and the cassette type information may be established by directly including identification information in the set of print data as the cassette type information. The identification information may indicate the model of the corresponding cassette 101 and/or a unique number for the corresponding cassette 101, for example. Alternatively, each set of print data or a print image corresponding to the set of print data may be linked to (correlated with) type information of the cassette 101 stored in a suitable separate location through a suitable method.

Since the action of identifying the type of the cassette 101 in S120 is equivalent to identifying the types of the cover film 104, the ink ribbon 106, and the print label tape 110 in the cassette 101, the process executed in S120 is an example of the type identification process.

In S130 the CPU 21c performs a cassette detection process. Specifically, in response to the display of S12 (FIG. 8A) described above, the user mounts one of the cassettes A, B, and C in the cassette holder 22 of the label printer 3. At this time, the label printer 3 determines what cassette A, B, or C was mounted based on detection results from the cassette sensor 31. The cassette detection process may be performed after a prescribed time period elapses for waiting for mounting operation by the user to mount one of the cassettes A, B, and C on the label printer 3. The process of S130 is an example of the determination process. In S140 the CPU 21c specifies the cassette type corresponding to (matching) the detection results in S130, as the cassette type to be used from among the types of cassettes 101 which is identified in S120 for each set of print data. The CPU 21c also specifies the presently-mounted cassette 101 corresponding to the specified cassette type as the cassette to be used for printing. The CPU 21c further specifies the set of print data correlated with the specified cassette type. The process of S140 is an example of the specification process.

In S150 the CPU 21c executes a printing process for printing one of the top label LA, middle label LB, and bottom label LC using the specified set of print data correlated with the cassette type specified in S140.

After completing the print in S150 described above, in S160 the CPU 21c transmits a print complete notification for one of the top label LA, middle label LB, and bottom label LC printed in S150 to the operation terminal 2.

In S170 the CPU 21c determines whether printing has been completed for all the sets of print data received in S110, i.e., the sets of print data for the top label LA, middle label LB, and bottom label LC in this example. In a case that an unprinted set of print data remains (S170: NO), the CPU 21c returns to S130 and repeats the process from S130 to S160. Thus, in a case that the cassette A was the first cassette mounted in the label printer 3, for example, then the top label LA correlated with the cassette A is printed the first time the process in S150 is executed prior to printing the middle label LB and bottom label LC correlated with the other cassettes B and C. In a case that the cassette B is subsequently mounted in the label printer 3, then the second time the process in S150 is executed the CPU 21c prints the middle label LB correlated with the cassette B prior to printing the bottom label LC correlated with the remaining cassette C. Once printing has been completed for all the sets of print data by repeating the above process (S170: YES), the CPU 21c ends the process of FIG. 9.

Figure 8B:
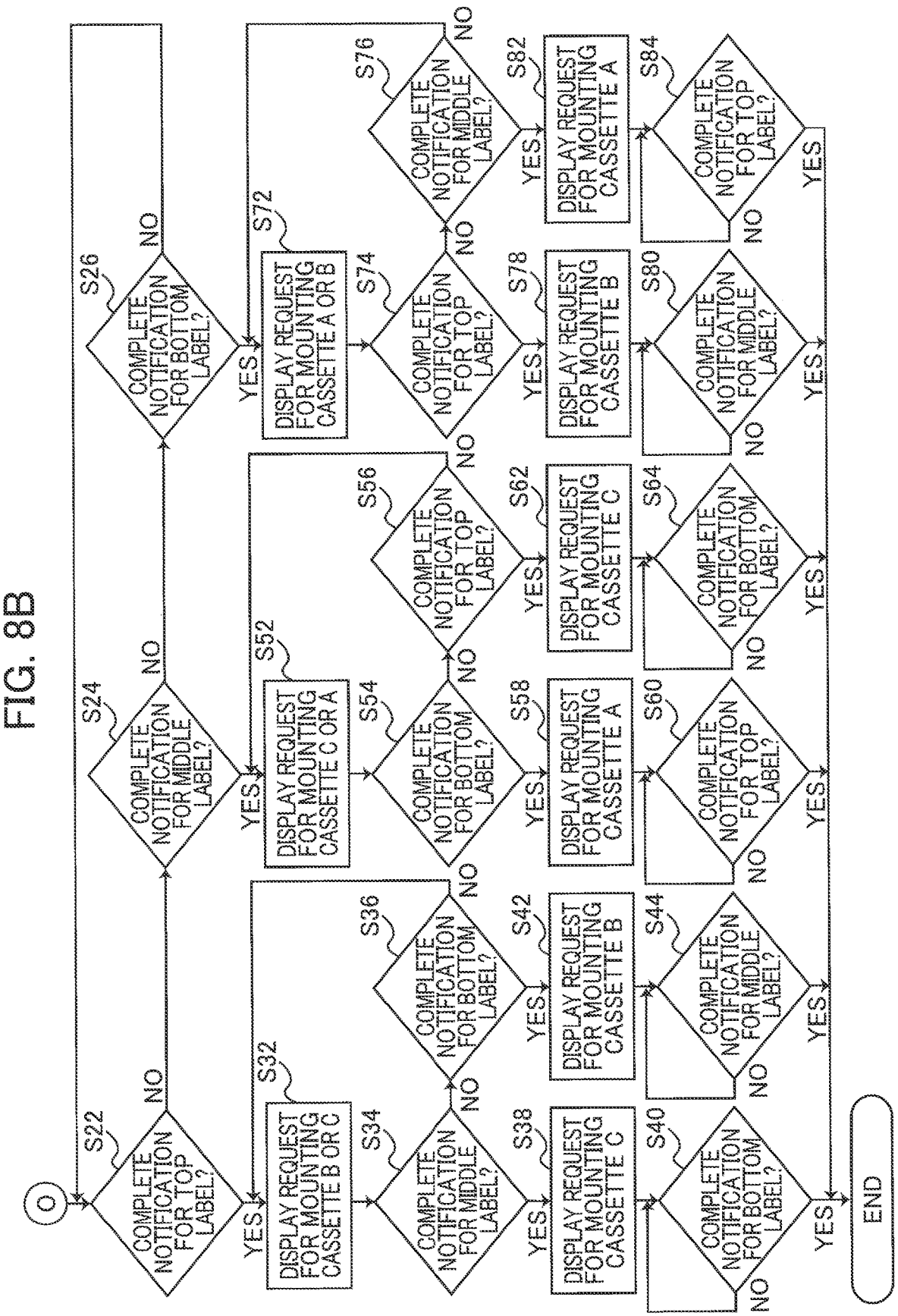

After completing the process of S12 (FIG. 8A), as shown in FIG. 8B the CPU 11 waits until the operation terminal 2 has received the print complete notification transmitted by the label printer 3 in S160 of FIG. 9. Through the processes of S22, S24, and S26, the CPU 11 determines whether the received print complete notification is for the top label LA, the middle label LB, or the bottom label LC. In a case that the operation terminal 2 received the print complete notification for the top label LA (S22: YES), the CPU 11 advances to S32 described later. In a case that the operation terminal 2 received a print complete notification for the middle label LB (S24: YES), the CPU 11 advances to S52 described later. In a case that the operation terminal 2 received the print complete notification for the bottom label LC (S26: YES), the CPU 11 advances to S72 described later. In a case that a print complete notification was not received for any of the labels LA-LC (S22: NO, S24: NO, and S26: NO), the CPU 11 returns to S22.

In a case that printing was completed for the top label LA using the cassette A (S22: YES), in S32 the CPU 11 displays a request on the display 14 prompting the user to mount one of the cassettes B and C in the label printer 3. When the user mounts either the cassette B or the cassette C in the label printer 3 in response to this display in S32, the label printer 3 prints the middle label LB or bottom label LC in S150 after completing the processes in S130 and S140 of FIG. 9. In S160 the CPU 21c transmits a print complete notification for the corresponding middle label LB or bottom label LC to the operation terminal 2.

Through the processes of S34 and S36, the CPU 11 determines whether the received print complete notification is for the middle label LB, or the bottom label LC. In a case that the operation terminal 2 received the print complete notification for the middle label LB (S34: YES), the CPU 21c advances to S38 described later. In a case that the operation terminal 2 received a print complete notification for the bottom label LC (S36: YES), the CPU 21c advances to S42 described later. In a case that the operation terminal 2 did not receive the print complete notification for either the middle label LB or bottom label LC (S34: NO and S36: NO), the CPU 21c returns to S32.

Thus, in a case that printing was completed for the middle label LB using cassette B (S34: YES), in S38 the CPU 11 displays a request on the display 14 prompting the user to mount the cassette C in the label printer 3. When the user mounts the cassette C in the label printer 3 in response to the display in S38, the label printer 3 prints the bottom label LC in S150 after the processes in S130 and S140 of FIG. 9 and in S160 transmits the print complete notification for the bottom label LC to the operation terminal 2. Accordingly, in S40 the CPU 11 determines that the print complete notification for the bottom label LC was received (S40: YES) and ends the process of FIGS. 8A and 8B.

FIG. 10A shows an example of the displays displayed on the display 14 in S12, S32, and S38 prompting the user to mount the cassettes when labels are created in the above order: top label LA→middle label LB→bottom label LC. Specifically, the left diagram in FIG. 10A represents a sample display on the display 14 for the process of S12. In this example, all of the cassette names "cassette A," "cassette B," and "cassette C" are displayed on the display 14, indicating to the user that it is OK to mount any of the cassettes A, B, and C.

The center diagram of FIG. 10A shows the content displayed on the display 14 in S32 after the user mounted the cassette A in response to the display shown in the left diagram in FIG. 10A, and printing was completed for the top label LA. In this example, the cassette names "cassette B" and "cassette C" are displayed while the cassette name "cassette A" for which printing was completed is grayed out. Thus, the display requests the user to mount either the cassette B or the cassette C.

The right diagram of FIG. 10A shows the content displayed on the display 14 in S38 after the user mounted the cassette B in response to the display shown in the center diagram in FIG. 10A, and printing was completed for the middle label LB. In this example, the cassette name "cassette C" is displayed while the cassette names "cassette A" and "cassette B" for which printing was completed are grayed out. Thus, the display requests the user to mount the cassette C.

Returning to FIG. 8B, in a case that printing was completed for the bottom label LC using the cassette C (S36: YES), in S42 the CPU 11 displays a request on the display 14 prompting the user to mount the cassette B. When the user mounts the cassette B in the label printer 3 in response to the display in S42, in S150 of FIG. 9, the label printer 3 prints the middle label LB after completing the processes in S130 and S140 and in S160 transmits the print complete notification for the middle label LB to the operation terminal 2. Accordingly, in S44 the CPU 11 determines that the print complete notification for the middle label LB was received (S44: YES), and subsequently ends the process of FIGS. 8A and 8B.

On the other hand, in a case that the CPU 11 determines in S24 that printing was completed for the middle label LB using the cassette B (S24: YES), in S52 the CPU 11 displays a request on the display 14 prompting the user to mount either the cassette C or the cassette A in the label printer 3. When the user mounts one of the cassette C and the cassette A in the label printer 3 in response to this display in S52, in S150 the label printer 3 prints the top label LA after completing steps S130 and S140, and in S160 transmits the print complete notification for the bottom label LC or the top label LA to the operation terminal 2.

Through the processes of S54 and S56, the CPU 11 determines whether the received print complete notification is for the bottom label LC, or the top label LA. In a case that the operation terminal 2 received the print complete notification for the bottom label LC (S54: YES), the CPU 11 advances to S58 described later. In a case that the operation terminal 2 received the print complete notification for the top label LA (S56: YES), the CPU 11 advances to S62 described later. However, in a case that the operation terminal 2 did not receive the print complete notification for the bottom label LC or the top label LA (S54: NO and S56: NO), the CPU 11 returns to S52.

When the CPU 11 determines in S54 that printing was completed for the bottom label LC using cassette C (S54: YES), in S58 the CPU 11 displays a request on the display 14 prompting the user to mount the cassette A in the label printer 3. When the user has mounted the cassette A in the label printer 3 in response to the display in S58, in S150 the label printer 3 prints the top label LA after completing steps S130 and S140 in FIG. 9 and in S160 transmits the print complete notification for the top label LA to the operation terminal 2. Accordingly, in S60 the CPU 11 determines that the print complete notification for the top label LA was received (S60: YES), and subsequently ends the process shown in FIGS. 8A and 8B.

FIG. 10B shows an example of displays on the display 14 in S12, S52, and S58 requesting the user to mount cassettes when labels are created in the sequence described above: middle label LB→bottom label LC→top label LA. The left diagram in FIG. 10B is identical to that in FIG. 10A and shows a sample of the display displayed on the display 14 in S12.

The center diagram of FIG. 10B shows the content displayed on the display 14 in S52 after the user mounted the cassette B in response to the display shown in the left diagram in FIG. 10B, and printing was completed for the middle label LB. In this example, the cassette names "cassette A" and "cassette C" are displayed while the cassette name "cassette B" for which printing was completed is grayed out. Thus, the display requests the user to mount either the cassette A or the cassette C.

The right diagram of FIG. 10B shows the content displayed on the display 14 in S58 after the user mounted the cassette C in response to the display shown in the center diagram in FIG. 10B, and printing was completed for the bottom label LC. In this example, the cassette name "cassette A" is displayed while the cassette names "cassette B" and "cassette C" for which printing was completed are grayed out. Thus, the display requests the user to mount the cassette A.

Returning to FIG. 8B, in a case that the CPU 11 determined in S56 that printing was completed for the top label LA using cassette A (S56: YES), in S62 the CPU 11 displays a request on the display 14 prompting the user to mount the cassette C in the label printer 3. Once the user has mounted the cassette C in the label printer 3 in response to the display in S62, in S150 the label printer 3 prints the bottom label LC after completing steps S130 and S140 of FIG. 9, and in S160 transmits the print complete notification for the bottom label LC to the operation terminal 2. Accordingly, in S64 the CPU 11 determines that the print complete notification for the bottom label LC was received (S64 YES), and subsequently ends the process of FIGS. 8A and 8B.

On the other hand, in a case that the CPU 11 determines in S26 that printing was completed for the bottom label LC using the cassette C (S26: YES), in S72 the CPU 11 displays a request on the display 14 prompting the user to mount the cassette A or the cassette B in the label printer 3. When the user has mounted either the cassette A or the cassette B in the label printer 3 in response to the display in S72, in S150 the label printer 3 prints the top label LA or the middle label LB after completing steps S130 and S140 of FIG. 9, and in S160 transmits the print complete notification for the top label LA or middle label LB to the operation terminal 2.

Through the processes of S74 and S76, the CPU 11 determines whether the received print complete notification is for the top label LA, or the middle label LB. In a case that the operation terminal 2 received the print complete notification for the top label LA (S74: YES), the CPU 11 advances to S78 described later. In a case that the print complete notification for the middle label LB was received (S76: YES), the CPU 11 advances to S82 described later. In a case that the operation terminal 2 did not receive the print complete notification for the top label LA or middle label LB (S74: NO and S76: NO), the CPU 11 returns to S72.

When the CPU 11 determines in S74 that printing was completed for the top label LA using the cassette A (S74: YES), in S78 the CPU 11 displays a request on the display 14 prompting the user to mount the cassette B in the label printer 3. When the user mounts the cassette B in the label printer 3 in response to the display in S78, in S150 the label printer 3 prints the middle label LB after steps S130 and S140 of FIG. 9, and in S160 transmits the print complete notification for the middle label LB to the operation terminal 2. Accordingly, in S80 the CPU 11 determines that the print complete notification for the middle label LB was received (S80: YES), and subsequently ends the process shown in FIGS. 8A and 8B.

However, in a case that the CPU 11 determines in S76 that printing was completed for the middle label LB using cassette B (S76: YES), in S82 the CPU 11 displays a request on the display 14 prompting the user to mount the cassette A in the label printer 3. Once the user has mounted the cassette A in the label printer 3 in response to the display in S82, in S150 the label printer 3 prints the top label LA after completing steps S130 and S140 of FIG. 9, and in S160 transmits the print complete notification for the top label LA to the operation terminal 2. Accordingly, in S84 the CPU 11 determines that the print complete notification for the top label LA was received (S84: YES), and subsequently ends the process of FIGS. 8A and 8B.

Effects of the Embodiment

In the embodiment described above, the label printer 3 acquires the set of print data for each of the top label LA, the middle label LB, and the bottom label LC in S110 and determines the type of the cassette 101 currently mounted in the cassette holder 22 in in S130. In S140 the label printer 3 specifies the type of the cassette corresponding to (matching) the determined type in S130 as the cassette type of the cassette to be used. In S150 the label printer 3 executes a print on the cover film 104. At this time, the order to be used for printing the set of print data for the top label LA, the set of print data for the middle label LB, and the set of print data for the bottom label LC is determined based on all the sets of print data acquired in S110 and the above determination results.

That is, in a case that the cassette A has been mounted in the cassette holder 22, the label printer 3 prints in the order: the set of print data for the top label LA→the set of print data for the middle label LB or the set of print data for the bottom label LC. Similarly, in a case that the cassette B has been mounted in the cassette holder 22, the label printer 3 prints in the order: the set of print data for the middle label LB→the set of print data for the bottom label LC or the set of print data for the top label LA. Further, in a case that the cassette C has been mounted in the cassette holder 22, the label printer 3 prints in the order: the set of print data for the bottom label LC→the set of print data for the top label LA or the set of print data for the middle label LB.

That is, the label printer 3 prints the print label L correlated with the cassette 101 currently mounted in the cassette holder 22 first, as described with reference to FIGS. 6A-6C and 7A-7C. Thus, the embodiment can eliminate the time and effort required for the user to replace the cassette 101 in the cassette holder 22 with the cassette 101 correlated with the set of print data, as described in the comparative example of FIGS. 5A-5C using the conventional method. Thus, the embodiment can reduce the user's operational burden.

In the embodiment, the label printer 3 determines the cassette type in S140 based on detection results from the cassette sensor 31, as described above. However, the user may be prompted to manually input the type of the mounted cassette 101 on the operation interface 13 and the label printer 3 may determine the cassette type based on this input.

A particular feature of the embodiment is that the label printer 3 acquires the set of print data for each of the top label LA, the middle label LB, and the bottom label LC from the operation terminal 2 via the communication control interface 23 in S110. Accordingly, even when a plurality of types of cassettes 101 is used for printing a plurality of print images for a plurality of layers of a label based on a plurality of sets of print data received from the operation terminal 2, the label printer 3 can reduce the operational load on the user by modifying the printing order according to the type of the cassette 101 currently mounted.

Another feature of the embodiment is that the label printer 3 transmits the print complete notification to the operation terminal 2 in S160 each time the label printer 3 completes printing based on the set of print data for one of the labels LA-LC. This print complete notification may be considered to function as a medium replacement notification signifying a need to replace the cassette 101 mounted in the label printer 3. As a result, the user can easily identify what type of cassette 101 has not yet been used for printing. Further, since the transmission timing of the print complete notification represents the replacement timing of the cassette 101, the user must wait until this print complete notification is transmitted, effectively preventing the user from accidentally replacing the cassette 101 too early.

Another feature of the embodiment is that the label printer 3 acquires the set of print data for the top label LA, the set of print data for the middle label LB, and the set of print data for the bottom label LC all at once in S110 and executes a print according to each set of print data. Hence, by acquiring all the sets of print data corresponding to all layers of the label altogether, the embodiment can complete the eventual creation of all the top label LA, the middle label LB, and the bottom label LC in a shorter amount of time than when the set of print data is acquired separately for each layer.

As described above, in the embodiment each set of print data is correlated in advance with one cassette type needed to print an image based on this set of print data. To achieve these correlations, cassette type information may be included in each set of print data, as described above. Alternatively, each set of print data or a print image corresponding to each set of print data may be correlated in some form with cassette type information existing as separate information from the print data.

After the label printer 3 has acquired all the sets of print data in S110, in S120 of the embodiment, the label printer 3 identifies the plurality of cassette types correlated with the plurality of sets of print data. In S140 the label printer 3 specifies the cassette 101 whose type corresponds to (matches) the cassette type determined in S130 from the plurality of cassette types identified in S120. In S150 the label printer 3 executes a print using the specified cassette 101 corresponding to the specified cassette type prior to printing with the remaining cassettes 101.

Thus, a particular feature of the embodiment is that the printing order is modified according to the type of the mounted cassette 101. When a cassette 101 is mounted in the label printer 3, the label printer 3 first executes a print based on the specified cassette type, thereby reliably lessening the user's operational burden.

Another feature of the embodiment is that the cassette sensor 31 detects the type of the cassette 101 mounted in the cassette holder 22. In S130 the label printer 3 determines the type of the cassette 101 based on this detection result and in S140 specifies the first cassette 101 whose type corresponds to (matches) the type of the cassette 101 determined in S130. Thus, the type of cassette can be easily specified using the cassette sensor 31. Having acquired all the sets of print data altogether, as described above, in S150 the label printer 3 initiates a print corresponding to the type of the specified cassette 101 as described above. Thus, when performing sequential prints in the embodiment by mounting, removing, and replacing cassettes 101 as described above, printing from the second cassettes 101 can be started by simply replacing the mounted cassette 101, as illustrated in FIGS. 6D-6G and 7D-7G. In other words, there is no need for the user to manually input the type of the mounted cassette 101 or to perform some operation to initiate printing each time the cassette 101 is replaced.

Variations of the First Embodiment

While the present disclosure has been described in detail with reference to specific embodiment thereof, it would be apparent to those skilled in the art that many modifications and variations may be made therein without departing from the scope of the invention. In the following description, like parts and components to those in the first embodiment described above are designated with the same reference numerals to avoid duplicating description.

(1-1) Standalone Label Printer

In the embodiment described above, the operation terminal 2 and the label printer 3 are connected and capable of communicating with each other. The method of the embodiment described above is achieved by the operation terminal 2 executing the process shown in FIGS. 8A and 8B and the label printer 3 executing the process shown in FIG. 9, but the present disclosure is not limited to this configuration. The present disclosure may be applied to a standalone label printer 3 that can be used without being connected to the operation terminal 2. This variation will describe one such case. In the present variation, the label printer 3 is provided with an operation interface (not shown) that allows the user to input operations suitably.

Figure 11:
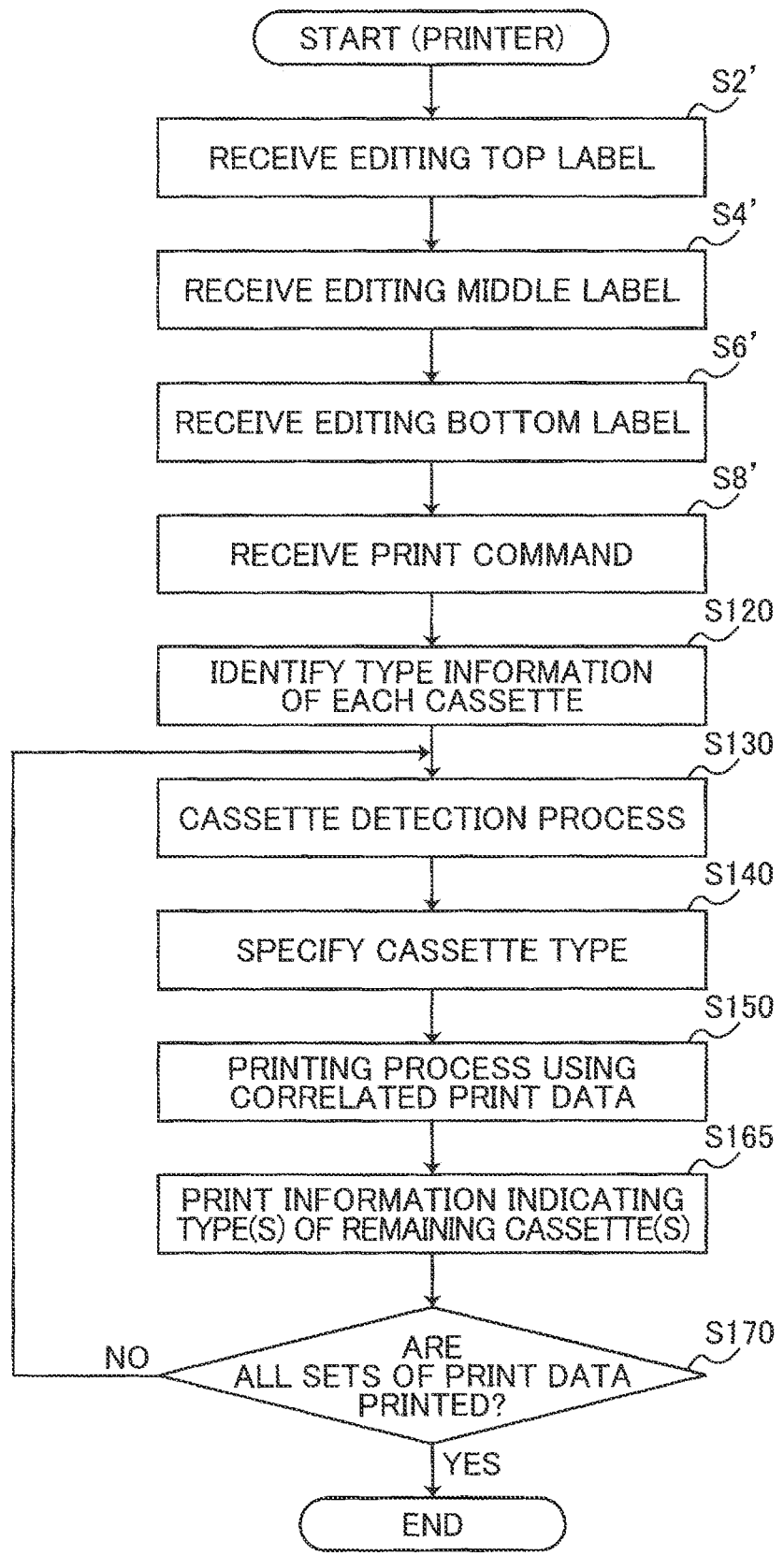
FIG. 11 is a flowchart illustrating a control procedure executed by a label printer according to a standalone label printer according to a variation (1-1) of the first embodiment.

The flowchart in FIG. 11 shows an example of a control procedure executed by the CPU 21c of the label printer 3 in the present variation. Steps similar to those in FIGS. 8 and 9 are designated with the same step numbers, and descriptions of these steps may be simplified or omitted as appropriate.

S2', S4', S6', and S8' in FIG. 11 correspond to S2, S4, S6, and S8 in FIG. 8A. As in the process of FIG. 8, in S2' the CPU 21c receives editing operations via the operation interface of the label printer 3 as the user edits the top label LA to the print content described above. Based on these editing operations, the CPU 21c generates a set of print data for the top label LA. Similarly, in S4' the CPU 21c receives editing operations via the operation interface for the middle label LB according to the print content described above and generates a set of print data for the middle label LB based on the editing operations. Similarly, in S6' the CPU 21c receives editing operations via the operation interface for editing the bottom label LC to the print content described above and generates a set of print data for the bottom label LC based on these editing operations. In this way, the CPU 21c acquires the set of print data for each of the top label LA, the middle label LB, and the bottom label LC. The processes of S2', S4' and S6' are examples of the data acquisition process.

In S8' the CPU 21c receives a print command for printing the top label LA, the middle label LB, and the bottom label LC in response to the user performing appropriate operations on the operation interface.

The subsequent steps S120-S150 are equivalent to the steps described above in FIG. 9 according to the first embodiment. Hence, in S120 the CPU 21c identifies type information of the cassette 101 correlated with each set of print data generated in S2', S4', and S6'. In the cassette detection process of S130, the CPU 21c determines that one of the cassettes A, B, and C was mounted based on detection results from the cassette sensor 31. In S140 the CPU 21c specifies the type of the cassette to be used from among the types of cassettes 101 identified in S120 so as to specify one set of print data correlated with the specified cassette type from among the sets of print data generated in S2', S4', and S6' corresponding to (matching) the determination results in S130. In S150 the CPU 21c executes a printing process using the specified set of print data correlated with the specified cassette type specified in S140.

In the variation of FIG. 11, step S165 is provided in place of step S160 in FIG. 9. The CPU 21c advances to S165 after completing the process of S150. In S165 the CPU 21c prints, on a right section continuous with the print label L created in S150, information indicating the type(s) of cassette(s) 101 that has (have) not yet been mounted in the label printer 3 at this time, i.e., the cassette type(s) other than the one or more types of the cassette 101 that have been used for printing in S150. In this example, the CPU 21c in particular indicates the one or more cassettes type that should be used next in sequence following the cassette 101 that was just used for creating the print label L in S150.

In the first embodiment described above, the CPU 11 of the operation terminal 2 displays the names of the cassettes 101 to be used next in sequence on the display 14 after using one cassette 101 to create a corresponding print label L, as described in S32, S38, S42, S52, S58, S62, S72, S78, and S82 of FIG. 8B and as illustrated in FIG. 10. However, when creating one print label L in this variation, the CPU 21c prints name(s) of cassette(s) 101 to be used next in sequence in the margin of the print label tape 110 constituting this print label L.

After completing the process in S165, the CPU 21c advances to S170. As in S170 of FIG. 9 described above, the CPU 21c determines whether printing has been completed for each set of print data. In a case that the CPU 21c determines that all sets of print data have been printed at this point (S170: YES), the CPU 21c ends the process of FIG. 11. However, in a case that there remains a set of print data that has not yet been printed (S170: NO), the CPU 21c returns to S130 and repeats the procedure described above. With this configuration, as in the embodiment described above, in a case that the cassette A is the first cassette mounted in the label printer 3, for example, then the label printer 3 prints the top label LA correlated with the cassette A when executing S150 for the first time prior to printing the middle label LB and the bottom label LC correlated with the other cassettes B and C. In a case that the cassette B is subsequently mounted in the label printer 3, then when the process of S150 is executed a second time the CPU 21c prints the middle label LB correlated with the cassette B prior to printing the bottom label LC correlated with the remaining cassette C.

Sample Appearances of Print Labels

Next, examples of the top label LA, the middle label LB, and the bottom label LC created in the above variation will be described with reference to FIGS. 12A-12D.

Figure 12A:
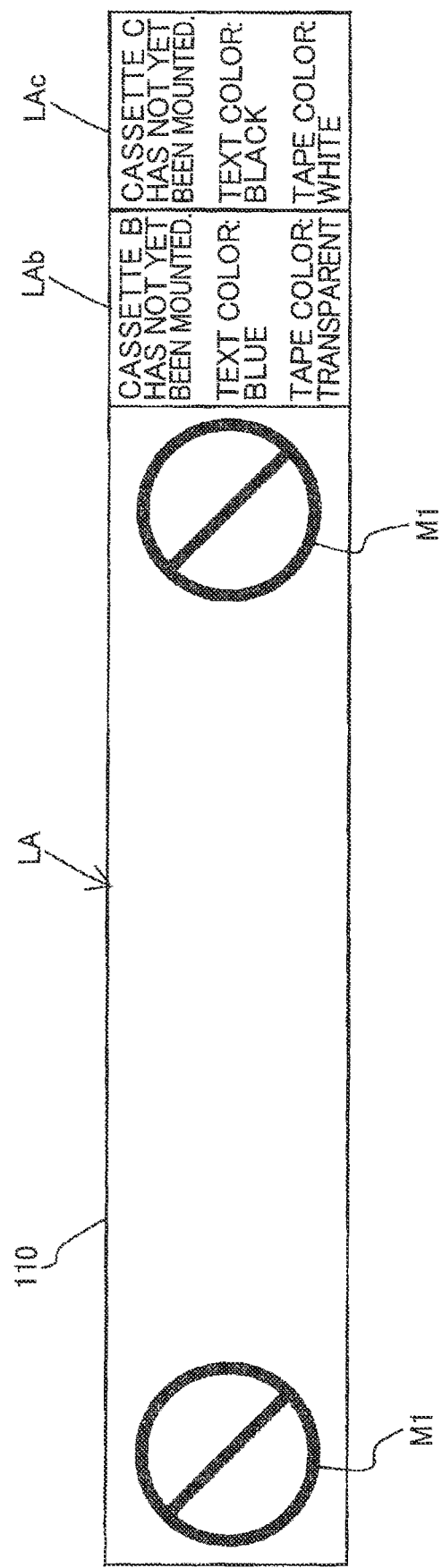

In this variation, when printing a top label LA identical to that in the first embodiment, the label printer 3 forms remaining cassette notation sections LAb and LAc immediately after the top label LA, as shown in FIG. 12A. The remaining cassette notation sections LAb and Lac means (corresponds to) completion of printing the top label LA using the cassette A and indicate that the cassettes B and C have not yet mounted and have not yet been used.

The remaining cassette notation section LAb is a printed section of the print label tape 110 continuous with the top label LA. The notation on the remaining cassette notation section LAb includes the type "Remaining cassette B" indicating a type of cassette that has not yet been mounted in the label printer 3, the tape color "Clear" of the print label tape 110 in the cassette B, and the text color "Blue" to be formed by the ink ribbon 106 in the cassette B. The notation of "Remaining cassette B", "Clear", and "Blue" is an example of a prescribed image.

The remaining cassette notation section LAc is a printed section of the print label tape 110 continuous with the remaining cassette notation section LAb. The notation on the remaining cassette notation section LAc includes the type "Remaining cassette C" indicating a type of cassette that has not yet been mounted in the label printer 3, the tape color "White" of the print label tape 110 in the cassette C, and the text color "Black" to be formed by the ink ribbon 106 in the cassette C. The notation of "Remaining cassette C", "White", and "Black" is another example of the prescribed image.

Figure 12B:
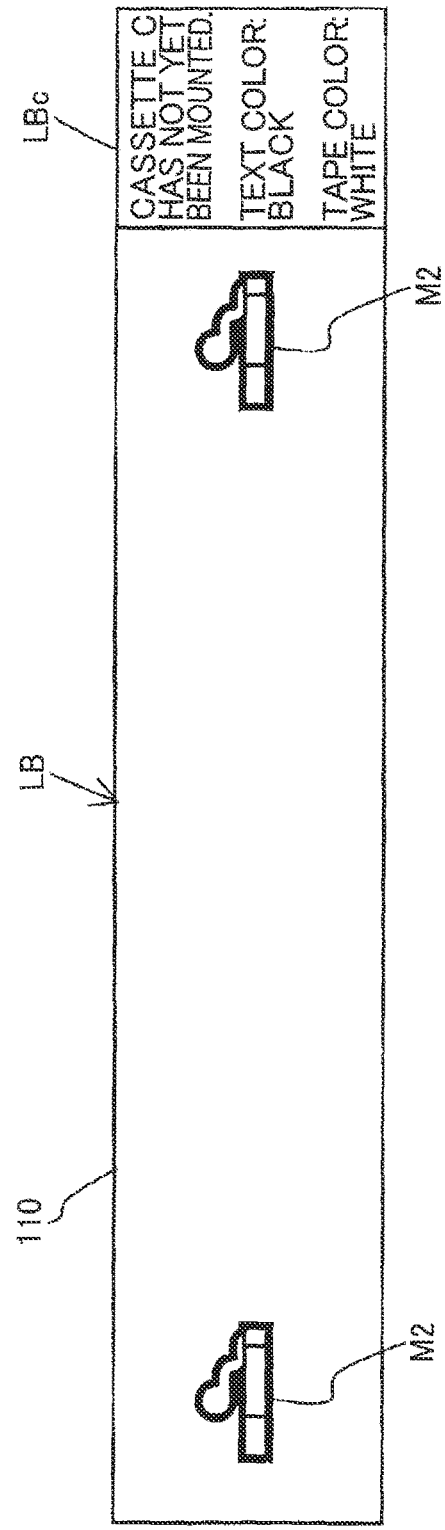

When the middle label LB identical to that in the first embodiment is printed next in this variation, a remaining cassette notation section LBc is formed following the middle label LB, as illustrated in FIG. 12B. The remaining cassette notation section LBc means (corresponds to) completion of printing the middle label LB using the cassette B after printing the top label LA by using the cassette A and indicates that cassette C has not yet been mounted in the label printer 3 and has not yet been used.

The remaining cassette notation section LBc is printed on a section of the print label tape 110 continuous with the middle label LB. The notation on the remaining cassette notation section LBc includes the type "Remaining cassette C" indicating a type of cassette that has not yet been mounted in the label printer 3, the tape color "White" of the print label tape 110 in the cassette C, and the text color "Black" to be formed by the ink ribbon 106 in the cassette C. The notation of "Remaining cassette C", "White", and "Black" is another example of the prescribed image.

As illustrated in FIG. 12C, the bottom label LC, which is created after the top label LA and the middle label LB, has the same appearance as the bottom label LC shown in FIG. 4C of the embodiment and is not provided with a remaining cassette notation section described above. As shown in FIG. 12D, this holds true for the composite label LL in which the top label LA, the middle label LB, and the bottom label LC are bonded together.

Effects of the Variation

The label printer 3 according to the variation described above obtains the same effects described in the embodiment.

As described above, in S2', S4', and S6' the label printer 3 acquires the set of print data for each of the top label LA, the middle label LB, and the bottom label LC, and determines the type of the cassette 101 currently mounted in the cassette holder 22 in S130. In S140 the label printer 3 specifies the type of the cassette corresponding to (matching) the determined type in S130 as the cassette type of the cassette to be used. In S150 the label printer 3 executes a print on the cover film 104. In S150 the label printer 3 executes a print on the cover film 104. At this time, the order to be used for printing the set of print data for the top label LA, the set of print data for the middle label LB, and the set of print data for the bottom label LC is determined based on all the sets of print data acquired in S110 and the above determination results.

That is, in a case that the cassette A has been mounted in the cassette holder 22, the label printer 3 prints in the order: the set of print data for the top label LA→the set of print data for the middle label LB or the set of print data for the bottom label LC. Similarly, in a case that the cassette B has been mounted in the cassette holder 22, the label printer 3 prints in the order: the set of print data for the middle label LB→the set of print data for the bottom label LC or the set of print data for the top label LA. Further, in a case that the cassette C has been mounted in the cassette holder 22, the label printer 3 prints in the order: the set of print data for the bottom label LC→the set of print data for the top label LA or the set of print data for the middle label LB.

That is, the label printer 3 initially prints the print label L correlated with the cassette 101 currently mounted in the cassette holder 22. Thus, this printing method can eliminate the time and effort required for the user to replace the cassette 101 in the cassette holder 22 with the cassette 101 correlated with the set of print data. Thus, the embodiment can reduce the user's operational burden.

Similarly to the embodiment, after the label printer 3 has acquired all the sets of print data through S2', S4', and S6', in S120 the label printer 3 identifies the plurality of cassette types correlated with the plurality of sets of print data. In S140 the label printer 3 specifies the cassette 101 corresponding to (matching) the cassette type determined in S130 from the plurality of cassette types identified in S120. In S150 the label printer 3 executes a print using the specified cassette 101 corresponding to the specified cassette type prior to printing with the remaining cassettes 101.

Thus, a particular feature of the embodiment is that the printing order is modified according to the type of the mounted cassette 101. When a cassette 101 is mounted in the label printer 3, the label printer 3 first executes a print based on the specified cassette type, thereby reliably lessening the user's operational burden.

Another feature of the embodiment is that the cassette sensor 31 detects the type of the cassette 101 mounted in the cassette holder 22. In S130 the label printer 3 determines the type of the cassette 101 based on this detection result and in S140 specifies the first cassette 101 corresponding to (matching) the type of the cassette 101 determined in S130. Thus, the type of cassette can be easily specified using the cassette sensor 31. Having acquired all the sets of print data altogether in S2', S4', and S6', in S150 the label printer 3 initiates a print corresponding to the type of the specified cassette 101 as described above. Thus, when performing sequential prints in this variation by mounting, removing, and replacing cassettes 101, printing from the second cassettes 101 can be started by simply replacing the mounted cassette 101. In other words, there is no need for the user to manually input the type of the mounted cassette 101 or to perform some operation to initiate printing each time the cassette 101 is replaced.

A particular feature of this variation is that the label printer 3 creates one print label L in S150 corresponding to any one set of print data among the sets of print data for the top label LA, the middle label LB, and the bottom label LC, and subsequently in S165 prints a prescribed image. The prescribed image printed at this time includes notation for the types of cassettes 101 needed to print using the sets of print data other than this first set of print data. In the above example, the prescribed image includes notation for the types of cassettes 101 that must be used next in order. In this way, the user can recognize the type of cassette 101 to mount next after the print label L was generated using the initially mounted cassette 101 based on the notations in the remaining cassette notation sections LAb, LAc, and LBc formed in the margin added to the print label L. Printing this notation in the margin of the label in this way is particularly effective when the display function of the label printer 3 is not very high in quality and cannot display such content as that displayed on the display 14 of the operation terminal 2 in FIGS. 10A and 10B.

Further, the label printer 3 may be provided with two printing modes, i.e., a mode for printing in the margin (the continuous section such as the cassette notation sections LAb, LAc, and LBc) as described above, and a mode for not printing in the margin. The user can set the printing mode to a desired mode.

Figure 1B:
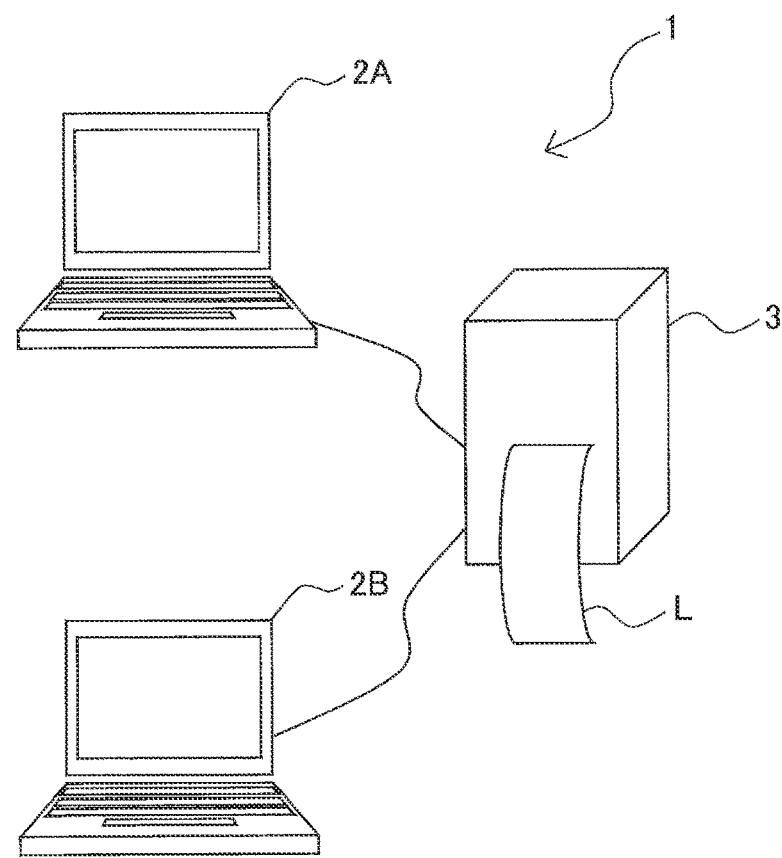

(1-2) Transmitting Data from a Plurality of Operation Terminals to a Single Label Printer FIG. 1B shows another variation of the first embodiment. In this variation, the printing system 1 includes two operation terminals 2A and 2B that are both connected to a single label printer 3 and are capable of exchanging information with the label printer 3 over a suitable network. The operation terminals 2A and 2B are respectively examples of first and second terminal devices. In this variation, one composite label is created on the label printer 3 based on sets of data transmitted from the operation terminal 2A and another composite label is created on the label printer 3 based on sets of data transmitted from the operation terminal 2B. These two composite labels will be described in detail with reference to FIGS. 13A-13H.

Structure of a Composite Label

First, a composite label LL1 created based on the sets of data transmitted from the operation terminal 2A will be described with reference to FIGS. 13A-13D. As with the composite label LL described in the embodiment, the composite label LL1 is created by sequentially bonding together a top label LA1, a middle label LB1, and a bottom label LC1 that are uniquely different.

In this example, the top label LA1 shown in FIG. 13A is equivalent to the top label LA shown in FIG. 4A. That is, the top label LA1 is provided with the red prohibition marks M1. The middle label LB1 shown in FIG. 13B is equivalent to the middle label LB shown in FIG. 4B and provided with the blue cigarette icons M2. The bottom label LC1 shown in FIG. 13C is identical to the bottom label LC shown in FIG. 4C and includes the black "NO SMOKING" text T1. Accordingly, the composite label LL1 includes the "no smoking" symbols M12 arranged at both longitudinal ends of the tape section, and the black text T1 arranged between the "no smoking" symbols M12.

In other words, the sets of print data for creating the composite label LL1 is set for a plurality of layers to form a plurality of labels. In this case, the three sets of print data are set for three layers needed to form the top label LA1, the middle label LB1, and the bottom label LC1 in the composite label LL1. Based on the sets of print data, three corresponding print images are formed in the respective layers.

Specifically, the set of print data for printing the top label LA1 provided with the prohibition marks M1 on both ends constitutes the first layer, the set of print data for printing the middle label LB1 provided with the cigarette icons M2 on both ends constitutes the second layer; and the set of print data for printing the bottom label LC1 provided with the "NO SMOKING" text T1 in the longitudinal center region constitutes the third layer. The prohibition marks M1 are formed on the top label LA1 as the print image for the first layer according to the set of print data for the first layer. The cigarette icons M2 are formed on the middle label LB1 as the print image for the second layer according to the set of print data for the second layer. The text T1 is formed on the bottom label LC1 as the print image for the third layer according to the set of print data for the third layer.

Next, a composite label LL2 created based on sets of print data transmitted from the operation terminal 2B will be described with reference to FIGS. 13E-13H. As in previous examples, the composite label LL2 is produced by sequentially bonding together a top label LA2, a middle label LD2, and a bottom label LC2 that are uniquely different from each other.

FIG. 13E shows the top label LA2. In this example, a recycling symbol M6 is formed on each longitudinal end of the top label LA2 cut from a transparent print label tape 110 to a prescribed length. Each recycling symbol M6 is red in color and depicted by three twisted arrows forming an equilateral triangle.

FIG. 13F shows the middle label LD2. In this example, an accentuation mark M7 is formed near the longitudinal center of the bottom label LC2 that has been cut from a transparent print label tape 110 to the prescribed length. The accentuation mark M7 is green in color with a star-like outline.

FIG. 13G shows the bottom label LC2. In this example, text T2 is formed near the center of the bottom label LC2 that has been cut from a white print label tape 110 to the prescribed length. The text T2 is "PLASTIC" formed in black.

As a result of overlaying the three labels described above, the red recycling symbols M6 are arranged on both longitudinal ends of the composite label LL2 and the green accentuation mark M7 and the black text T2 are overlapped to configure a composite alert text MT between the recycling symbols M6.

In other words, the sets of print data for creating the top label LA2 are set for a plurality of layers to form a plurality of labels. In this example, the sets of print data are set for three layers needed to form the top label LA2, the middle label LD2, and the bottom label LC2, and three corresponding print images are formed in the respective layers.

Specifically, the set of print data for printing the top label LA2 provided with the recycling symbols M6 on both ends constitutes the topmost layer or first of the three layers; the set of print data for forming the middle label LD2 provided with the accentuation mark M7 in center thereof constitutes the middle layer or second of the three layers; and the set of print data for forming the bottom label LC2 provided with the "PLASTIC" text T2 constitutes the bottommost layer or third of the three layers. The recycling symbols M6 are formed on the top label LA2 as the print image for the first layer according to the set of print data for the first layer. The accentuation mark M7 is formed on the middle label LD2 as the print image for the second layer according to the set of print data for the second layer. The text T2 is formed on the bottom label LC2 as the print image for the third layer according to the set of print data for the third layer.

Method According to the Present Variation

In this variation, when creating the composite labels LL1 and LL2 based on the sets of print data transmitted from the operation terminals 2A and 2B respectively, the label printer 3 devises a printing sequence based on the commonality of sets of print data to create the labels more efficiently. One example of this method according to the present variation will be described with reference to FIGS. 14A-15D.

As shown in FIG. 14A, the operation terminal 2A transmits the set of print data for the top label LA1 that includes the prohibition marks M1; the set of print data for the middle label LB1 that includes the cigarette icons M2; and the set of print data for the bottom label LC1 that includes the text T1 altogether to the label printer 3. Thus, the label printer 3 receives/acquires these three sets of print data altogether.

Additionally, the operation terminal 2B transmits the set of print data for the top label LA2 that includes the recycling symbols M6; the set of print data for the middle label LD2 that includes the accentuation mark M7; and the set of print data for the bottom label LC2 that includes the text T2 to the label printer 3 altogether. Thus, the label printer 3 receives/acquires these three sets of print data altogether.

Here, each set of print data is correlated with type information of a corresponding cassette 101, as described earlier. After acquiring the above sets of print data altogether, the label printer 3 identifies type information of the cassette 101 correlated with each set of print data.

In other words, the label printer 3 identifies the cassette A having a red printing color and a transparent tape color as the cassette to be used when printing based on the set of print data for the top label LA1. Similarly, the label printer 3 identifies the cassette B having a blue printing color and a transparent tape color as the cassette to be used when printing based on the set of print data for the middle label LB1 and identifies the cassette C having a black printing color and a white tape color as the cassette to be used when printing based on the set of print data for the bottom label LC1.

Similarly, the label printer 3 identifies the cassette A with the red printing color and transparent tape color as the cassette to be used when printing based on the set of print data for the top label LA2, identifies the cassette D having a green printing color and a transparent tape color as the cassette to be used when printing based on the set of print data for the middle label LD2, and identifies the cassette C with the black printing color and the white tape color as the cassette to be used when printing based on the set of print data for the bottom label LC2.

In this example, the user then mounts the cassette A in the label printer 3, as indicated in FIG. 14B. When the cassette A is mounted, the label printer 3 determines that the cassette A was mounted based on detection results from the cassette sensor 31. The method shown in FIGS. 14A-15G may be applicable to a case that the cassette A has been mounted before the time shown in FIG. 14A. In such case, the label printer 3 determines that the cassette A was mounted without waiting for the user's mount operation.

First, with respect to the sets of print data transmitted from the operation terminal 2A, the label printer 3 specifies the cassette A as the cassette to be used according to (matching) the detection results from among the cassette A, the cassette B, and the cassette C respectively correlated with the sets of print data for the top label LA1, the middle label LB1, and the bottom label LC1 acquired altogether from the operation terminal 2A. The label printer 3 specifies the set of print data for the top label LA1 as the set of print data to be used for printing with the cassette A. Based on the above specifications, the label printer 3 creates the top label LA1 using the set of print data for the top label LA1, as indicated in FIG. 4C.

Next, with respect to the sets of print data transmitted from the operation terminal 2B, the label printer 3 also specifies the cassette A as the cassette to be used according to (matching) the detection results from among the cassettes A, D, and C respectively correlated with the sets of print data for the top label LA2, the middle label LD2, and the bottom label LC2 acquired altogether from the operation terminal 2B. The label printer 3 specifies the set of print data for the top label LA2 as the set of print data to be used for printing with the cassette A. Based on the specifications, the label printer 3 creates the top label LA2 using the set of print data for the top label LA2.

In this case, the top labels LA1 and LA2 correlated with the mounted cassette A are printed prior to printing the middle label LB1, the bottom labels LC1 and LC2, and the middle label LD2 correlated with the other cassettes B, C, and D described later.

In this case, the cassette A used precedingly is an example of a third medium type. The set of print data for the top label LA1 is an example of third print data. The prohibition marks M1 related to the top label LA1 is an example of a third print image. The set of print data for the top label LA2 is an example of fifth print data. The recycling symbols M6 related to the top label LA2 is an example of a fifth print image.

The cassette B used subsequently is an example of a fourth medium type. The set of print data for the middle label LB1 is an example of fourth print data. The cigarette icons M2 related to the middle label LB1 is an example of a fourth print image.

The cassette D used subsequently is an example of a fifth medium type. The set of print data for the middle label LD2 is an example of sixth print data. The accentuation mark M7 related to the middle label LD2 is an example of a sixth print image.

Figure 15A:
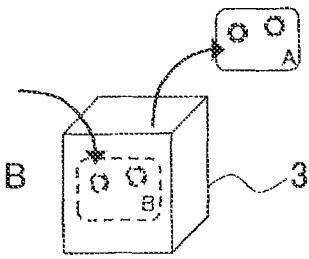
FIGS. 15A-15G are explanation diagrams illustrating a remaining part of the method shown in FIGS. 14A-14D.
Figure 15B:
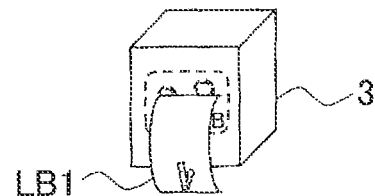

Next, as indicated in FIG. 15A, the user removes the cassette A and mounts the cassette B in the cassette holder 22 in this example. As described above for the cassette A, the label printer 3 determines that the cassette B was mounted, specifies the cassette B as the cassette to be used, and specifies the set of print data for the middle label LB1 as the set of print data to be used for printing with the cassette B. Based on this specifications, the label printer 3 creates the middle label LB1 using the print data for the middle label LB1, as indicated in FIG. 15B.

Figure 15C:
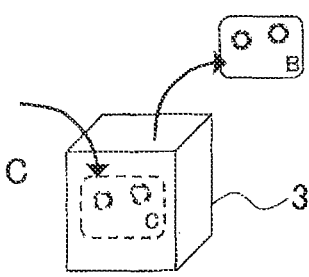
Figure 15D:
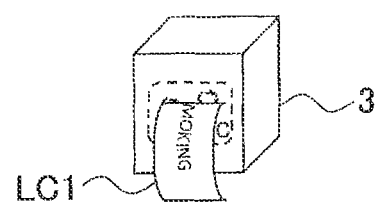
Figure 15E:
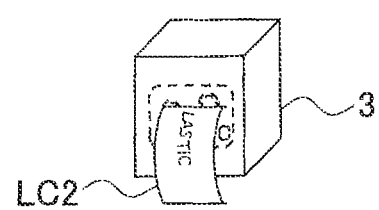

Next, as indicated in FIG. 15C, the user removes the cassette B and mounts the cassette C in the cassette holder 22. As in the above examples, the label printer 3 determines that the cassette C was mounted, specifies the cassette C as the cassette to be used, and specifies the set of print data for the bottom label LC1 and the set of print data for the bottom label LC2 as the sets of print data to be used for printing. Based on these specifications, as indicated in FIG. 15D the label printer 3 first creates the bottom label LC1 using the set of print data for the bottom label LC1, and as indicated in FIG. 15E the label printer 3 subsequently creates the bottom label LC2 using the print data for the bottom label LC2.

Figure 15F:
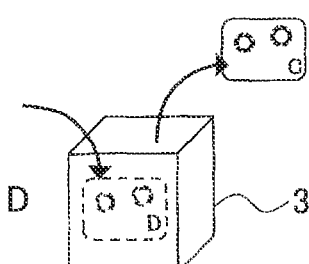
Figure 15G:
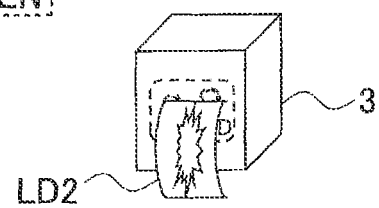

Next, as indicated in FIG. 15F the user removes the cassette C and mounts the cassette D in the cassette holder 22. As in the above examples, the label printer 3 determines that the cassette D was mounted, specifies the cassette D as the cassette to be used, and specifies the set of print data for the middle label LD2 as the set of print data to be used for printing with cassette D. Based on the specification, the label printer 3 creates the middle label LD2 using the print data for the middle label LD2, as indicated in FIG. 15G.

The CPU 21c of the label printer 3 executes the above method according to the flowchart in FIG. 9 described above. However, in S150 of this variation, the CPU 21c in some cases may create labels based on both the set of print data received from the operation terminal 2A and the set of print data received from the operation terminal 2B. In the example described above, the CPU 21c creates the top labels LA1 and LA2 when the cassette A is mounted and creates the bottom labels LC1 and LC2 when the cassette C is mounted.

Effects of the Variation

In the present variation, the label printer 3 acquires a plurality of sets of print data from each of a plurality of terminal devices in the process of S110 in FIG. 9. In this example, the label printer 3 acquires the sets of print data from each of the operation terminal 2A and operation terminal 2B. Specifically, in the above example, the label printer 3 acquires the sets of print data for the top label LA1, middle label LB1, and bottom label LC1 from the operation terminal 2A and acquires the sets of print data for the top label LA2, middle label LD2, and bottom label LC2 from the operation terminal 2B.

As described above in this variation, in a case that a common cassette type is correlated with the sets of print data acquired from separate operation terminals 2A and 2B and the currently-mounted the cassette 101 is that common cassette type, the label printer 3 executes prints using this common cassette 101 prior to executing other prints. In other words, when the cassette A is mounted in the label printer 3 in this example, the label printer 3 consecutively prints the top label LA1 based on the set of print data for the top label LA1 and the top label LA2 based on the set of print data for the top label LA2. Thereafter, the label printer 3 prints the middle label LB1 based on the print data for the middle label LB1 and prints the middle label LD2 based on the set of print data for the middle label LD2.

This method requires less time and effort from the user than a method of printing all the sets of print data for the operation terminal 2A and subsequently printing all the sets of print data for the operation terminal 2B, for example. That is, in the latter case the user must replace the cassettes 101 five times when performing the sequence: print top label LA1 with print data for the top label LA1→print middle label LB1 with print data for the middle label LB1→print bottom label LC1 with print data for the bottom label LC1→print top label LA2 with print data for the top label LA2→print middle label LD2 with print data for the middle label LD2→print bottom label LC2 with print data for the bottom label LC2. In other words, the user's operations in this case are: mount the cassette A→replace with the cassette B→replace with the cassette C→replace with the cassette A→replace with the cassette D→replace with the cassette C.

In the present variation described above, on the other hand, the user need only replace the cassettes three times in the following sequence: use the cassette A to print the top label LA1 with the set of print data for the top label LA1→continue using cassette A to print the top label LA2 using the set of print data for the top label LA2→replace with the cassette B and print the middle label LB1 with the set of print data for the middle label LB1→replace with the cassette C and print the bottom label LC1 with the set of print data for the bottom label LC1→continue using the cassette C to print the bottom label LC2 with the set of print data for the bottom label LC2→replace with the cassette D to print the middle label LD2 with the set of print data for the middle label LD2.

Thus, in a case that a common type of cassette 101 is correlated with more than one set of print data acquired from a plurality of operation terminals 2, the label printer 3 of the present variation uses the devised printing order that reduces the number of times that the user needs to replace the cassettes 101, thereby reducing the user's time and effort.

The method of the present variation described above is applicable in a case that the label printer 3 acquires the sets of print data from a single operation terminal 2 for creating a plurality of composite labels of the same type. An example of such a case is a case to create two composite labels LL configured of the top label LA, the middle label LB, and the bottom label LC described in the embodiment with reference to FIGS. 4A-4C. In this case, the method of the present variation can limit the number of cassette replacements to two with the sequence: use the cassette A to print one top label LA→continue using the cassette A to print a second top label LA→replace with the cassette B to print one middle label LB→continue using the cassette B to print a second middle label LB→replace with the cassette C to print one bottom label LC→continue using the cassette C to print a second bottom label LC.

Second Embodiment

Next, a second embodiment of the present disclosure will be described. In the second embodiment, the operation terminal 2 does not transmit a plurality of sets of print data to the label printer 3 all at once as in the first embodiment described above, but rather transmits each set of print data corresponding to (correlated with) the type of the cassette 101 mounted in the label printer 3. In the following description, like parts and components to those in the first embodiment and its variations described above are designated with the same reference numerals to avoid duplicating description.

The overall structure of the printing system according to the second embodiment is identical to that shown in FIG. 1A described above. Here, an example of creating a composite label on this printing system by bonding together two different print labels L will be described with reference to FIGS. 16A-16C, which correspond partially to FIGS. 4A-4D described above.

Figure 16A:
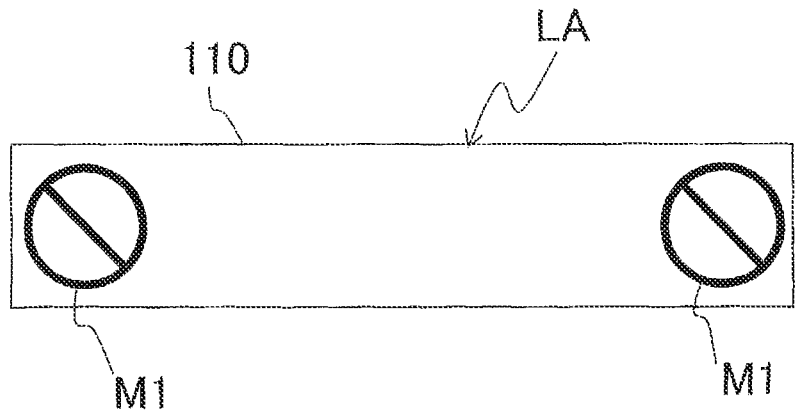
FIGS. 16A-16C are plan views respectively illustrating a top label, a bottom label, and a composite label created by bonding these two labels according to a second embodiment.

FIG. 16A shows an example of one print label LA that will form the topmost layer of the two print labels when the labels are overlaid. This print label LA is equivalent to the print label LA shown in FIG. 4A. That is, a prohibition mark M1 is formed on each longitudinal end of the print label LA cut from a transparent print label tape 110 to a prescribed length. Each prohibition mark M1 is red in color and comprises a circle with a diagonal line through the middle.

Figure 16B:
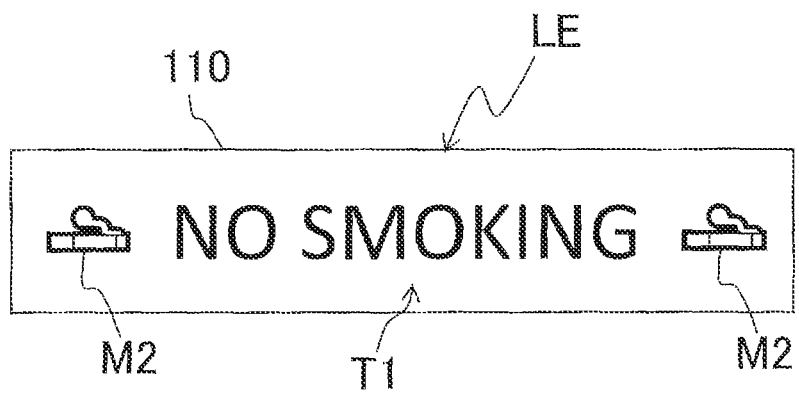
Figure 16C:
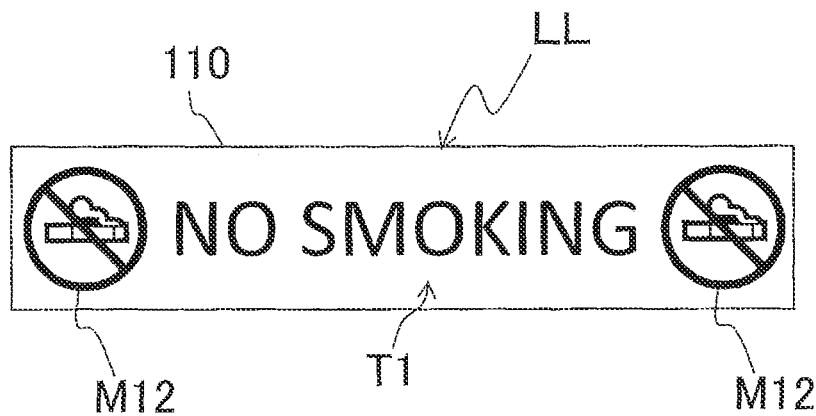

FIG. 16B shows an example of a print label LE that will form the bottommost layer of the two print labels when the labels are overlaid. In this example, a black smoking cigarette icon M2 similar to that in FIG. 4A is formed on each longitudinal end of the print label LE that has been cut from a white print label tape 110 to the prescribed length, and a black "NO SMOKING" text T1 similar to that in FIG. 4C is formed in the longitudinal center region of the print label LE.

By overlaying the print label LA and the print label LE in the order described above, the print label LL shown in FIG. 16C is produced. Note that the print label LA and the print label LE in this example have the same width and the same length. As in the first embodiment described above, the print label LL in the second embodiment will hereinafter be referred to as a "composite label LL." Further, the print label LA will be called the "top label LA," and the print label LE will be called the "bottom label LE."

As a result of overlaying the two labels, the red prohibition marks M1 and black cigarette icons M2 on both longitudinal ends of the tape portions are overlapped to configure composite "no smoking" symbols M12 on the composite label LL. Further, the black text T1 is arranged between the two "no smoking" symbols M12.

In other words, the sets of print data for creating the composite label LL is set for a plurality of layers to form a plurality of labels. In this example, the two sets of print data are set for two layers needed to form the top label LA and the bottom label LE, and two corresponding print images are formed in the respective layers.

Specifically, the set of print data for printing the top label LA provided with the prohibition marks M1 on both ends constitutes the topmost layer or first of the two layers; and the set of print data for printing the bottom label LE provided with the cigarette icons M2 on both ends and the "NO SMOKING" text T1 constitutes the bottom layer or second of the two layers. The prohibition marks M1 are formed on the top label LA as the print image for the first layer according to the set of print data for the first layer. The cigarette icons M2 and the text T1 are formed on the bottom label LE as the print image for the second layer according to the set of print data for the second layer.

Feature of the Second Embodiment

As with the first embodiment, one feature of the second embodiment having the above configuration is the method of determining the order for creating print labels L when print images are formed based on a plurality of sets of print data to create a plurality of print labels L on the label printer 3. Another particular feature of the second embodiment is that the set of print data transmitted from the operation terminal 2 to the label printer 3 individually corresponds to (correlated with) the type of cassette 101 that has been mounted in the label printer 3. In the following description, a case in which the top label LA and the bottom label LE described above are created on the label printer 3 as the plurality of uniquely different print labels L will be described in detail. For convenience, the top label LA and the bottom label LE will be respectively referred to as the "label LA" and the "label LE" in the following description.

Control Procedure

A sample control procedure executed in tandem by the CPU 11 of the operation terminal 2 and the CPU 21c of the label printer 3 according to the second embodiment will be described with reference to the sequence diagrams in FIGS. 17 and 18. At this time, the CPU 11 of the operation terminal 2 executes the control procedure in FIGS. 17 and 18 based on a print control program according to the second embodiment. The print control program is included with the programs stored in the ROM 12b. By executing this procedure, the CPU 11 implements the print control method described below. The CPU 21c of the label printer 3 executes the control procedure in FIGS. 17 and 18 based on a printing program. The printing program is included in the programs stored in the ROM 21a. By executing this procedure, the CPU 21c implements the printing method described below.

Figure 17:
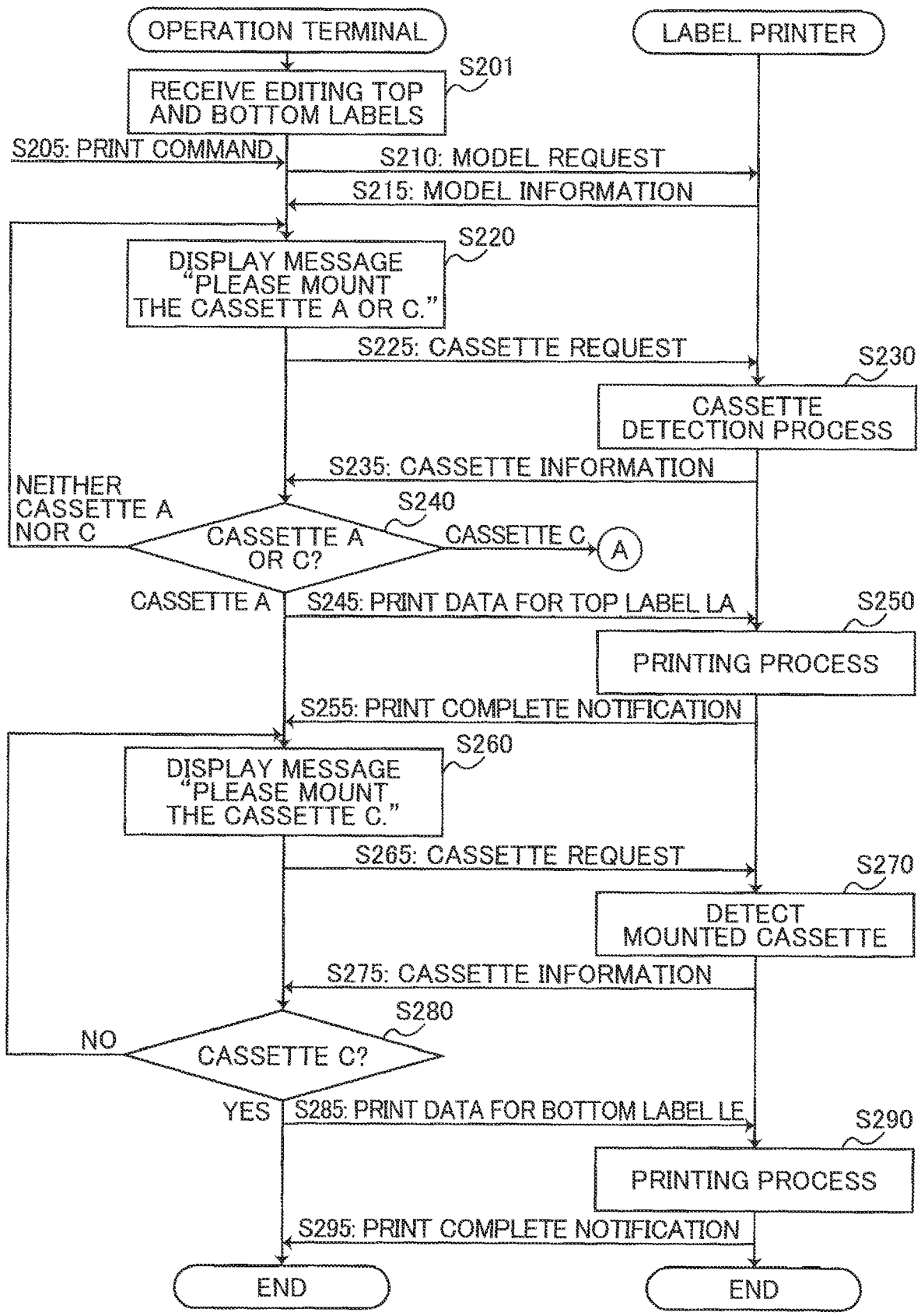
FIG. 17 is a sequence diagram of a first part of a control procedure executed in tandem by the operation terminal and the label printer according to the second embodiment.

In S201 of FIG. 17, the CPU 11 of the operation terminal 2 receives editing operations via the operation interface 13 as the user edits the top label LA to the print content described above. Based on these editing operations, the CPU 11 generates a set of print data for a top label LA having red prohibition marks M1 on both ends, as in the example described above. Also in S201, the CPU 11 receives editing operations via the operation interface 13 for the bottom label LE according to the print content described above and, based on these editing operations, generates a set of print data for a bottom label LE having the black cigarette icons M2 on both ends and a black "NO SMOKING" text T1 in the center region, as in the above example.

In S205 the CPU 11 subsequently receives an operation for a print command via the operation interface 13. The process of S205 is an example of a command reception process.

In S210 the CPU 11 of the operation terminal 2 transmits a model request to the label printer 3 requesting the model of the label printer 3, and specifically requesting the specifications and capacity of the label printer 3. Upon receiving this model request, in S215 the CPU 21c of the label printer 3 transmits its own model information to the operation terminal 2.

S220, the CPU 11 of the operation terminal 2 identifies a cassette 101 to be mounted in the label printer 3 for each set of print data generated in S201 for the top label LA and the bottom label LE. In other words, each set of print data is correlated with type information of a corresponding cassette 101, as described above. After the operation terminal 2 generates the sets of print data, the operation terminal 2 identifies type information of the corresponding cassette 101. In this example, the operation terminal 2 identifies the cassette A as the cassette to be used when printing the set of print data for the top label LA and the cassette C as the cassette to be used when printing the set of print data for the bottom label LE. In S220 the CPU 11 displays a message on the display 14 based on the results of these identifications. For example, the message may be "Please mount the cassette A or the cassette C in the label printer." The cassette A and the cassette C are examples of medium information. The process of S220 is an example of a first display process.

In S225 the CPU 11 transmits a cassette request to the label printer 3 requesting the type of cassette 101 currently mounted in the cassette holder 22 of the label printer 3. Upon receiving this cassette request, in S230 the CPU 21c of the label printer 3 performs a cassette detection process similar to that in S130 (FIG. 9) of the first embodiment. In other words, in response to the display displayed on the display 14 by the operation terminal 2 in S220, the user mounts one of the cassettes A and C in the cassette holder 22 of the label printer 3, and the label printer 3 determines that the cassette A or C was mounted based on detection results from the cassette sensor 31. The process of S230 is an example of the determination process. As in the first embodiment described above, the label printer 3 may determine the cassette type in S230 based on detection results from the cassette sensor 31. However, the user may instead be prompted to manually input the type of the mounted cassette 101 on the operation interface 13 of the operation terminal 2, and the operation terminal 2 may determine the cassette type based on the result of this input.

In S235 the label printer 3 transmits cassette information about the mounted cassette 101 determined in S230 to the operation terminal 2. Accordingly, the operation terminal 2 receives/acquires the cassette information. The cassette information is an example of type information of the print medium. The process of S235 is an example of a type acquisition process.

Upon receiving the cassette information from the label printer 3, in S240 the operation terminal 2 specifies the type of the cassette 101 currently mounted in the label printer 3, as indicated by the cassette information, and determines whether the cassette A or the cassette C was specified. Note that, in a case that the user manually inputs the type of the cassette 101 on the operation interface 13 as described above, the operation terminal 2 specifies the type of the printing system 1 based on this input and determines whether the type of cassette is the cassette A or the cassette C based on the specification results. In a case that the cassette type is neither the cassette A nor the cassette C, the CPU 11 returns to S220 and repeats the procedure described above. In a case that the cassette type is the cassette C, the CPU 11 advances to S305 in FIG. 18 described later. In a case that the cassette type is the cassette A, the CPU 11 advances to S245.

In S245 the CPU 11 transmits the set of print data for the top label LA generated in S201 to the label printer 3. Hence, in this case the CPU 11 transmits the set of print data for the top label LA correlated with the mounted cassette A (or the specified cassette type) to the label printer 3 and the label printer 3 prints the top label LA prior to transmitting the set of print data for the bottom label LE correlated with the other cassette C and printing of the bottom label LE. In this case, the cassette A used precedingly is an example of the first medium type. The set of print data for the top label LA is an example of the first print data. The prohibition marks M1 related to the top label LA is an example of the first print image. The cassette C used subsequently is an example of the second medium type. The set of print data for the bottom label LE is an example of the second print data. The cigarette icons M2 and the text T1 related to the bottom label LE are examples of the second print image.

Note that the transmitted set of print data for the top label LA is abbreviated in the sequence diagrams as the "print data LA." A similar notation will be used in the remaining drawings. The label printer 3 receives and acquires the set of print data for the top label LA transmitted from the operation terminal 2. Note that based on the determination results in S230 the label printer 3 may request the operation terminal 2 to transmit the set of print data for the top label LA rather than acquiring the set of print data that the operation terminal 2 transmits in response to cassette information about the mounted cassette received from the label printer 3 in S235 described above. In this case, the operation terminal 2 transmits the set of print data for the top label LA to the label printer 3 in response to the transmission request.

In S250 the label printer 3 executes a printing process for the top label LA based on the set of print data for the top label LA acquired in S245. After the printing process in S250 is completed, in S255 the label printer 3 transmits a print complete notification for the top label LA to the operation terminal 2 indicating that the printing was executed in S250. The print complete notification is an example of a prescribed notification. The process of S255 is an example of a notification transmission process.

Upon receiving this print complete notification indicating that printing of the top label LA has been completed using the cassette A, in S260 the operation terminal 2 recognizes or specifies that printing based on the set of print data for the bottom label LE must be performed using the cassette C. From results of this recognition or specification, in S260 the CPU 11 displays a message on the display 14, such as "Please mount the cassette C in the label printer." The prohibition marks M1 formed on the top label LA is an example of a prescribed print image. The set of print data for the top label LA is an example of prescribed print data. The "cassette A" is an example of medium information of the print medium corresponding to the prescribed print data. The "cassette C" is an example of remaining medium information other than the medium information of the print medium corresponding to the prescribed print data. The process of S260 is an example of a second display process.

In S265 the operation terminal 2 transmits the same cassette request described above to the label printer 3. In response to viewing the display on the display 14 executed by the operation terminal 2 in S260, the user mounts the cassette C in the label printer 3 and in S270 the label printer 3 determines that the cassette C was mounted based on detection results from the cassette sensor 31. As described above, the operation terminal 2 may determine that the cassette C was mounted based on the results of user's manual input on the operation interface 13. The process of S270 is an example of the determination process.

In S275 the label printer 3 transmits cassette information about the mounted cassette 101 determined in S270 to the operation terminal 2. Accordingly, the operation terminal 2 receives/acquires the cassette information. The cassette information is an example of the medium information of the print medium. The process of S275 is an example of the type acquisition process.

In S280 the operation terminal 2 specifies the type of the cassette 101 indicated by the cassette information acquired in S275 and determines whether the cassette C was specified. In a case that the user manually inputs the type of the cassette 101 on the operation interface 13 as described above, the operation terminal 2 specifies the type of the printing system 1 based on the results of this input and determines whether the type of cassette is the cassette C based on the specification results. The processes of S240 and S280 are examples of a specification process. In a case that the specified cassette is not the cassette C (S280: NO), the CPU 11 returns to S260 and repeats the procedure described above. However, in a case that the cassette C was specified (S260: YES), the CPU 11 advances to S285 described next.

In S285 the operation terminal 2 transmits to the label printer 3 the set of print data for the bottom label LE that was generated in S201 and is correlated with the specified cassette type (or the cassette C). The label printer 3 receives and acquires this set of print data for the bottom label LE. Note that the set of print data for the bottom label LE transmitted from the operation terminal 2 is abbreviated as "print data LE" in the drawings. The same notation will be used in the remaining drawings. The processes of S245 and S285 for transmitting the set of print data executed by the operation terminal 2 are examples of the data transmission process. The process for receiving the set of print data executed by the label printer 3 is an example of the data acquisition process.

In S290 the label printer 3 executes a printing process to print the bottom label LE based on the set of print data for the bottom label LE acquired in S285. The processes of S250 and S290 are examples of the print control process.

Upon completing execution of the print in S290, in S295 the label printer 3 transmits a print complete notification for the bottom label LE to the operation terminal 2 indicating that the print was executed in S290. Subsequently, the sequence of FIG. 17 ends. The print complete notification is an example of the prescribed notification. The process of S295 is an example of the notification transmission process.

Figure 18:
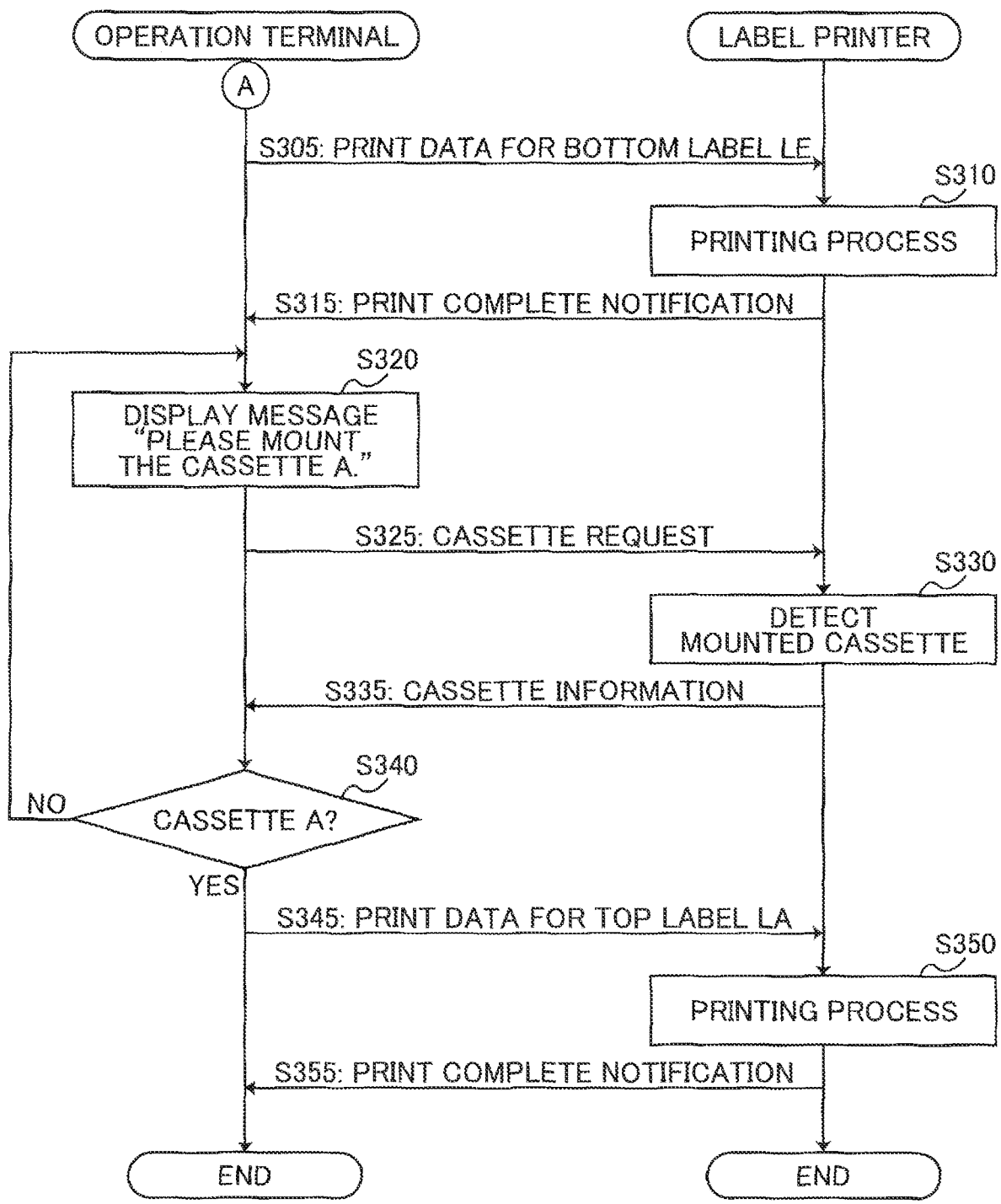
FIG. 18 is a remaining part of the control procedure shown in FIG. 17.

On the other hand, in a case that the CPU 11 determines in S240 that the specified cassette is cassette C, the CPU 11 advances to S305 of FIG. 18.

In S305 the operation terminal 2 transmits the set of print data for the bottom label LE generated in S201 to the label printer 3. In other words, in this case, the set of print data for the bottom label LE correlated with the mounted cassette C (the specified type) is transmitted and the label printer 3 prints the bottom label LE prior to transmitting the set of print data for the top label LA correlated with the other cassette A and printing the top label LA. In this case, the cassette C used precedingly is an example of the first medium type. The set of print data for the bottom label LE is an example of the first print data. The cigarette icons M2 and the text T1 are examples of the first print image. The cassette A used subsequently is an example of the second medium type. The set of print data for the top label LA is an example of the second print data. The prohibition marks M1 are examples of the second print image.

Thus, the label printer 3 receives and acquires the set of print data for the bottom label LE transmitted from the operation terminal 2. Note that the label printer 3 may instead request the operation terminal 2 to transmit the set of print data for the bottom label LE based on the determination results in S230 described above. In this case, the operation terminal 2 transmits the set of print data for the bottom label LE to the label printer 3 in response to the transmission request.

In S310 the label printer 3 executes a printing process for the bottom label LE based on the set of print data for the bottom label LE acquired in S305. After the printing process in S310 is completed, in S315 the label printer 3 transmits a print complete notification for the bottom label LE to the operation terminal 2 indicating that the printing was executed in S310. The print complete notification is an example of the prescribed notification. The process of S315 is an example of the notification transmission process.

Upon receiving this print complete notification indicating that printing of the bottom label LE has been completed using the cassette C, in S320 the operation terminal 2 recognizes or specifies that printing based on the set of print data for the top label LA must be performed using the cassette A. From the results of this recognition or specification, in S320 the CPU 11 displays a message on the display 14, such as "Please mount the cassette CA in the label printer." The cigarette icons M2 and the text T1 formed on the bottom label LE is an example of the prescribed print image. The set of print data for the bottom label LE is an example of the prescribed print data. The "cassette C" is an example of medium information of the print medium corresponding to the prescribed print data. The "cassette A" is an example of remaining medium information other than the medium information of the print medium corresponding to the prescribed print data. The process of S320 is an example of the second display process.

In S325 the operation terminal 2 transmits the same cassette request described above to the label printer 3. In response to viewing the display on the display 14 executed by the operation terminal 2 in S320, the user mounts the cassette A in the label printer 3 and in S330 the label printer 3 determines that the cassette A was mounted based on detection results from the cassette sensor 31. As described above, the operation terminal 2 may determine that the cassette A was mounted based on the results of the user's manual input on the operation interface 13. The process of S330 is an example of the determination process.

In S335 the label printer 3 transmits cassette information about the mounted cassette 101 determined in S330 to the operation terminal 2. Accordingly, the operation terminal 2 receives/acquires the cassette information. The cassette information is an example of the medium information of the print medium. The process of S335 is an example of the type acquisition process.

In S340 the operation terminal 2 specifies the type of the cassette 101 indicated by the cassette information acquired in S335 and determines whether the cassette A was specified. In a case that the user manually inputs the type of the cassette 101 on the operation interface 13 as described above, the operation terminal 2 specifies the type of the printing system 1 based on the results of this input and determines whether the type of cassette is the cassette A based on the specification results. The process of S340 is an example of the specification process. In a case that the specified cassette is not the cassette A (S340: NO), the CPU 11 returns to S320 and repeats the procedure described above. However, in a case that the cassette A was specified (S340: YES), the CPU 11 advances to S345 described next.

In S345 the operation terminal 2 transmits to the label printer 3 the set of print data for the top label LA that was generated in S201 and is correlated with the cassette A (the specified cassette type). The label printer 3 receives and acquires this set of print data for the top label LA. In this case, the process of S345 for transmitting the set of print data executed by the operation terminal 2 is an example of the data transmission process. The process for receiving the set of print data executed by the label printer 3 is an example of the data acquisition process.

In S350 the label printer 3 executes a printing process to print the top label LA based on the set of print data for the top label LA acquired in S345. The process of S350 is an example of the print control process.

Upon completing execution of the print in S350, in S355 the label printer 3 transmits a print complete notification for the top label LA to the operation terminal 2 indicating that the print was executed in S350. Subsequently, the sequence of FIGS. 17 and 18 ends. The print complete notification is an example of the prescribed notification. The process of S355 is an example of the notification transmission process.

Effects of the Embodiment

The effects the same as the first embodiment can be achieved in the second embodiment. That is, in S240, and S280 or S340, the operation terminal 2 determines the type of the cassette 101 currently mounted in the cassette holder 22. In S245 and S285, or S335 and S305, the label printer 3 acquires the sets of print data for the top label LA and the bottom label LE respectively. In S250 and S290, or S310 and S350 the label printer 3 executes print on the cover film 104. At this time, the order to be used for printing the set of print data for the top label LA and the set of print data for the bottom label LE is determined based on each acquired set of print data and the above determination results.

That is, in a case that the cassette A has been mounted in the cassette holder 22, the label printer 3 prints in the order: the set of print data for the top label LA→the set of print data for the bottom label LE. Similarly, in a case that the cassette C has been mounted in the cassette holder 22, the label printer 3 prints in the order: the set of print data for the bottom label LE→the set of print data for the top label LA. Accordingly, the label printer 3 prints first the print label L correlated with the cassette 101 currently mounted in the cassette holder 22. Thus, the second embodiment can eliminate the time and effort required for the user to replace the cassette 101 in the cassette holder 22 with the cassette 101 correlated with the set of print data, as described in the comparative example of FIGS. 5A-5C using the conventional method. Thus, the embodiment can reduce the user's operational burden.

A particular feature of the second embodiment is that the label printer 3 acquires the set of print data for each of the top label LA and the bottom label LE from the operation terminal 2 via the communication control interface 23 in S245 and S285, or S305 and S335. Accordingly, even when a plurality of types of cassettes 101 is used for printing a plurality of print images for a plurality of layers of a label based on a plurality of sets of print data received from the operation terminal 2, the label printer 3 can reduce the operational load on the user by modifying the printing order according to the type of cassette 101 currently mounted.

Another feature of the second embodiment is that the label printer 3 transmits the print complete notification to the operation terminal 2 in S255 and S295, or S315 and S355 each time the label printer 3 completes printing based on the set of print data for one of the labels LA and LE. As a result, the user can easily identify what type of cassette 101 has not yet been used for printing. Further, since the transmission timing of the print complete notification represents the replacement timing of the cassettes 101, the user must wait until this print complete notification is transmitted, effectively preventing the user from accidentally replacing the cassette 101 too early.

A feature of the second embodiment is that the operation terminal 2 specifies the type of cassette 101 currently mounted in the label printer 3 in S240, and S280 or S340. After specifying the type of cassette 101, the operation terminal 2 executes the corresponding print by transmitting the necessary set of print data to the label printer 3 in subsequent steps S245 and S285, or S305 and S345. In this way, the operation terminal 2 determines the order for transmitting the set of print data for the top label LA and the set of print data for the bottom label LE based on the above specification results.

In other words, in a case that the cassette A for the top label LA has been mounted in the label printer 3, the operation terminal 2 transmits the set of print data in the order: the set of print data for top label LA→the set of print data for bottom label LE. In a case that the cassette C for the bottom label LE has been mounted in the label printer 3, the operation terminal 2 transmits print data in the order: the set of print data for bottom label LE→the set of print data for top label LA.

Therefore, in a case that the cassette A was mounted in the label printer 3, the user can print both the top label LA and the bottom label LE by simply performing the subsequent operations: remove the cassette A→mount the cassette C. Similarly, in a case that the cassette C was mounted in the label printer 3, the user can print both the bottom label LE and the top label LA by simply performing the subsequent operations: remove the cassette C→mount the cassette A. Thus, by initiating printing operations beginning from the cassette 101 already mounted in the label printer 3, the method of the second embodiment eliminates the extra effort required in the conventional method described above to remount each cassette 101 in the cassette holder 22 based on the set of print data.

According to the second embodiment, the operation terminal 2 adjusts the order in which the sets of print data are transmitted to the label printer 3 in accordance with the type of cassette 101 mounted in the label printer 3, as described above. This method can reduce the user's operational burden when printing a plurality of print images for corresponding layers using different types of cassettes 101.

Another feature of the second embodiment is that, after receiving the print command from the user in S205, in S220 the operation terminal 2 displays the "cassette A" and the "cassette C" respectively corresponding to (correlated with) the set of print data for the top label LA and the set of print data for the bottom label LE. Thereafter, in response to completing the transmission of one of the sets of print data, the operation terminal 2 eliminates information on the cassette 101 corresponding to (correlated with) that set of print data from the displayed cassettes A and C and displays only information on the remaining cassette 101.

Thus, after the set of print data for the top label LA has been transmitted to the label printer 3, for example, the operation terminal 2 removes the "cassette A" needed to print the top label LA from the display and displays only the "cassette C" related to the set of print data for the bottom label LE to be transmitted second. In this way, the operation terminal 2 only displays on the display 14 information related to the remaining set(s) of print data that has not yet been transmitted, whereby the user can easily identify the types of cassettes 101 that still must be mounted in the label printer 3.

Another feature of the second embodiment is that the operation terminal 2 displays cassette information in S260 or S320 related to the remaining set(s) of print data that has not yet been transmitted at that time when the operation terminal 2 has received a print complete notification from the label printer 3 in S255 or S315 indicating that a print label L has been printed based on the previously transmitted set of print data. Using this timing, the method of the second embodiment can avoid cases in which the user inadvertently begins replacing the current cassette with the cassette 101 for the next print label L while the label printer 3 is still printing the previous print label L.

However, the operation terminal 2 may display this cassette information at an earlier timing without waiting for the print complete notification from the label printer 3 in S255 or S315 indicating that printing was completed for a print label L based on previously transmitted set of print data. This method is effective in that the user can identify and ready the next cassette 101 more quickly.

The second embodiment is particularly intended for application to the label printer 3 having the cassette sensor 31 for detecting types of cassettes 101. In this case, the operation terminal 2 acquires type information of the detected cassette 101 mounted in the label printer 3 in S235, and S275 or S335 based on detection results from the cassette sensor 31 and subsequently in S240, and S280 or S340 specifies the type of the cassette 101 mounted in the label printer 3 based on the acquired type information. From these specification results, the operation terminal 2 then transmits the set of print data to the label printer 3 in S245 and S285, or S305 and S345.

Accordingly, the operation terminal 2 can reliably transmit a suitable set print data to the label printer 3 based on the capacity of the label printer 3 to detect types of cassettes 101.

Variations of the Second Embodiment

While the present disclosure has been described in detail with reference to specific embodiments thereof, it would be apparent to those skilled in the art that many modifications and variations may be made therein without departing from the scope of the invention. In the following description, like parts and components to those in the first and second embodiments and variations thereof described above are designated with the same reference numerals to avoid duplicating description.

(2-1) Application to a Label Printer Incapable of Detecting Tape Color and Printing Color In the second embodiment described above, the cassette sensor 31 provided in the label printer 3 can detect the tape width and color of the print label tape 110 and the printing color of the ink ribbon 106 provided in each cassette 101. However, for some models of label printers 3, the cassette sensor 31 may be only capable of detecting the tape width of the print label tape 110 in each cassette 101 and incapable of detecting the tape color of the print label tape 110 and/or the printing color of the ink ribbon 106. This variation is an example for label printers of such models. In the following example, the label printer 3 can detect neither the tape color nor the printing color.

A sample control procedure according to the present variation that is executed in tandem by the CPU 11 of the operation terminal 2 and the CPU 21c of the label printer 3 will be described with reference to the sequence diagrams in FIGS. 19 through 21 that correspond to FIGS. 17 and 18 described above. As in the above description, the CPU 11 of the operation terminal 2 executes the control procedure in FIGS. 19-21 based on the print control program to implement the print control method described below, and the CPU 21c of the label printer 3 executes the control procedure based on the printing program to implement the printing method described below.

Figure 19:
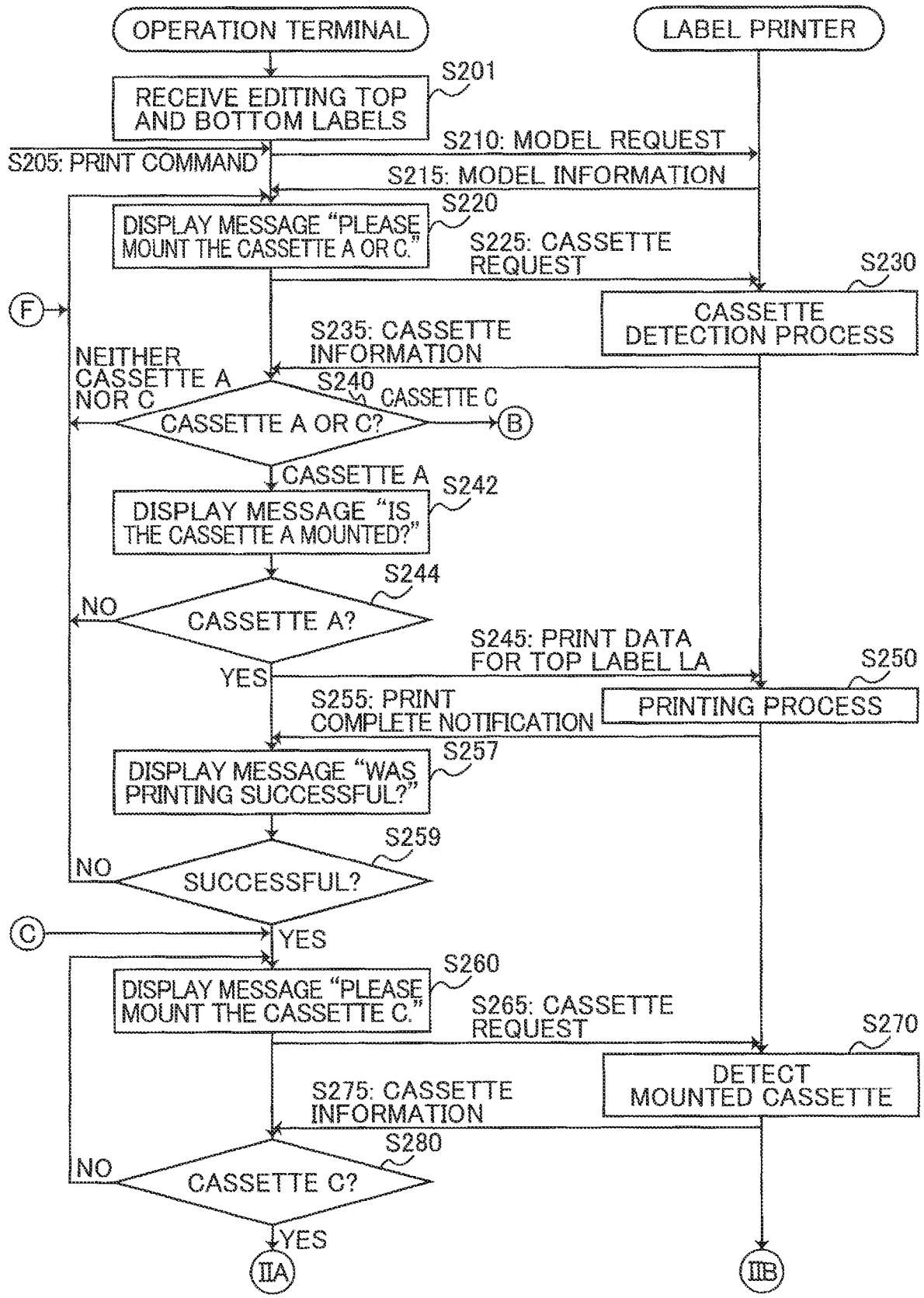
FIG. 19 is a sequence diagram of a first part of a control procedure executed in tandem by the operation terminal and the label printer according to a variation (2-1) of the second embodiment in which the label printer is incapable of detecting tape color and printing color.
Figure 20:
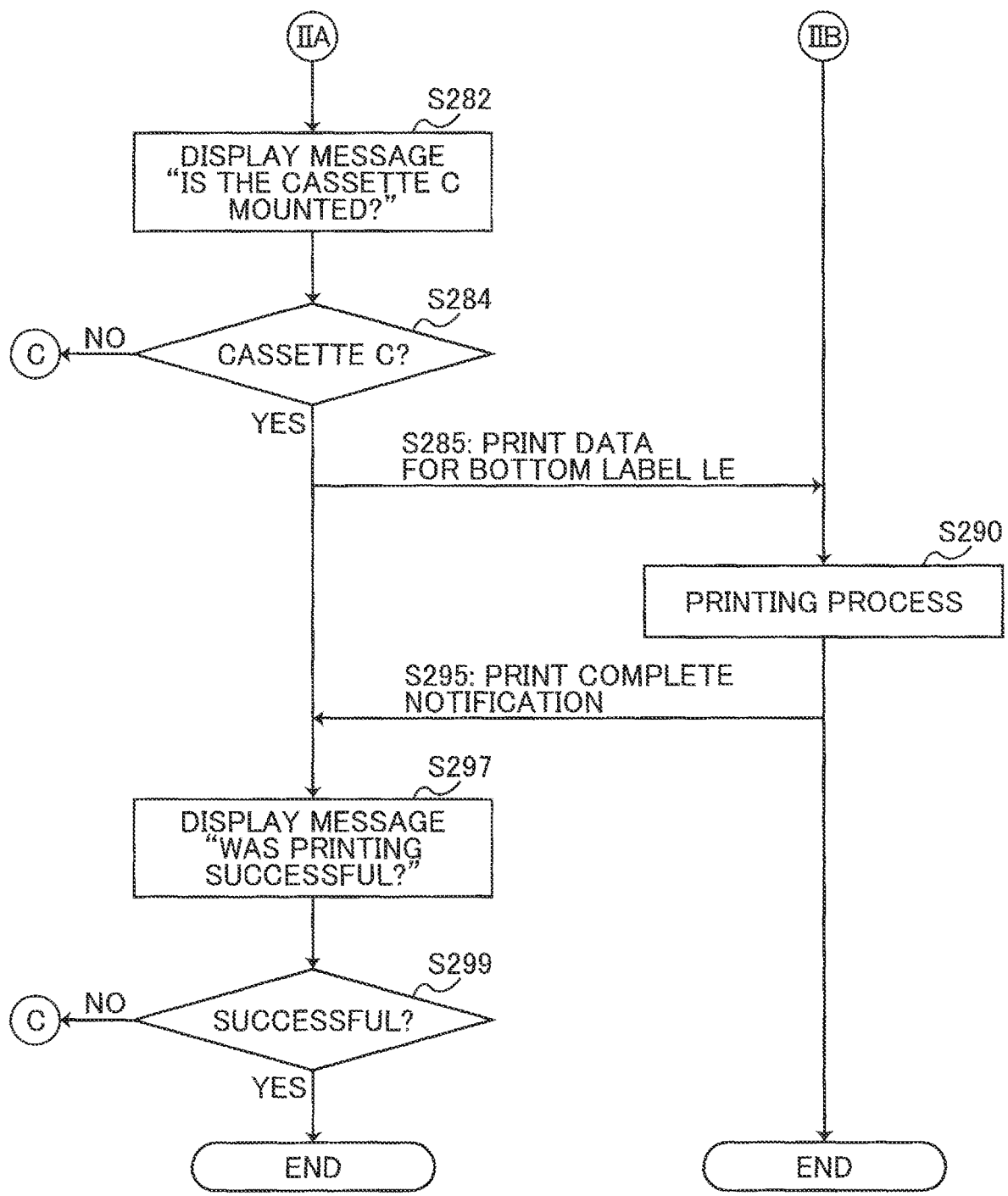
FIG. 20 is a sequence diagram of a second part of the control procedure shown in FIG. 19.
Figure 21:
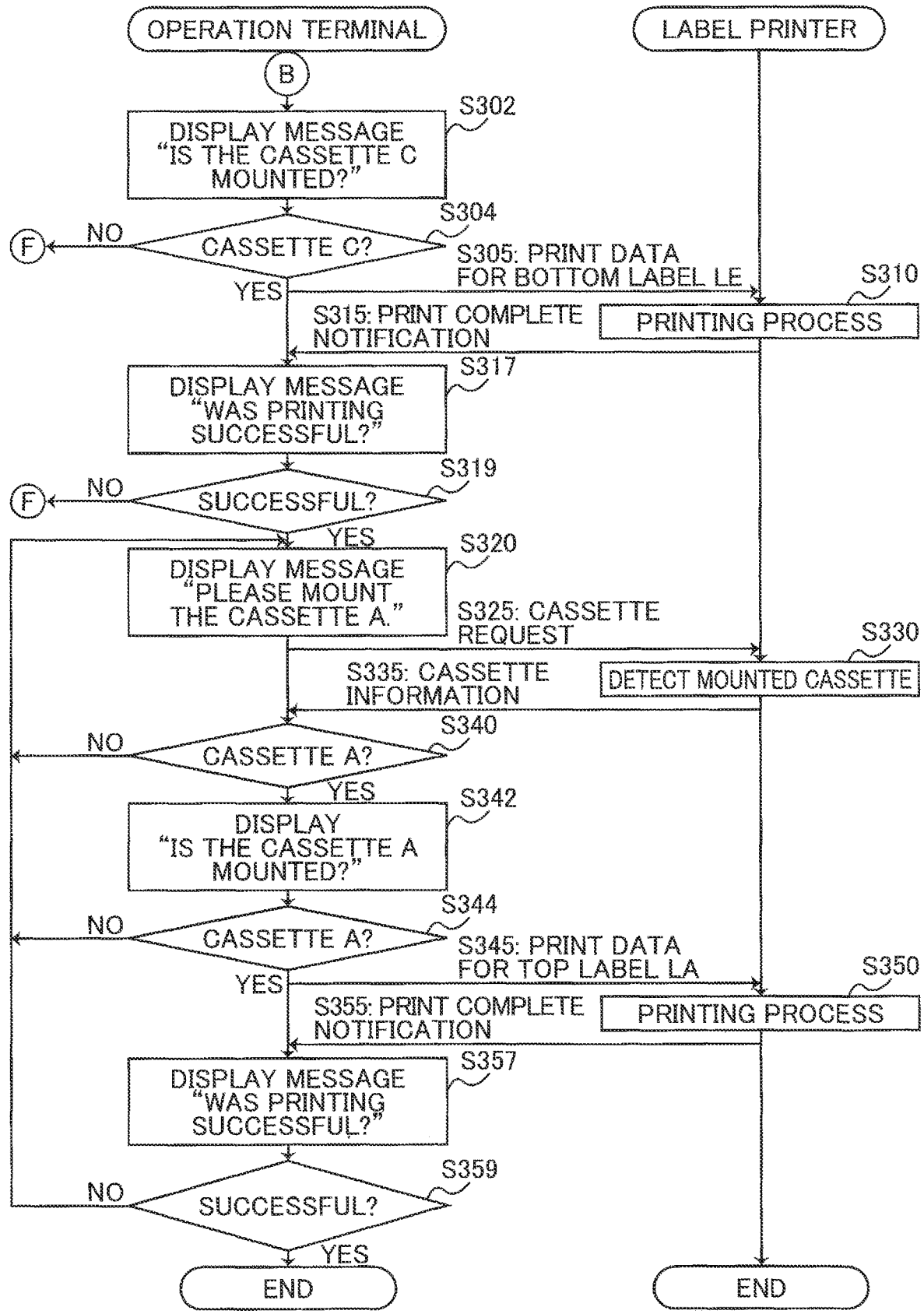
FIG. 21 is a sequence diagram of a remaining part of the control procedure shown in FIG. 19.

The steps in FIGS. 19 and 20 correspond to steps S201-S280 and S285-S295 in FIG. 17, while steps in FIG. 21 correspond to steps shown in FIG. 18. FIG. 19 is additionally provided with new steps S242 and S244 between S240 and S245, and new steps S257 and S259 between S255 and S260. FIG. 20 is additionally provided with new steps S282 and S284 between S280 (FIG. 19) and S285, and new steps S297 and S299 following S295. FIG. 21 is additionally provided with new steps S302 and S304 prior to S305, new steps S317 and S319 between S315 and S320, new steps S342 and S344 between S340 and S345, and new steps S357 and S359 following S355.

First, the CPU 11 executes S201-S240 as described in FIG. 17. In a case that the CPU 11 determines in S240 that the cassette information received in S235 indicates the cassette A, the CPU 11 advances to S242. Here, in this variation, since the cassette sensor 31 can detect neither the tape color of the print label 110 nor the printing color of the ink ribbon 106, the label printer 31 identifies the cassette type without using the information on the tape color and the printing color. Thus, when the label printer 31 identifies the cassette, the tape color or the printing color of the type of the cassette 101 actually mounted in the label printer 3 may be different from that of the identified type. That is, there is a possibility that the identified type is inaccurate. Thus, in a case that the label printer 3 identifies the type information indicating the cassette A, the mounted cassette 101 may have the print label of color or the printing color different from that of the cassette A.

In S242 the CPU 11 displays a message on the display 14, such as "Is the cassette A mounted?" The operation terminal 2 displays this message because the cassette sensor 31 cannot detect the tape color and printing color of the mounted cassette. Consequently, the operation terminal 2 cannot identify whether the mounted cassette is the cassette A or a different cassette 101 that is provided with a print label tape 110 having the same tape width as the print label tape 110 in the cassette A but has a different tape color or printing color.

Upon viewing this display, the user inputs information on the operation interface 13 indicating whether the mounted cassette is the cassette A. In a case that the user inputs information indicating that the cassette A is not mounted (S244: NO), the CPU 11 returns to S220 and repeats the above procedure. However, in a case that the user inputs information indicating that cassette A is mounted (S244: YES), the CPU 11 specifies the cassette A (type of cassette) to be used and advances to S245 described in the second embodiment. Further, the label printer 3 executes S250 and S255 to print the top label LA based on the set of print data for the top label LA. Subsequently, the process advances to S257.

In S257 the CPU 11 displays a message on the display 14, such as "Was printing successful?" This message is displayed in order to receive confirmation from the user that the cassette A was properly mounted and that the top label LA was properly printed since the operation terminal 2 can detect neither the tape or printing color.

Upon viewing this display, the user inputs information on the operation interface 13 indicating whether printing was successful. In a case that the inputted information indicates that printing was not successful (S259: NO), the CPU 11 returns to S220 and repeats the procedure described above. However, in a case that the inputted information indicates that printing was successfully completed (S259: YES), the CPU 11 advances to S260 described in the second embodiment. In S265-S280 the operation terminal 2 transmits a cassette request to the label printer 3 and receives a response from the label printer 3. In a case that the cassette information received in S275 indicates the "cassette C" (S280: YES), the operation terminal 2 advances to S282 of FIG. 20.

In S282 the CPU 11 displays a message on the display 14, such as "Is the cassette C mounted?" As with step S242 described above, this step is performed because the operation terminal 2 cannot identify whether the mounted cassette is the cassette C or another cassette 101 that is provided with a print label tape 110 having the same tape width as the print label tape 110 provided in the cassette C but that has a different tape color or printing color.

Upon viewing this display, the user inputs information on the operation interface 13 indicating whether the cassette C is mounted. In a case that the inputted information indicates that the cassette C is not mounted (S284: NO), the CPU 11 returns to S260 and repeats the procedure described above. However, in a case that the inputted information indicates that the cassette C is mounted (S284: YES), the CPU 11 specifies the cassette C (type of cassette) to be used and advances to S285 described in the embodiment. Further, the label printer 3 executes S290 and S295 to print the bottom label LE based on the set of print data for the bottom label LE. Subsequently, the process advances to S297.

In S297 the CPU 11 displays a message on the display 14, such as "Was printing successful?" As in S257 described above, the operation terminal 2 displays this message to receive confirmation from the user that the cassette C was properly mounted and that the bottom label LE was properly printed.

Upon viewing this message, the user inputs information on the operation interface 13 indicating whether printing was successful. In a case that the inputted information indicates that printing was not successful (S299: NO), the CPU 11 returns to S260 and repeats the procedure described above. However, in a case that the inputted information indicates that printing was successful (S299: YES), the sequence ends.

On the other hand, in a case that in S240 (FIG. 19) the CPU 11 determines that the cassette identified by the label printer 3 is cassette C, the process advances to S302 of FIG. 21.

As in the above description, in S302 of FIG. 21 the CPU 11 displays a message on the display 14, such as "Is the cassette C mounted?" Upon viewing this message, the user inputs information on the operation interface 13 indicating whether the cassette C is mounted. In a case that the inputted information indicates that the cassette C is not mounted (S304: NO), the CPU 11 returns to S220 and repeats the procedure described above. However, in a case that the inputted information indicates that the cassette C is mounted (S304: YES), the CPU 11 specifies the cassette C (type of cassette) to be used and advances to S305 described in the second embodiment. Further, by executing steps S310 and S315 the label printer 3 prints the bottom label LE based on the set of print data for the bottom label LE. Subsequently, the process advances to S317.

As in the above description, in S317 the CPU 11 displays a message on the display 14, such as "Was printing successful?" The CPU 11 displays this message in order to receive confirmation from the user that cassette C was properly mounted and that the bottom label LE was properly printed. Upon viewing this message, the user inputs information on the operation interface 13 indicating whether printing was successful. In a case that the inputted information indicates that printing was not successful (S319: NO), the CPU 11 returns to S220 and repeats the procedure described above. However, in a case that the inputted information indicates that printing was successful (S319: YES), the CPU 11 advances to S320 described in the second embodiment. In the subsequent process from S325 to S335, the operation terminal 2 transmits the cassette request to the label printer 3 and receives the reply. In a case that the cassette information received from the label printer 3 in S340 indicates the "cassette A," the CPU 11 advances to S342.

As in the above description, in S342 the CPU 11 displays a message on the display 14, such as "Is the cassette A mounted?" Upon viewing this message, the user inputs information on the operation interface 13 indicating whether the cassette A is mounted. In a case that the cassette A is not mounted (S344: NO), the CPU 11 returns to S320 and repeats the procedure described above. However, in a case that the input indicates that the cassette A is mounted (S344: YES), the CPU 11 specifies the cassette A (type of cassette) to be used and advances to S345 described in the second embodiment. Further, by executing steps S350 and S355 the label printer 3 prints the top label LA based on the set of print data for the top label LA. Subsequently, the process advances to S357.

In S357 the CPU 11 displays a message on the display 14, such as "Was printing successful?" Upon viewing this message, the user inputs information on the operation interface 13 indicating whether printing was performed properly. In a case that the inputted information indicates that printing was unsuccessful (S359: NO), the CPU 11 returns to S320 and repeats the procedure described above. However, in a case that the inputted information indicates that printing was successful (S359: YES), the sequence ends.

This variation obtains the same effects as described above in the second embodiment.

In S242, S282, S302, and S342 described above, the operation terminal 2 displays a message requesting confirmation from the user regarding whether the mounted cassette 101 is the cassette A or the cassette C due to the inability of the cassette sensor 31 to detect the tape color and printing color, but the present disclosure is not limited to this method. In place of these steps, the user may be prompted to input settings for the tape color and printing color corresponding to the cassette A or the cassette C through suitable operations on the operation interface 13. The operation terminal 2 then determines whether the inputted tape color and printing color match the content of the cassette A or the cassette C. In a case that the settings match the content of the corresponding cassette, the operation terminal 2 transmits the corresponding set of print data for the top label LA or the bottom label LE to the label printer 3 in order to print the corresponding one of the top label LA and the bottom label LE.

The content of this variation may also be combined with the content of the first embodiment described above. For example, at a suitable timing in the flowcharts of FIGS. 8 and 9, the operation terminal 2 may transmit a model request to the label printer 3 and receive model information in response, as in S210 and S215. The operation terminal 2 may then adjust the subsequent processes in accordance with this model information.

Specifically, in a case that the operation terminal 2 determines based on this model information that the cassette sensor 31 of the label printer 3 can detect the printing color and tape color as described above, the operation terminal 2 may execute the steps exactly as shown in FIGS. 8A and 8B. However, in a case that the cassette sensor 31 is incapable of detecting at least one of the printing color and tape color, the operation terminal 2 may issue cassette mounting requests to the user in S12, S32, S38, S42, S52, S58, S62, S72, S78, and S82 and subsequently may display requests to confirm the mounted cassettes as described in S242, S282, S302, and S342. Here, the example shown in FIGS. 8A and 8B is for printing labels using the cassettes A, B, and C, after the process of S12, the operation terminal 2 may display the request for confirming the mounted cassette from among the cassette A, B, and C. Further, after receiving a print complete notification in S22, S24, S26, S34, S36, S40, S44, S54, S56, S60, S64, S74, S76, S80, and S84, the operation terminal 2 may display a confirmation request for the user to confirm whether printing was successful as described in S257, S297, S317, and S357.

(2-2) Application to Label Printers Having No Cassette Type Detecting Function

This variation is an example for models of label printers that omit the cassette sensor 31 described above and, hence, cannot detect any of the tape width and color of the print label tape 110 and the printing color of the ink ribbon 106 provided in the mounted cassette 101. The label printer 3 according to this variation is an example of a second printer.

A sample control procedure according to the present variation that is executed in tandem by the CPU 11 of the operation terminal 2 and the CPU 21c of the label printer 3 will be described with reference to the sequence diagrams in FIGS. 22 and 23 that correspond to FIGS. 19-21 described above. As in the above description, the CPU 11 of the operation terminal 2 executes the control procedure in FIGS. 22 and 23 based on the print control program to implement the print control method described below, and the CPU 21c of the label printer 3 executes the control procedure based on the printing program to implement the printing method described below.

Figure 22:
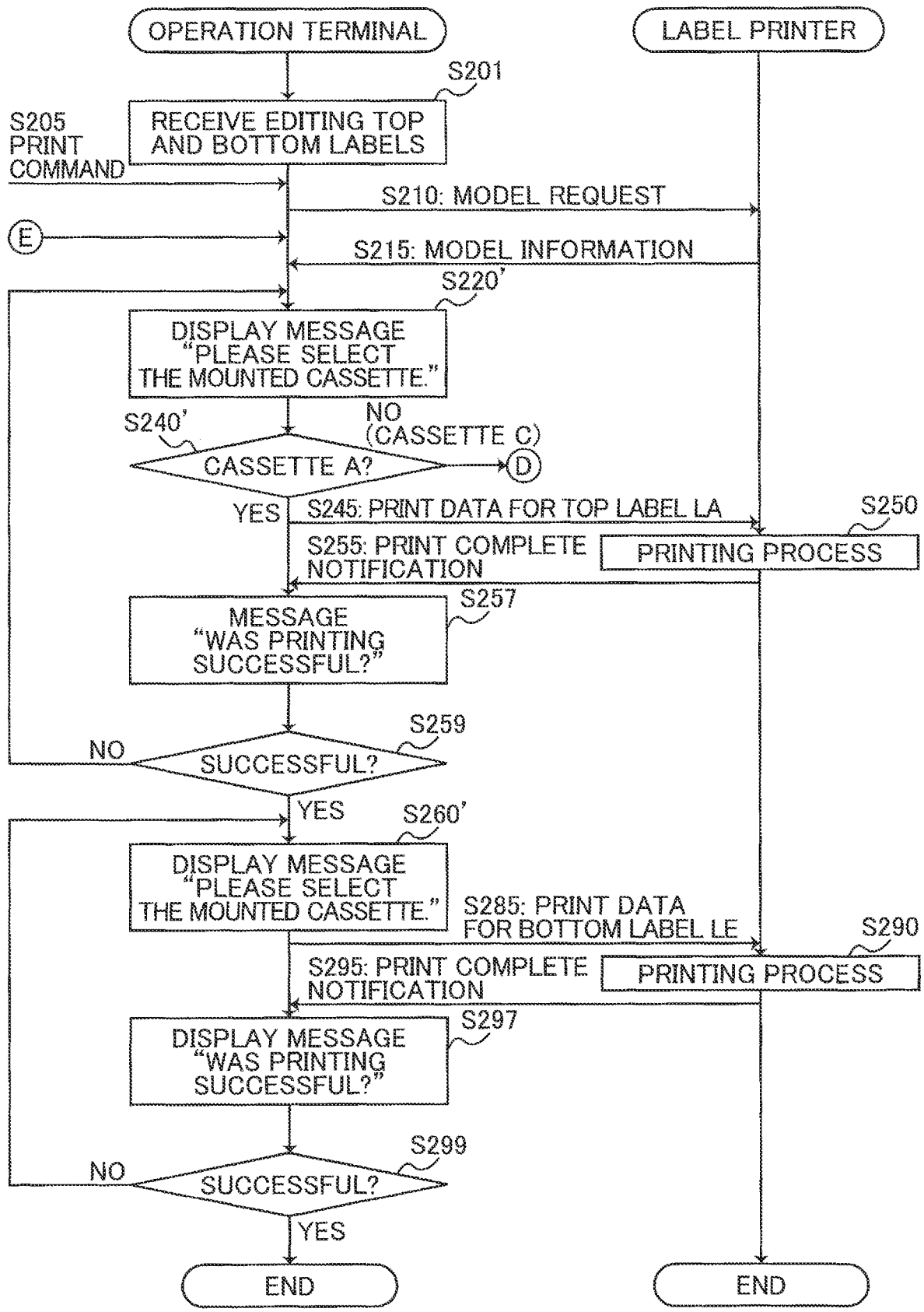
FIG. 22 is a sequence diagram of a part of a control procedure executed in tandem by the operation terminal and the label printer according to a variation (2-2) of the second embodiment in which the label printer is incapable of detecting cassette type.
Figure 23:
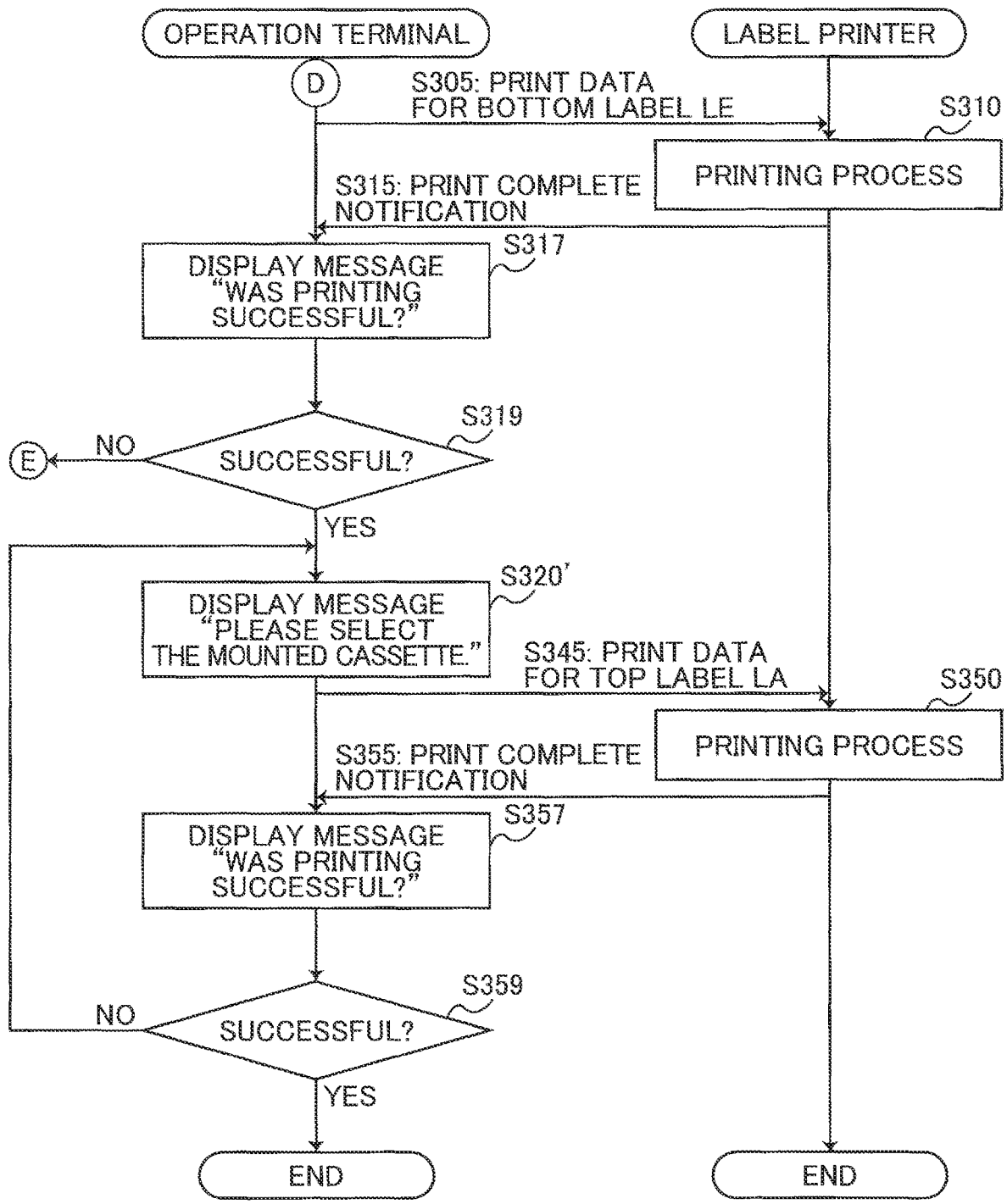
FIG. 23 is a sequence diagram of a remaining part of the control procedure shown in FIG. 22.

The steps in FIGS. 22 and 23 correspond to steps S201-S299 in FIGS. 19-20 and S302-S359 in FIG. 21. However, FIG. 22 is provided with steps S220' and S260' instead of S220 and S260 and excludes steps S225-S235, S242, S244, and S265-S284. FIG. 23 is provided with S320' instead of S320 and excludes S302, S304, S325-S344.

First, steps S201-S215 in FIG. 22 are executed as described in FIG. 19. Once the operation terminal 2 receives model information from the label printer 3 in S215, the operation terminal 2 advances to S220' in place of S220 of FIG. 19.

In S220' the operation terminal 2 displays a message on the display 14, such as "Please select the mounted cassette," and displays selectable type information of a plurality of cassettes 101, such as the "cassette A" and the "cassette C". The process of S220' to display information is an example of the type display process. Through this display, the operation terminal 2 receives a user selection via the operation interface 13. The process of S220' to receive a selection is an example of a selection reception process. Since the label printer 3 in this variation is not provided with the cassette sensor 31, as described above, the operation terminal 2 must prompt the user for a selection because the operation terminal 2 cannot specify the type of the mounted cassette 101 based on information received from the label printer 3. Further, the operation terminal 2 essentially specifies the type of the cassette 101 mounted in the label printer 3 based on the result of receiving selection in this process. Accordingly, the reception process in S220' is also an example of the specification process.

Upon viewing this display, the user performs suitable input on the operation interface 13 to indicate the type of cassette 101 mounted in the label printer 3. Next, the operation terminal 2 performs a determination in S240' in place of the determination in S240 of the previous variation to determine whether the type information inputted by the user indicates the cassette A. In a case that the user inputted the type information indicating the cassette A (S240': YES), the operation terminal 2 specifies the cassette A (type of cassette) to be used and advances to S245 as described in FIG. 19. Further, by executing S250 and S255 the label printer 3 prints the top label LA based on the set of print data for the top label LA.

Subsequently, the operation terminal 2 executes steps S257 and S259 described in FIG. 19. After the operation terminal 2 determines that printing was executed successfully, the operation terminal 2 advances to S260', which is provided in place of S260 described above.

In S260' the operation terminal 2 displays a message on the display 14, such as "Please select the mounted cassette," and displays selectable type information of a plurality of cassettes 101. Since the remaining cassette which has not yet been mounted is only the cassette C in this case, the operation terminal 2 may display the selectable type information of the remaining cassette only such as the "cassette C" together with the message. The process of S260' to display information is an example of the type display process. Through this display, the operation terminal 2 receives a user selection via the operation interface 13. The process of S260' to receive a selection is an example of the selection reception process. The operation terminal 2 essentially specifies the type of the cassette 101 mounted in the label printer 3 based on the result of receiving the selection in this process. Accordingly, the reception process in S260' is also an example of the specification process.

Upon viewing the display, the user inputs on the operation interface 13 information indicating the type of cassette 101 mounted in the label printer 3. In a case that the user inputted the type information indicating the cassette C, the operation terminal 2 specifies the cassette C (type of cassette) to be used and advances to S285 as described in FIG. 19. Subsequently, the label printer 3 executes S290 and S295 to print the bottom label LE based on the set of print data for the bottom label LE.

Next, the operation terminal 2 executes S297 and S299 as described in FIG. 19. When determining that the print was executed successfully (S299: YES), the sequence ends.

On the other hand, when the operation terminal 2 determines in S240' that the user inputted the type information indicating the cassette C as the cassette 101 currently mounted in the label printer 3 (S240': NO), the operation terminal 2 advances to S305 of FIG. 23, which is identical to S305 in FIG. 21. Subsequently, by executing S310 and S315 the label printer 3 prints the bottom label LE based on the set of print data for the bottom label LE.

Thereafter, the operation terminal 2 executes S317 and S319, as described in FIG. 21. After the operation terminal 2 determines that printing was executed successfully (S319: YES), the operation terminal 2 advances to S320', which is provided in place of S320.

In S320' the operation terminal 2 displays a message on the display 14, such as "Please select the mounted cassette," and displays selectable type information of a plurality of cassettes 101. Since the remaining cassette which has not yet been mounted is only the cassette A in this case, the operation terminal 2 may display the selectable type information of the remaining cassette only such as the "cassette A" together with the message. The process of S320' to display information is an example of the type display process. Through this display, the operation terminal 2 receives a user selection via the operation interface 13. The process of S320' to receive a selection is an example of the selection reception process. The operation terminal 2 essentially specifies the type of the cassette 101 mounted in the label printer 3 based on the result of receiving the selection in this process. Accordingly, the reception process in S320' is also an example of the specification process.

Upon viewing the display, the user inputs on the operation interface 13 information indicating the type of the cassette 101 mounted in the label printer 3. In a case that the user inputted the type information indicating the cassette A, the operation terminal 2 specifies the cassette A (type of cassette) to be used and advances to S345 as described in FIG. 21. Subsequently, the label printer 3 executes S350 and S355 to print the top label LA based on the set of print data for the top label LA.

Next, the operation terminal 2 executes S357 and S359 as described in FIG. 21. When determining that the print was executed successfully (S359: YES), the sequence ends.

Effects

The effects the same as the second embodiment can be achieved in this variation.

This variation is particularly intended for application to a label printer 3 not provided with the cassette sensor 31 and incapable of detecting the cassette types. In S220', S260', and S320' of this variation, the operation terminal 2 receives user operations indicating type information of the cassette 101 mounted in the label printer 3 and specifies the type of the mounted cassette 101 based on the results of the reception of this information. In S245, S285, S305, and S345 the operation terminal 2 transmits the corresponding sets of print data to the label printer 3 based on the specification results.

Accordingly, in this variation the operation terminal 2 can reliably transmit a suitable set of print data to the label printer 3, even when the label printer 3 does not have the capacity to detect types of cassettes 101.

The content of this variation may also be combined with the content of the first embodiment described above. That is, at suitable timings in the flowcharts of FIGS. 8 and 9, the operation terminal 2 may issue a model request to the label printer 3 and receive model information in response, as described in S210 and S215 of the present variation. The subsequent processes may be adjusted based on this type information.

Specifically, the operation terminal 2 determines whether the label printer 3 can detect cassette types with the cassette sensor 31 based on the type information received from the label printer 3. In a case that the label printer 3 is provided with the cassette sensor 31 as described in the first embodiment, the operation terminal 2 may execute steps exactly as they are shown in FIGS. 8A and 8B. In other words, at some timing prior to executing S22 from among steps S22-S84 of FIGS. 8A and 8B, the operation terminal 2 issues a model request to the label printer 3, receives model information from the label printer 3 in response, and makes the determination described above in accordance with this model information.

On the other hand, in a case that the label printer 3 is not provided with the cassette sensor 31, a separate process is performed. In a case that it is determined that the label printer 3 is not provided with the cassette sensor 31, after the operation terminal 2 issues requests to the user to mount cassettes in S12, S32, S38, S42, S52, S58, S62, S72, S78, and S82 of FIGS. 8A and 8B, the operation terminal 2 displays lists of selectable type information of a plurality of cassettes and receives a selection from the list, as described in S220', S260', and S320'. At a suitable timing after receiving such a selection, the operation terminal 2 transmits a print command to the label printer 3 commanding the label printer 3 to print the set of print data correlated with the selected cassette from among the sets of print data that was transmitted earlier in S10, and the label printer 3 prints the corresponding print label L.

In the process flows described above, the process executed by the CPU 11 of the operation terminal 2 to determine whether the label printer 3 is provided with the cassettes sensor 31 is an example of the determination process. The process to display the list of type information of the plurality of cassettes in a selectable manner is an example of the type display process. The process to receive the type information from the list is an example of the selection reception process. The process to transmit the print command to print the set of print data corresponding to the selected type is an example of the command transmission process.

In this case, after the operation terminal 2 transmits sets of print data to the label printer 3 in S10, as described above, the operation terminal 2 determines whether the label printer 3 can detect types of cassettes 101 by a cassette sensor 31. In a case that the label printer 3 is incapable of detecting cassette types, the operation terminal 2 receives type information of the cassette mounted in the label printer 3 through user operations, and transmits a print command to the label printer 3 for printing the set of print data correlated with the cassette 101 corresponding to (matching) the received type information (or the results of reception). The label printer 3 then specifies the type of the currently mounted cassette 101 to be the cassette type correlated with one of the received sets of print data and executes a print based on this set of print data using the mounted cassette 101.

This method according to the present variation described above can reduce the user's operational load when printing a plurality of print images for corresponding layers using different types of cassettes 101. In particular, the above method ensures that the label printer 3 can reliably execute suitable printing based on the set of print data received from the operation terminal 2, even when the label printer 3 cannot detect cassette types.

Further, in a case that the operation terminal 2 determines that the label printer 3 can detect types of cassettes 101 in the determination process described above, the operation terminal 2 transmits a model request, receives model information, and makes the determination based on this information prior to step S22, as described above, and subsequently continues with the same steps as they are shown in FIGS. 8A and 8B. But the present disclosure is not limited to this method. For example, in a case that the operation terminal 2 determines that the label printer 3 can detect types of cassettes 101 in the determination process described above, all steps beginning from S22 in FIG. 8B may be omitted, and the operation terminal 2 and the label printer 3 may cease the exchanging of information thereafter. In other words, after completing S2-S12 including transmitting a model request, receiving model information, and determining whether the label printer 3 can detect cassette types, at this point the label printer 3 has received all the sets of print data and is capable of detecting cassette types. Therefore, the label printer 3 has no particular need to exchange information with the operation terminal 2 thereafter since the label printer 3 can suitably create print labels L based on corresponding set of print data that is correlated with the types of the mounted cassettes 101.

(3) Other Variations

When dimensions and sizes are described as being "identical," "equivalent," "different," and the like in appearance in the above description, these terms are not intended to be taken in their strictest sense. In other words, the terms "identical," equivalent," and different" may signify "substantially identical," "substantially equivalent," and "substantially different" to allow for design and manufacturing tolerances and error.

Further, the flowcharts and sequence diagrams shown in FIGS. 8, 9, 11, 17-23, and the like do not limit the present disclosure to the steps indicated therein. Steps may be added or deleted, or their order may be rearranged, without departing from the scope and technical ideas of the invention.

In addition to what has already been described, the methods according to the embodiments and their variations described above may be used in suitable combinations.

In addition, although not illustrated individually, the present disclosure may be implemented with various modifications without departing from the scope of the invention.

What is claimed is:

1. A printer comprising:
   a holder in which a print medium is mountable;
   a print head configured to print an image; and
   a controller configured to perform:
      a determination process to determine a type of print medium currently mounted in the holder;
      a data acquisition process to acquire a plurality of sets of print data representing respective ones of a plurality of print images and being correlated with respective ones of a plurality of medium types which is different from one another, each of the plurality of print images being to be printed by using correlated one of the plurality of medium types, the plurality of sets of print data including a first set of print data and a second set of print data, the first set of print data representing a first print image and being correlated with a first medium type, the second set of print data representing a second print image and being correlated with a second medium type; and
      a print control process to control the print head according to the plurality of acquired sets of print data and determination result in the determination process so that:
         in a case that the print medium of the first medium type is mounted in the holder, the print head prints the first print image based on the first set of print data, and thereafter prints the second print image based on the second set of print data; and
         in a case that the print medium of the second medium type is mounted in the holder, the print head prints the second print image based on the second set of print data, and thereafter prints the first print image based on the first set of print data.

2. The printer according to claim 1, further comprising a communication interface communicable with a terminal device via network,
   wherein in the data acquisition process, the communication interface acquires the plurality of sets of print data from the terminal device via the network.

3. The printer according to claim 2, wherein the controller is configured to further perform a notification transmission process to transmit a prescribed notification to the terminal device each time one of the plurality of print images is printed based on corresponding one of the plurality of sets of print data in the print control process.

4. The printer according to claim 2, wherein the data acquisition process acquires the plurality of sets of print data correlated with respective ones of the plurality of medium types at a time,
   wherein the print control process performs printing the plurality of print images based on the plurality of sets of print data which is acquired at a time in the data acquisition process.

5. The printer according to claim 1, wherein the controller is configured to further perform:
   a type identification process to identify the plurality of medium types correlated with respective ones of the plurality of sets of print data; and
   a type specification process to specify a medium type matching the type of the currently-mounted print medium determined in the determination process from among the plurality of medium types identified in the identification process,
   wherein in the print control process, the print head prints a print image of a set of print data correlated with the medium type specified in the type specification process prior to printing a print image of each set of print data correlated with one of one or more medium types other than the specified medium type.

6. The printer according to claim 5, wherein the print control process prints: a print image based on one set of print data from among the plurality of sets of print data; and a prescribed image specifying a medium type correlated with another set of print data other than the one set of print data from among the plurality of sets of print data.

7. The printer according to claim 5, further comprising a sensor configured to detect the type of the print medium currently mounted in the holder, wherein the determination process determines the type of the print medium based on a detection result by the detector, wherein the type specification process specifies the medium type matching the type of the currently-mounted print medium determined in the determination process based on the detection result from among the plurality of medium types identified in the identification process, wherein when the type specification process specifies the medium type matching the type of the currently-mounted print medium determined in the determination process based on the detection result, the print control process starts printing the print image of the set of print data correlated with the specified medium type.

8. The printer according to claim 1, further comprising a communication interface communicable with a first terminal device and a second terminal device via network, wherein the communication interface receives a third set of print data and a fourth set of print data from the first terminal device, the third set of print data representing a third print image and being correlated with a third medium type, the fourth set of print data representing a fourth print image and being correlated with a fourth medium type, wherein the communication interface receives a fifth set of print data and a sixth set of print data from the second terminal device, the fifth set of print data representing a fifth print image and being correlated with the third medium type, the sixth set of print data representing a sixth print image and being correlated with a fifth medium type, wherein the print control process controls the print head according to the plurality of acquired sets of print data and determination result in the determination process so that, in a case that the print medium of the third medium type is mounted in the holder, the print head prints the third print image and the fifth print image using the print medium of the third medium type based respectively on the third set of print data and the fifth set of image data, and thereafter prints the fourth print image using a print medium of the forth medium type and prints the sixth print image using a print medium of the fifth medium type.

9. A non-transitory computer readable storage medium storing a set of program instructions installed on and executed by a computer provided in a terminal device configured to be connected to a printer, the set of program instructions comprising:

performing a specification process to specify a type of a print medium currently mounted in the printer; and transmitting to the printer a plurality of sets of print data representing respective ones of a plurality of print images and being correlated with respective ones of a plurality of medium types which is different from one another, each of the plurality of print images being to be printed by using correlated one of the plurality of medium types, the plurality of sets of print data including a first set of print data and a second set of print data, the first set of print data representing a first print image and being correlated with a first medium type, the second set of print data representing a second print image and being correlated with a second medium type, wherein in a case that the specified type is the first medium type, the transmitting transmits the first set of print data, and thereafter transmits the second set of print data, wherein in a case that the specified type is the second medium type, the transmitting transmits the second set of print data, and thereafter transmits the first set of print data.

10. The non-transitory computer readable storage medium according to claim 9, wherein the set of program instructions comprises:

performing a command reception process to receive a print command to print the plurality of sets of print data via an operation interface;

performing a first display process to display information on each of the plurality of medium types correlated with respective ones of the plurality of sets of print data in a case that the print command is received in the command reception process; and performing, after transmitting a prescribed set of print data representing a prescribed image among the plurality of sets of print data, a second display process to display information on each of one or more remaining medium types other than a medium type correlated with the prescribed set of print data.

11. The non-transitory computer readable storage medium according to claim 10, wherein the second display process is performed when a print completion notification of the prescribed image is received from the printer.

12. The non-transitory computer readable storage medium according to claim 9, wherein the printer is capable of detecting a type of the print medium currently mounted therein, wherein the set of program instructions comprises performing a type acquisition process to acquire the type of the currently-mounted print medium detected by the printer, wherein the specification process specifies the type of the print medium currently mounted in the printer based on the type of the currently-mounted print medium acquired in the type acquisition process.

13. The non-transitory computer readable storage medium according to claim 9, wherein the printer is incapable of detecting a type of the print medium currently mounted therein, wherein the set of program instructions comprises:

performing a type display process to display a plurality of medium types in a selectable manner; and performing a type reception process to receive one type from among the plurality of medium types displayed in the type display process via an operation interface, wherein the specification process specifies the type of the print medium currently mounted in the printer based on the one type received in the type reception process.

14. A non-transitory computer readable storage medium storing a set of program instructions installed on and executed by a computer provided in a terminal device configured to be connected to a printer, the set of program instructions comprising:

determining whether the printer is capable of detecting a type of print medium currently mounted therein;

transmitting to the printer a plurality of sets of print data representing respective ones of a plurality of print images and being correlated with respective ones of a plurality of medium types which is different from one another, each of the plurality of print images being to be printed by using correlated one of the plurality of medium types; and in a case that the determining determines that the printer is incapable of detecting the type of print medium:

performing a type display process to display a plurality of medium types in a selectable manner;

performing a type reception process to receive one type from among the plurality of medium types displayed in the type display process via an operation interface; and performing a print commanding process to transmit to the printer a command to print a set of print data correlated with the one type received in the type reception process from among the plurality of sets of print data transmitted.

\* \* \* \* \*